United States Patent
Mishra et al.

(10) Patent No.: US 11,079,303 B1
(45) Date of Patent: Aug. 3, 2021

(54) EVALUATING JOINTS USING VIBROMETRIC SIGNATURES

(71) Applicant: Amazon Technologies, Inc., Seattle, WA (US)

(72) Inventors: Pragyana Mishra, Seattle, WA (US); Kevin Tseng, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 232 days.

(21) Appl. No.: 16/438,383

(22) Filed: Jun. 11, 2019

(51) Int. Cl.
G01M 5/00 (2006.01)

(52) U.S. Cl.
CPC ........ G01M 5/0066 (2013.01); G01M 5/0016 (2013.01); G01M 5/0075 (2013.01)

(58) Field of Classification Search
CPC . G01M 5/0066; G01M 5/0016; G01M 5/0075
See application file for complete search history.

(56) References Cited

U.S. PATENT DOCUMENTS

| | | | |
|---|---|---|---|
| 4,895,448 A | 1/1990 | Laird | |
| 6,622,135 B1 | 9/2003 | Tremiolles et al. | |
| 9,404,899 B1* | 8/2016 | Konopka | G08B 13/1609 |
| 10,053,236 B1* | 8/2018 | Buchmueller | G01N 29/04 |
| 10,112,730 B2 | 10/2018 | Ismail | |
| 10,496,893 B2 | 12/2019 | Diamond et al. | |
| 2007/0280501 A1 | 12/2007 | Walton | |
| 2010/0235037 A1 | 9/2010 | Vian et al. | |
| 2011/0063950 A1 | 3/2011 | Greenleaf et al. | |
| 2012/0250010 A1* | 10/2012 | Hannay | G01N 21/952 356/237.1 |
| 2014/0067164 A1 | 3/2014 | Papadopoulos et al. | |
| 2015/0336671 A1 | 11/2015 | Winn et al. | |
| 2015/0355101 A1* | 12/2015 | Sun | G01N 21/8806 348/46 |

(Continued)

OTHER PUBLICATIONS

Wadhwa, N., Rubinstein, M., Durand, F., and Freeman, W.T. "Phase-Based Video Motion Processing," MIT Computer Science & Artificial Intelligence Lab, ACM Transactions on Graphics, vol. 32, issue 4, New York, N.Y., Jul. 2013, 9 pages.

(Continued)

*Primary Examiner* — Dave Czekaj
*Assistant Examiner* — Shanika M Brumfield
(74) *Attorney, Agent, or Firm* — Athorus, PLLC

(57) ABSTRACT

Vibrometric signatures of portions of a vehicle, such as a joint between two or more aspects of the vehicle, may be generated and used to make determinations regarding the integrity or suitability of the vehicle for one or more missions. Vibrometric signatures are generated based on imaging data captured with the vehicle subjected to excitation over a range of frequencies, and power levels of vibrations of the vehicle are calculated based on the images. Pixels corresponding to surfaces on either side of a joint are selected and vibrometric signatures calculated for such surfaces are compared to determine whether the joint adequately transfers vibrations, or whether the joint is sufficiently tight. Where the vibrometric signatures are sufficiently similar to one another, the joint may be presumed to be tight. Where the vibrometric signatures are not sufficiently similar to one another, the joint is presumed to require maintenance or inspection.

20 Claims, 33 Drawing Sheets

AERIAL VEHICLE HAVING JOINT(S) SUBJECTED TO EXTERNAL EXCITATION OVER FREQUENCY RANGE

HIGH-SPEED CAMERA CAPTURES IMAGES OF AERIAL VEHICLE DURING EXTERNAL EXCITATION

(56) References Cited

U.S. PATENT DOCUMENTS

| | | | |
|---|---|---|---|
| 2016/0003954 | A1 | 1/2016 | Broussard et al. |
| 2016/0093124 | A1 | 3/2016 | Shi et al. |
| 2016/0264262 | A1* | 9/2016 | Colin .................... G01N 29/04 |
| 2016/0376031 | A1* | 12/2016 | Michalski ............ G05D 1/0669 701/15 |
| 2016/0379154 | A1 | 12/2016 | Rodoni |
| 2017/0328838 | A1 | 11/2017 | Umehara |
| 2018/0068433 | A1 | 3/2018 | Imakoga |
| 2018/0322366 | A1 | 11/2018 | Lim et al. |
| 2019/0033124 | A1* | 1/2019 | Mukherjee ............... G01H 9/00 |
| 2019/0228667 | A1 | 7/2019 | Matsumoto et al. |
| 2020/0180791 | A1* | 6/2020 | Kimberly ................. B64F 5/60 |

OTHER PUBLICATIONS

Wu, H.-Y., Rubinstein, M., Shih, E., Guttag, J., Durand, F., Freeman, W. "Eulerian Video Magnification for Revealing Subtle Changes in the World," ACM Transactions on Graphics, vol. 31, No. 4, New York, N.Y., Jul. 2012, 8 pages.

A. Krizhevsky, I. Sutskever, and G. E. Hinton. Imagenet classification with deep convolutional neural networks. NIPS ' 12 Proceedings of the 25th Int'l Conference on Neural Information Processing Systems (vol. 1), Lake Tahoe, Nevada, pp. 1097-1105, 2012.

A. Radford, L. Metz, and S. Chintala. Unsupervised Representation Learning with Deep Convolutional Generative Adversarial Networks. Submitted as Conference Paper for ICLR 2016, San Juan, Puerto Rico, May 2-4, 2016.

A. Shrivastava, T. Pfister, O. Tuzel, J. Susskind, W. Wang, and R. Webb. Learning from Simulated and Unsupervised Images through Adversarial Training. Submitted Nov. 15, 2016, for oral presentation at Conference on Computer Vision and Pattern Recognition (CVPR 2017), Honolulu, Hawaii; presented at CVPR 2017 on Jul. 23, 2017.

B. Zhou, A. Khosla, A. Lapedriza, A. Oliva, and A. Torralba. Learning Deep Features for Discriminative Localization. In Proceedings of the IEEE Conference on Computer Vision and Pattern Recognition (CVPR 2016), Las Vegas, Nevada, pp. 2921-2929, IEEE 2016.

D. Soukup and R. Huber-Mörk. Convolutional Neural Networks for Steel Surface Defect Detection from Photometric Stereo Images, pp. 668-677. Advances in Visual Computing, 10th Int'l Symposium (ISVC 2014), Las Vegas, Nevada, Dec. 8-10, 2014. Springer International Publishing, Switzerland, 2014 (LNCS 8887).

D. Kingma and J. Ba. Adam: A Method for Stochastic Optimization, The Hebrew University of Jerusalem, Advanced Seminar in Deep Learning, Oct. 18, 2015.

D. Kingma and J. Ba. Adam: A method for stochastic optimization. Published at the 3rd International Conference for Learning Representations (ICLR 2015), San Diego, May 9, 2015.

D. Martin. A Practical Guide to Machine Vision Lighting, Advanced Illumination, Rochester, Vt., Feb. 2012.

D. Mery and M.A. Berti. Automatic Detection of Welding Defects Using Texture Features. Insight—Non-Destructive Testing and Condition Monitoring, 45(10):676-681, 2003. Presented at Int'l Symposium on Computed Tomography and Image Processing for Industrial Radiology, Berlin, Germany, Jun. 23-25, 2003.

D. Sammons, W.P. Winfree, E. Burke, and S. Ji. Segmenting delaminations in carbon fiber reinforced polymer composite CT using convolutional neural networks. AIP Conference Proceedings, vol. 1706, p. 110014. American Institute of Physics, AIP Publishing, 2016.

D. Vernon. Machine Vision: Automated Visual Inspection and Robot Vision. Automatica, vol. 30, No. 4, pp. 731-732 (1994), Elsevier Science, Ltd., Great Britain.

D. Wang, A. Khosla, R. Gargeya, H. Irshad, and A. H. Beck. Deep Learning for Identifying Metastatic Breast Cancer. Computer Research Repository (CoRR), Jun. 18, 2016.

Freeman, William T., and Adelson, Edward H. "The Design and Use of Steerable Filters," IEEE Transactions on Pattern Analysis and Machine Intelligence, vol. 13, No. 9, Sep. 1991, 16 pages.

G. Wang and T. Liao. Automatic identification of different types of welding defects in radiographic images. NDT&E International, 35(8):519-528 (2002), Elsevier Science Ltd., Great Britain.

H. Raafat and S. Taboun. An Integrated Robotic and Machine Vision System for Surface Flaw Detection and Classification. Computers & Industrial Engineering, Elsevier Science Ltd., Great Britain, 30(1):27-40, 1996.

I. Goodfellow, J. Pouget-Abadie, M. Mirza, B. Xu, D. Warde-Farley, S. Ozair, A. Courville, and Y. Ben-gio. Generative adversarial nets. Advances in Neural Information Processing Systems (NIPS 2014), pp. 2672-2680, 2014.

J. Deng, W. Dong, R. Socher, L.-J. Li, K. Li, and L. Fei-Fei. Imagenet: A large-scale hierarchical image database. In IEEE Conference on Computer Vision and Pattern Recognition, 2009 (CVPR 2009), Miami, Florida, pp. 248-255. IEEE 2009.

J. Long, E. Shelhamer, and T. Darrell. Fully Convolutional Networks for Semantic Segmentation. In Proceedings of the IEEE Conference on Computer Vision and Pattern Recognition (CVPR 2015), Boston, Mass., pp. 3431-3440, IEEE 2015.

J. Masci, U. Meier, D. Ciresan, J. Schmidhuber, and G. Fricout. Steel Defect Classification with Max-Pooling Convolutional Neural Networks. The 2012 International Joint Conference on Neural Networks (IJCNN), Brisbane, Australia, pp. 1-6. IEEE, Jun. 2012.

J. Redmon, S. Divvala, R. Girshick, and A. Farhadi. You Only Look Once: Unified, Real-Time Object Detection. Proceedings of the 2016 IEEE Conference on Computer Vision and Pattern Recognition (CVPR 2016), Las Vegas, Nevada, pp. 779-788, IEEE 2016.

K. He, X. Zhang, S. Ren, and J. Sun. Deep Residual Learning for Image Recognition. In Proceedings of the IEEE Conference on Computer Vision and Pattern Recognition (CVPR 2016), Las Vegas, Nevada, pp. 770-778, IEEE 2016.

K. Simonyan and A. Zisserman. Very Deep Convolutional Networks for Large-Scale Image Recognition. Submitted Sep. 4, 2014, for publication at 3d Int'l Conference on Learning Representations (ICLR 2015), San Diego, California. Presented May 7-9, 2015.

N. Srivastava, G. E. Hinton, A. Krizhevsky, I. Sutskever, and R. Salakhutdinov. Dropout: A Simple Way to Prevent Neural Networks from Overfitting. Journal of Machine Learning Research, 15(1):1929-1958, 2014.

S. Ioffe and C. Szegedy. Batch normalization: Accelerating deep network training by reducing internal covariate shift. In Proceedings of the 32nd International Conference on Machine Learning, Lille, France, pp. 448-456, 2015.

T.-Y. Lin, A. RoyChowdhury, and S. Maji. Bilinear CNN Models for Fine-Grained Visual Recognition. Proceedings of the 2015 IEEE International Conference on Computer Vision (ICCV), Santiago, Chile, pp. 1449-1457, IEEE 2015.

T.-Y. Lin, P. Goyal, R. Girshick, K. He, and P. Dollar. Focal Loss for Dense Object Detection. IEEE International Conference on Computer Vision (2017), pp. 966-974, IEEE 2017.

Y. Gao, O. Beijbom, N. Zhang, and T. Darrell. Compact bilinear pooling. In Proceedings of the IEEE Conference on Computer Vision and Pattern Recognition (CVPR 2016), Las Vegas, Nevada, pp. 317-326, IEEE 2016.

Y. Liu, K. Gadepalli, M. Norouzi, G.E. Dahl, T. Kohlberger, A. Boyko, S. Venugopalan, A. Timofeev, P.Q. Nelson, G.S. Corrado, et al. Detecting Cancer Metastases on Gigapixel Pathology Images. Google Research, Mar. 8, 2017.

\* cited by examiner

AERIAL VEHICLE HAVING JOINT(S)
SUBJECTED TO EXTERNAL
EXCITATION OVER FREQUENCY RANGE

AMPLITUDES AND PHASES OF VIBRATIONS
ON EITHER SIDE OF JOINT DETERMINED FROM FILTERED PORTIONS

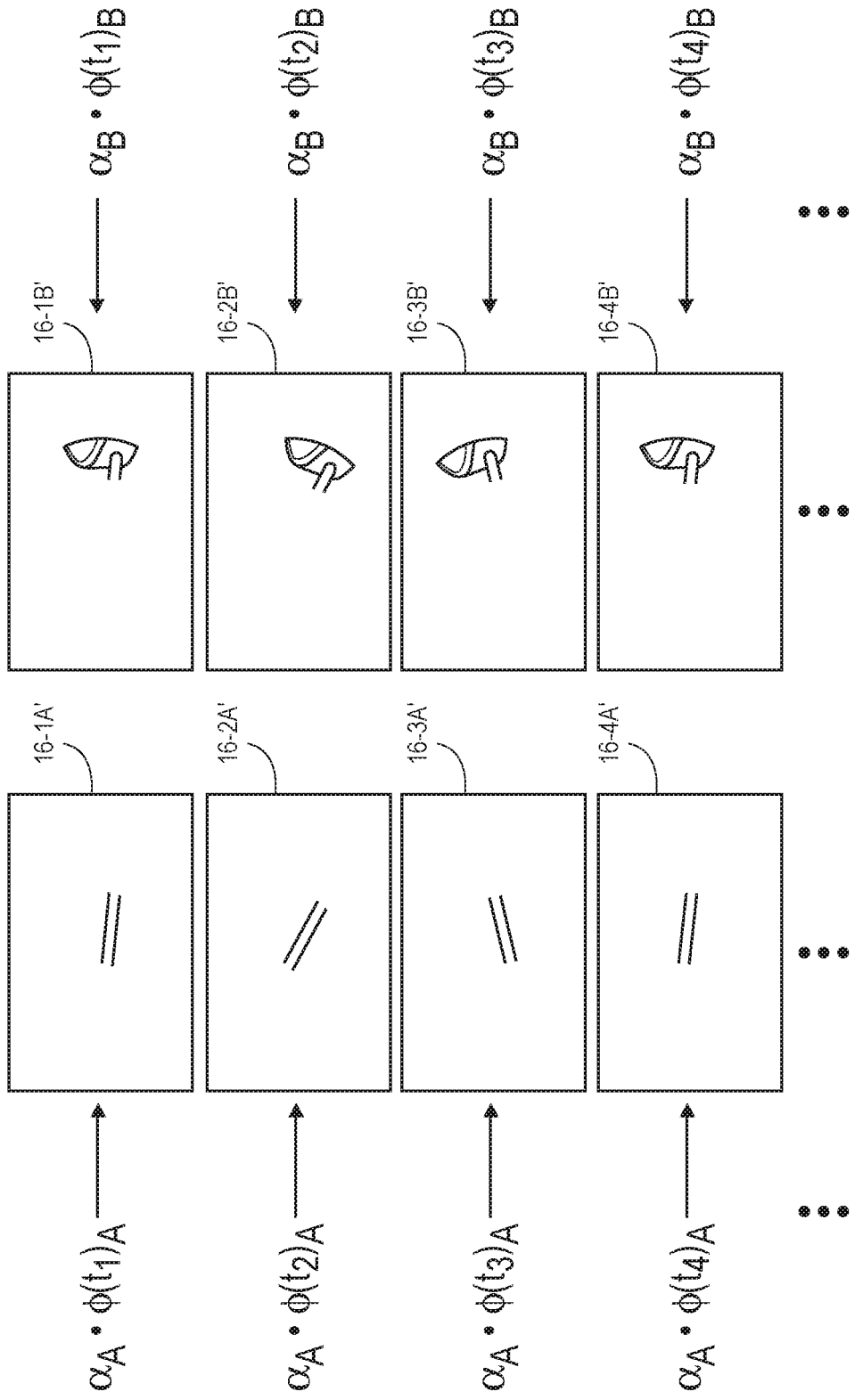

AERIAL VEHICLE SUBJECTED TO EXCITATION

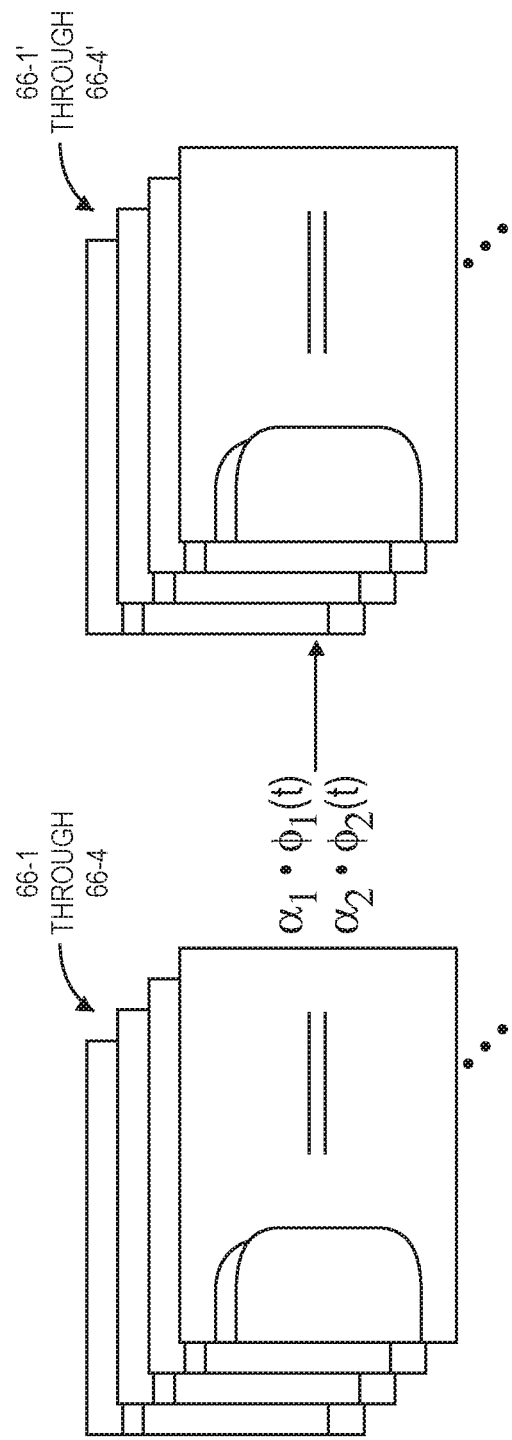

EXTERNALLY EXCITE JOINT

SELECT DISCRETE SETS OF PIXELS
ON SURFACES AROUND JOINT

VIDEO IMAGES CAPTURED DURING EXTERNAL
EXCITATION PROVIDED TO SERVER

GENERATE VIBROMETRIC SIGNATURE FOR EACH DISCRETE SET OF PIXELS

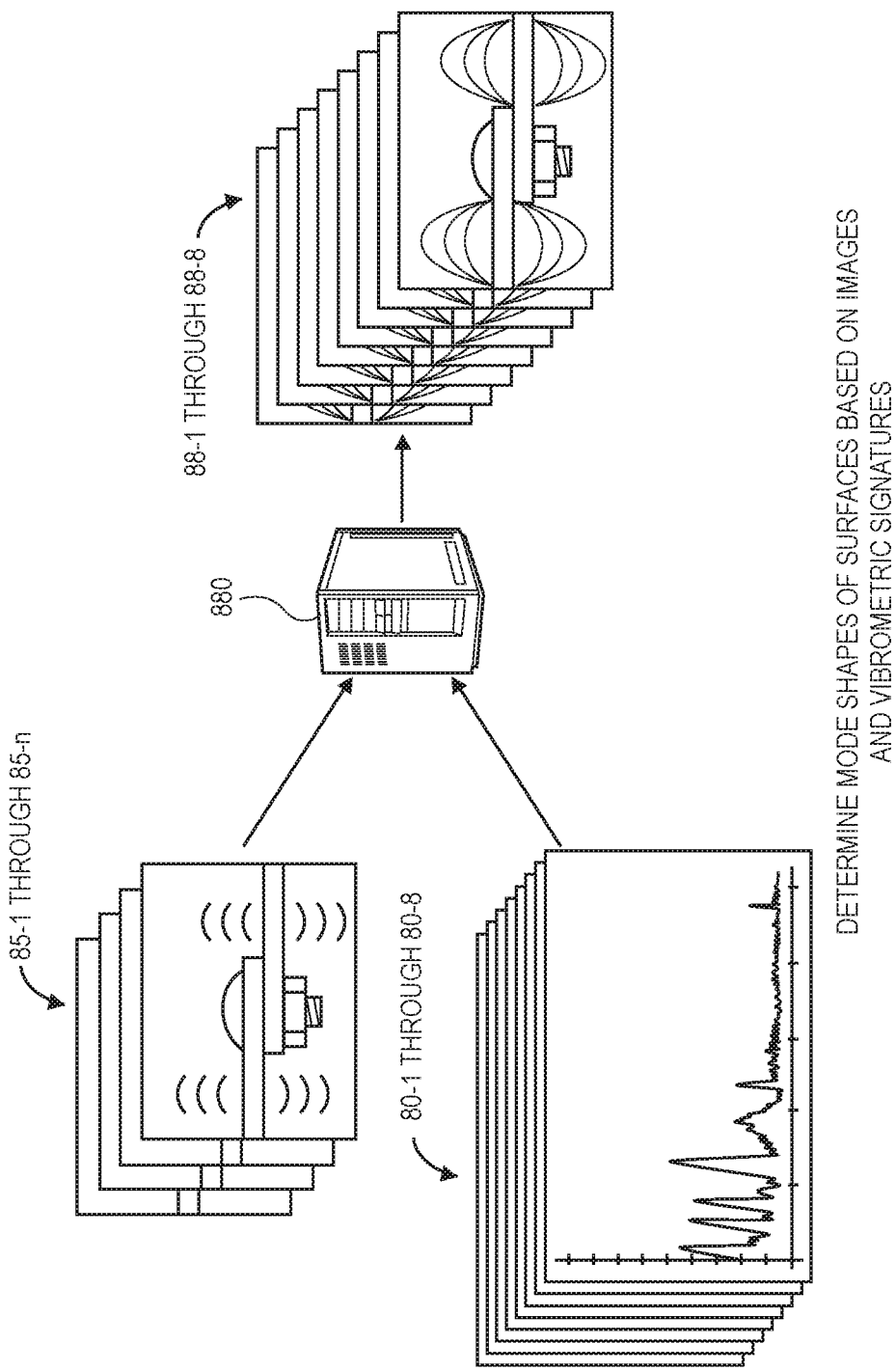

$$H(j\omega) = \begin{bmatrix} h_{11} & h_{12} & \cdots & h_{1n} \\ h_{21} & & & h_{2n} \\ \vdots & & & \vdots \\ h_{1n} & h_{2n} & \cdots & h_{nn} \end{bmatrix}$$

$h_{pq}$ = RELATIONSHIP BETWEEN DISPLACEMENT $X_p$ AT POINT p WITH FORCE $F_q$ AT POINT q $$[H(j\omega)] = \sum_{r=1}^{N} \frac{2j\omega_r Q_r \{V\}_r \{V\}_r^T}{(\theta_r^2 - \omega_r^2 - \omega^2) - 2q_r j\omega}$$

N = NO. OF VIBRATIONAL MODES FOR POINT $\omega_r$ = NATURAL FREQUENCY OF MODE r = $(f_N)_r / 2\pi$ $\theta_r$ = DAMPING $\{V\}_r$ = DEFORMATION SHAPE $Q_r$ = CONSTANT FOR EACH MODE r BASED ON AMPLITUDE OF RESPONSE

FIG. 8G

FREQUENCY RESPONSE          STRUCTURAL EQUATION $\{X(j\omega)\} = [H(j, \omega)] \cdot \{F(j\omega)\} \longleftrightarrow [m]\ddot{x}(t) + [C]\dot{x}(t) + [k]x(t) = F(t)$ (FREQUENCY DOMAIN)              (TIME DOMAIN)

DETERMINE $[H(j, \omega)]$ ⟶ INVERSE FOURIER TRANSFORM ⟶ DETERMINE $[m], [C], [k]$ WHERE  $[m]$ = MASS MATRIX OF JOINT AT POINTS x
       $[C]$ = DAMPING OF JUNCTION AT POINTS x
       $[k]$ = STIFFNESS OF JUNCTION AT POINTS x

FIG. 8H

EVALUATING JOINTS USING VIBROMETRIC SIGNATURES

BACKGROUND

Aerial vehicles such as airplanes or helicopters are commonly used to transport people or cargo from origins to destinations by air. Aerial vehicles may be formed from lightweight metals, plastics or composites and equipped with motors, rotors or other systems that are designed to meet or exceed a number of operational constraints or requirements including speed, altitude or lift. For example, many aerial vehicles (such as UAVs, or drones) are built from molded plastic frames and outfitted with electric motors powered by onboard batteries or other power sources that permit the vehicles to conduct lifting or thrusting operations, while larger aerial vehicles such as jumbo jets feature aluminum, titanium or carbon fiber frames and skins and are equipped with petroleum-powered jet engines capable of generating tens of thousands of pounds-force.

Components of aerial vehicles are frequently coupled at joints (or junctions), which may be established using one or more bolts, screws, rivets, adhesives or other fasteners. During flight operations, joints are typically subjected to shocks or other adverse effects, which may result in cracks, fissures or other manifestations of stress or strain. Evaluating a joint to identify any such cracks or fissures, or to make a determination regarding the strength or integrity of a joint, is particularly challenging because such cracks or fissures are typically microscopic in size. Additionally, every joint may behave or perform differently during flight operations.

Where a joint is rigidly established between two or more members, e.g., by one or more sufficiently tightened bolts or screws, or in any other manner, the members and the joint should behave as a single member when subjected to vibration, in that vibration energy imparted upon one of the members is transferred to another of the members at a frequency having a constant phase and amplitude across the joint. Where a joint is not rigidly established, however, vibration energy imparted upon one of the members is transferred from one of the members to another of the members at a frequency that is subjected to a lag, or a phase shift, or a frequency that has a different amplitude.

BRIEF DESCRIPTION OF THE DRAWINGS

FIGS. 1A through 1K are views of aspects of one system for evaluating joints using vibrometric signatures in accordance with embodiments of the present disclosure.

FIGS. 6A through 6H are views of aspects of one system for evaluating joints using vibrometric signatures in accordance with embodiments of the present disclosure.

FIGS. 8A through 8H are views of aspects of one system for evaluating joints using vibrometric signatures in accordance with embodiments of the present disclosure.

DETAILED DESCRIPTION

Figure 1A:
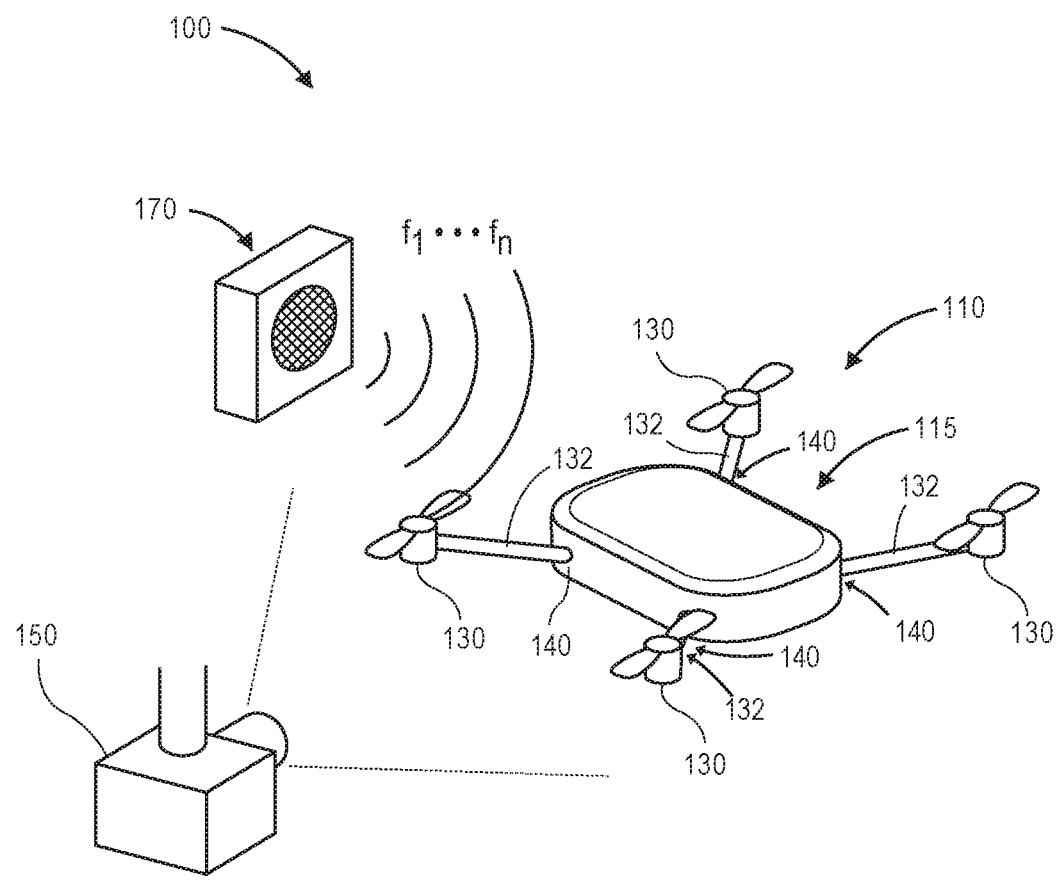

As is set forth in greater detail below, the present disclosure is directed to generating vibrometric signatures of a joint (e.g., a set of one or more frequencies where vibration of the vehicle is naturally observed), and using the vibrometric signatures to make one or more determinations regarding the integrity or suitability of the vehicle. More specifically, the systems and methods of the present disclosure are directed to imparting excitation upon a joint (or a joint or another portion) of a vehicle such as an unmanned aerial vehicle, or drone, or component thereof, e.g., where two or more components of the vehicle are coupled together, by subjecting the vehicle as a whole or the joint in particular to excitation at varying frequencies. Imaging data captured during the excitation is used to determine frequencies at which the vehicle naturally vibrates, and vibrometric signatures for portions of the vehicle on different or opposing sides of the joint are calculated to include a set of frequencies at which vibrations are naturally observed. A natural frequency of vibration may be identified where a power level or an energy level of vibration, or deviations in positions of pixels, are sufficiently greater than at other frequencies during the excitation.

Vibrometric signatures determined for portions of a vehicle that are coupled at a joint may be compared to one another, to determine whether the integrity of the joint is sound, viz., whether the joint is sufficiently tight to support airborne operations, or whether further evaluation is required, such as to determine whether the joint is loose or is otherwise not sufficiently tight, or whether the joint may support airborne operations. Furthermore, after natural frequencies of vibration or natural vibrational modes are identified for the respective portions of the vehicle, the imaging data may be further subjected to spatial and temporal processing to detect vibrations or other motion of the objects, even where such vibrations or motion are small in magnitude, and to determine mode shapes of the joint based on such vibrations or motion.

Once information regarding the natural frequencies of vibration and the mode shapes are determined, indications of the suitability of the joint, such as material properties including a mass matrix, a damping, or a stiffness of the joint, may be calculated from such information accordingly. Within a time domain, a force applied at a first point at a given time is determined as a sum of a product of a mass matrix and acceleration at a second point at the given time, a product of damping and velocity at the second point at the given time, and a product of stiffness and position at the second point at the given time. Within a frequency domain, displacement as a function of frequency is equal to a product of a transfer function or matrix (or a frequency response function or matrix) and force as a function of frequency. Because a vibrometric signature, e.g., a power spectral diagram or other representation of power or energy associated with vibration with respect to a variety of frequencies, resides in the frequency domain, parameters determined from a vibrometric signature calculated for any point associated with a joint may be used to determine indications of the integrity or suitability of the joint, such as a transfer function for the joint. A transfer function for a joint that was determined in the frequency domain may then be transformed (viz., inversely transformed) to determine a corresponding transfer function for the joint in the time domain, from which properties such as a mass matrix of the joint, a damping of the joint, or a stiffness of the joint, may be determined.

Referring to FIGS. 1A through 1K, views of aspects of one system 100 for evaluating joints using vibrometric signatures in accordance with embodiments of the present disclosure are shown. As is shown in FIG. 1A, the system 100 includes an aerial vehicle 110 (e.g., an unmanned aerial vehicle, or drone), an imaging device 150 (e.g., a digital camera) and an acoustic speaker 170 (or another excitation source). The aerial vehicle 110 includes a frame 115 having a plurality of motors 130, each of which is coupled to the frame 115 by an extension (or arm, appurtenance or other component) 132 that contacts the frame 115 at a joint (or junction) 140. Each of the motors 130 is coupled to a propeller or other rotor by a drive shaft and configured to rotate the propeller about an axis defined by the drive shaft. The imaging device 150 is aligned to include all or portions of the aerial vehicle 110 within a field of view, including one or more of the motors 130, the extensions 132 and the joints 140.

The acoustic speaker 170 is also aligned to project acoustic energy in the form of sounds having any frequency, wavelength or intensity upon one or more portions of the aerial vehicle 110. Alternatively, in lieu of the acoustic speaker 170, or in addition to the acoustic speaker 170, any other excitation source that is configured to excite the aerial vehicle 110 at known, selected frequencies with the aerial vehicle 110 within a field of view of the imaging device 150, e.g., by direct contact with the aerial vehicle 110 or in any other manner, may be utilized to impart excitation upon the aerial vehicle 110. For example, in some embodiments, one or more of the motors 130 may act as an excitation source for the aerial vehicle 110, where such motors 130 may be specifically controlled to impart excitation upon the aerial vehicle 110 at one or more selected frequencies within a known, defined range.

The acoustic speaker 170 may be programmed with an excitation schedule or other set of instructions by which acoustic energy may be projected at constant or varying intensities and over a defined range of frequencies $f_1 \ldots f_n$, e.g., linearly, according to a step function, a delta function, or in any other manner. For example, in some embodiments, the acoustic speaker 170 may excite the aerial vehicle 110 by acoustic energy at a selected frequency for a predetermined period of time to enable imaging data to be captured and/or processed using the imaging device 150, before exciting the aerial vehicle 110 at another selected frequency.

Figure 1B:
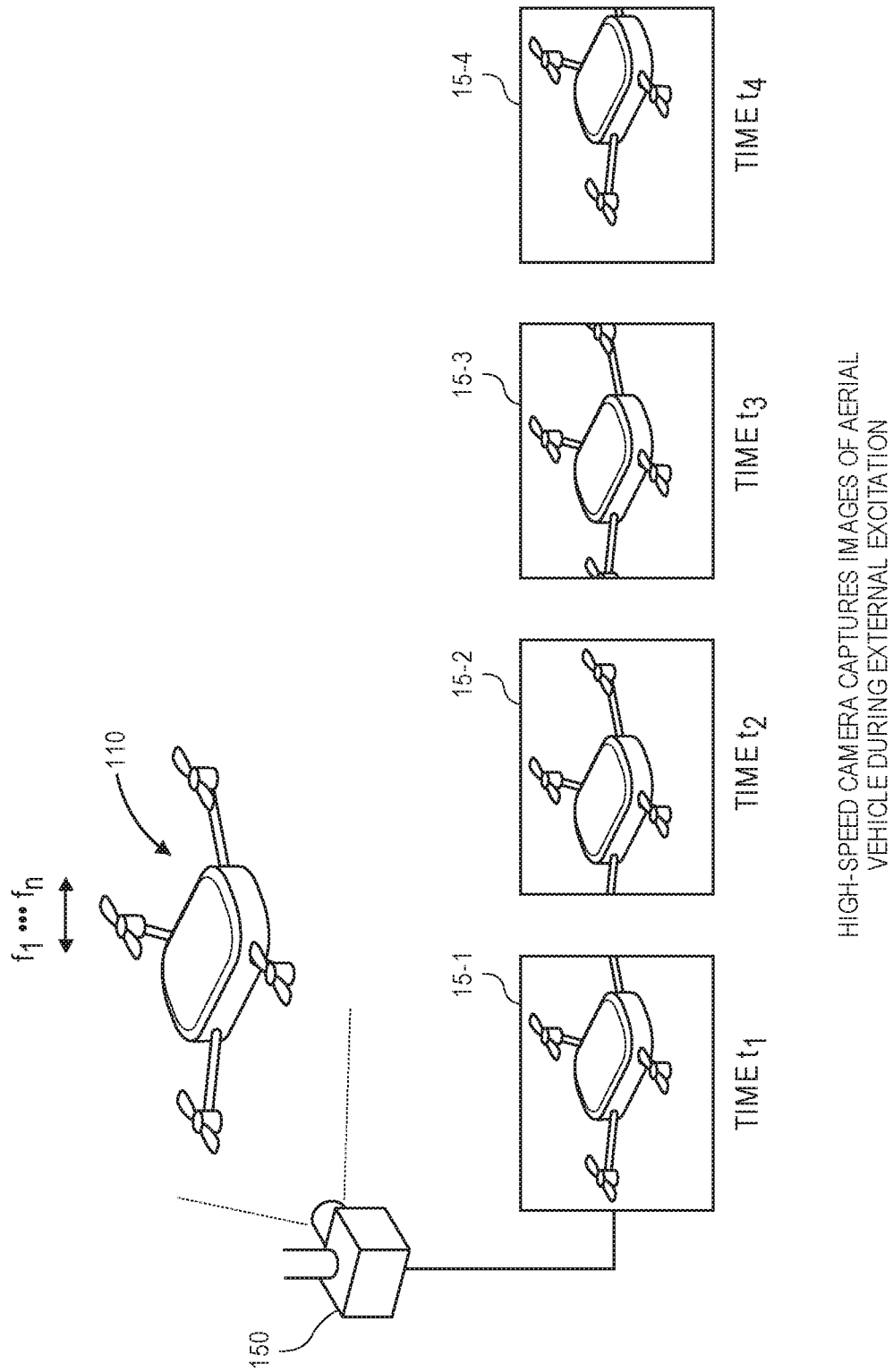

As is shown in FIG. 1B, as the acoustic speaker 170 imparts acoustic energy upon the aerial vehicle 110 over the defined range of frequencies $f_1 \ldots f_n$, a first plurality of images 15-1, 15-2, 15-3, 15-4 are captured at times $t_1$, $t_2$, $t_3$, $t_4$ by the imaging device 150. In some embodiments, the imaging device 150 may be programmed or configured to capture digital images at a high speed or frame rate, such as two thousand frames per second (2,000 fps), four thousand frames per second (4,000 fps), or greater. In some embodiments, the speed or frame rate at which the imaging device 150 captures the images 15-1, 15-2, 15-3, 15-4 is preferably at least twice a maximum frequency of the excitation.

Figure 1C:
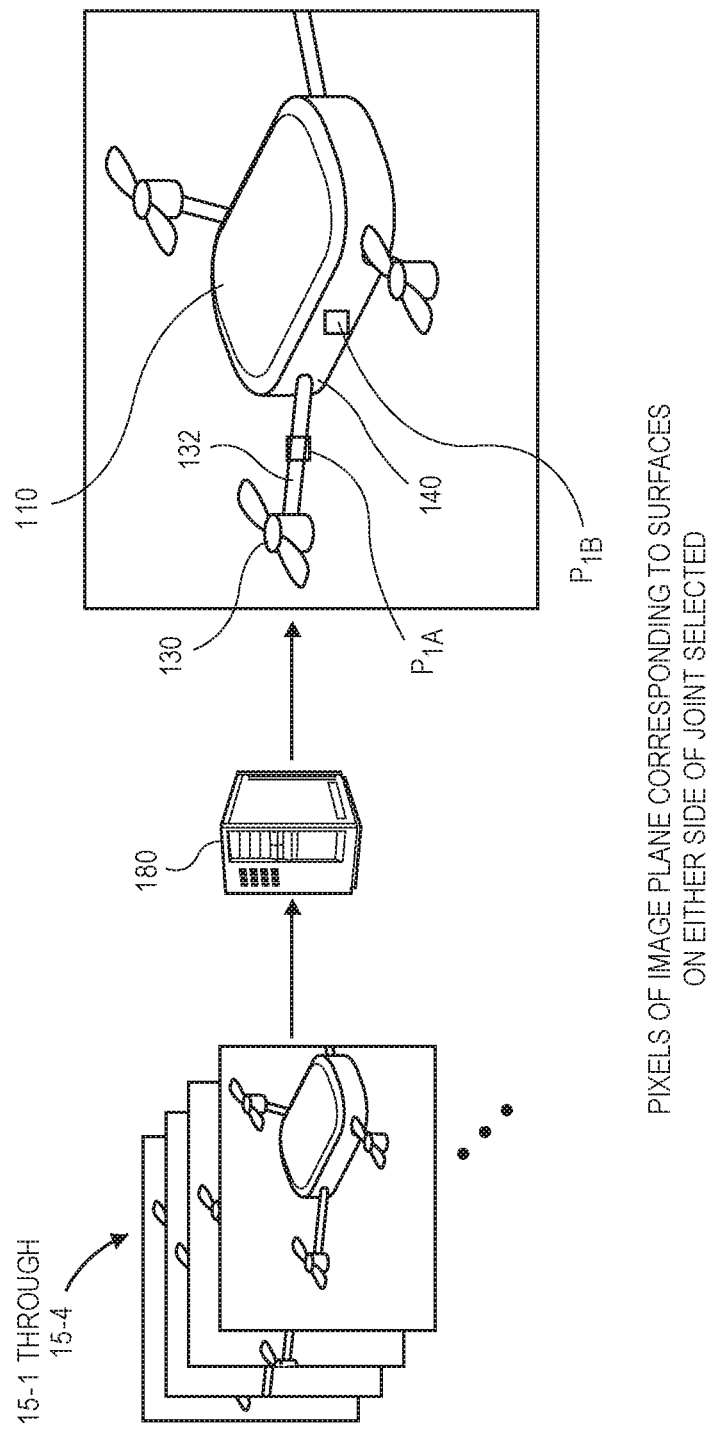

In accordance with some embodiments of the present disclosure, vibrations or other motion of a portion of an object, such as an aerial vehicle (e.g., the aerial vehicle 110), may be determined by selecting one or more pixels of an image plane of a digital camera or other imaging device (e.g., the imaging device 150) corresponding to the portion of the object, capturing digital images of the object, and determining intensities of the pixels. As is shown in FIG. 1C, the plurality of images 15-1, 15-2, 15-3, 15-4 are provided to a server 180, e.g., over a network. Pixels (or collections of pixels) $P_{1A}$, $P_{1B}$ of an image plane that correspond to one or more external surfaces of the aerial vehicle 110 on either side of one of the joints 140, viz., on one of the extensions 132 and on a portion of the frame 115, are selected from the plurality of images 15-1, 15-2, 15-3, 15-4. The pixels $P_{1A}$, $P_{1B}$ may be selected on any basis, including properties or features of the aerial vehicle 110 that are depicted in the pixels $P_{1A}$, $P_{1B}$ (e.g., specific surfaces of the aerial vehicle 110) and for which vibration or motion properties are desired. In some embodiments, the pixels $P_{1A}$, $P_{1B}$ may be clustered at or around a single portion of the aerial vehicle 110 for which vibration or motion properties are desired. For example, the pixels $P_{1A}$, $P_{1B}$ shown in FIG. 1C may correspond to single image pixels at respective locations in an image plane of the imaging device 150, or, alternatively, collections of pixels at the specific locations, and may be selected in order to generally evaluate the vibration or motion properties of the aerial vehicle 110 at the specific locations on either side of one of the joints 140. Alternatively, the pixels $P_{1A}$, $P_{1B}$ may be distributed throughout or across one or more surfaces of the aerial vehicle 110, and selected in order to generally evaluate the vibration or motion properties of the aerial vehicle 110 at multiple locations on either side of one of the joints 140.

Figure 1D:
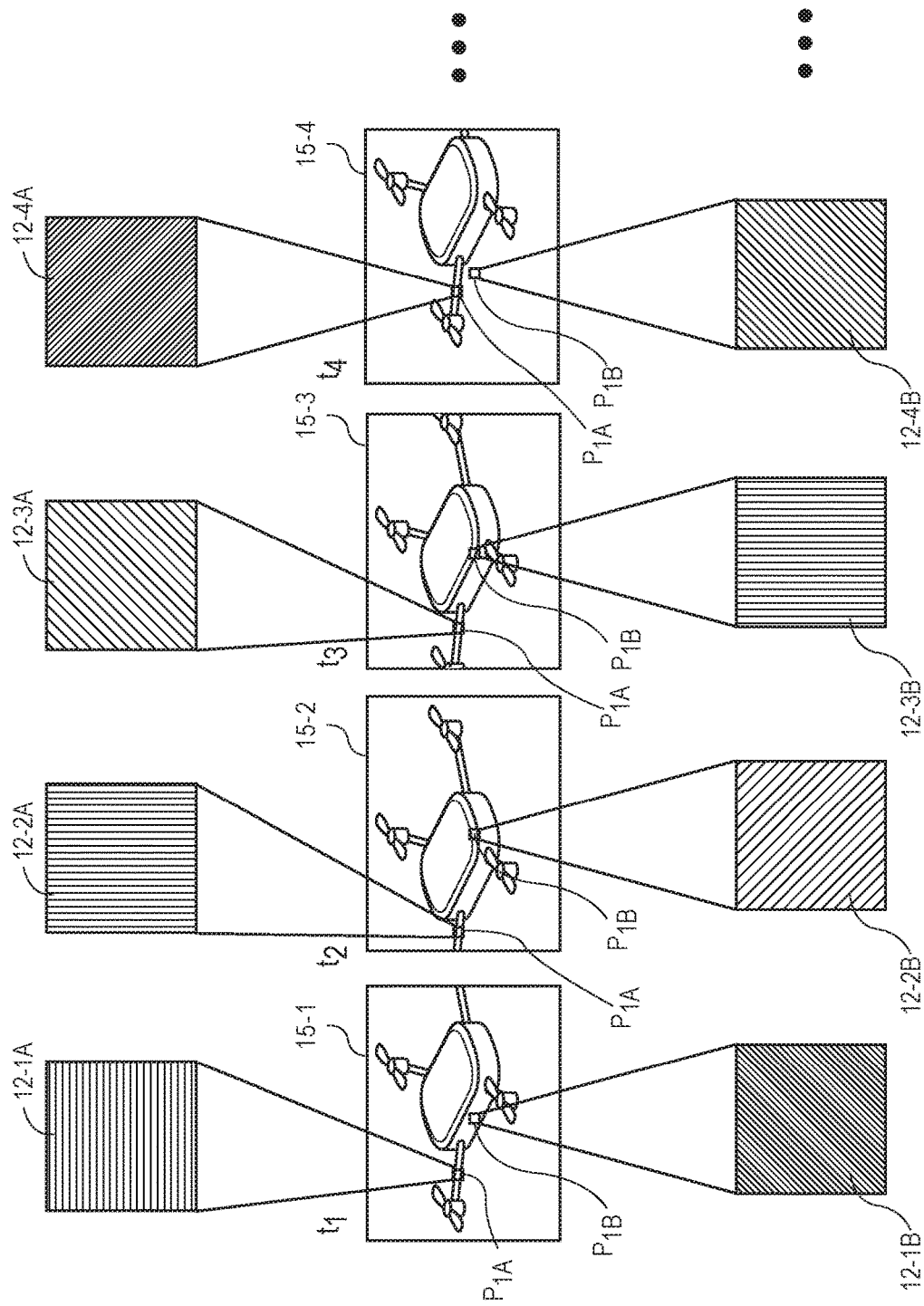
Figure 1E:
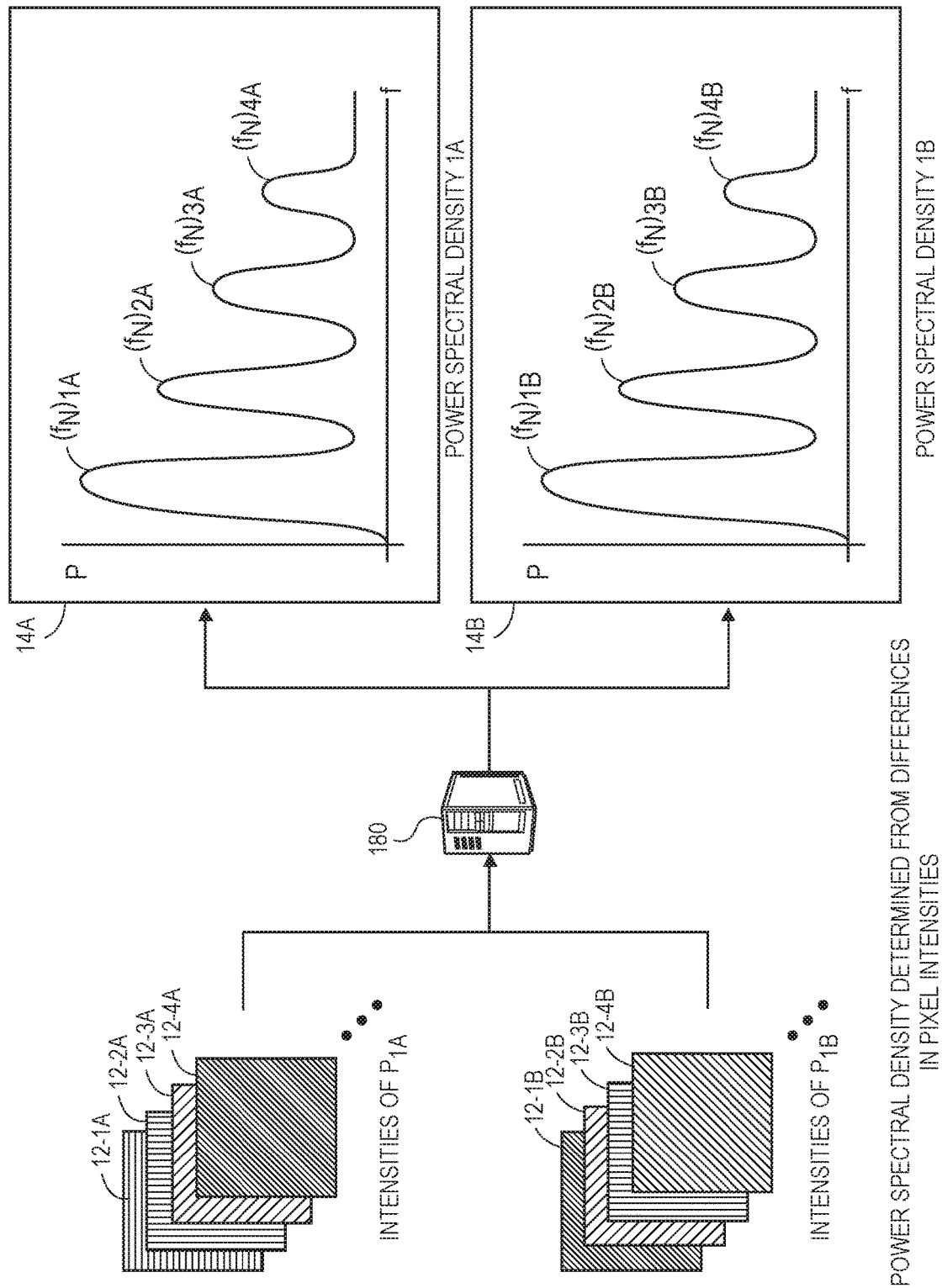

As is shown in FIG. 1D, a plurality of intensities 12-1A, 12-2A, 12-3A, 12-4A of the pixels $P_{1A}$ corresponding to one of the extensions 132 and a plurality of intensities 12-1B, 12-2B, 12-3B, 12-4B of the pixels $P_{1B}$ in the respective images 15-1, 15-2, 15-3, 15-4 is determined. Due to the excitation by the excitation source 170, portions of the aerial vehicle 110 may appear differently from image to image, in a repeated or oscillating manner. As is shown in FIG. 1E, the intensities 12-1A, 12-2A, 12-3A, 12-4A of the pixels $P_{1A}$ and the intensities 12-1B, 12-2B, 12-3B, 12-4B of the pixels $P_{1B}$ in each of such images 15-1, 15-2, 15-3, 15-4 captured during the excitation of the aerial vehicle 110 over the range of frequencies $f_1 \ldots f_n$ may, therefore, be used to determine power spectral densities 14A, 14B of the respective surfaces on either side of the joint 140, viz., the surface of the frame 115 corresponding to the pixels $P_{1A}$ and the surface of the one of the extensions corresponding to the pixels $P_{1B}$, such as by transforming the intensities 12-1, 12-2, 12-3, 12-4. For example, in some embodiments, time series of the intensities of the pixels $P_{1A}$, $P_{1B}$, e.g., sets of values of such intensities and the corresponding times at which images having the pixels $P_{1A}$, $P_{1B}$ with such intensities were captured, may be formed. Transformations (e.g., a fast Fourier transform) may be applied to the time series in order to determine the power spectral densities 14A, 14B.

As is also shown in FIG. 1E, the power spectral densities 14A, 14B depicts vibration powers as functions of frequency over the range of frequencies $f_1 \ldots f_n$, and natural frequencies $(f_N)_{1A}$, $(f_N)_{2A}$, $(f_N)_{3A}$, $(f_N)_{4A}$ of vibration of the portion of the frame 115 corresponding to the pixels $P_{1A}$ and natural frequencies $(f_N)_{1B}$, $(f_N)_{2B}$, $(f_N)_{3B}$, $(f_N)_{4B}$ of vibration of the portion of the extension 132 corresponding to the pixels $P_{1B}$ may be located at frequencies corresponding to local or absolute maximum levels of power or energy. Each of the power spectral densities 14A, 14B may depict any number of natural frequencies of vibration of the frame 115 or the extension 132 at such peaks, e.g., four each, such as is shown in FIG. 1E, or any other number of natural frequencies.

Figure 1F:
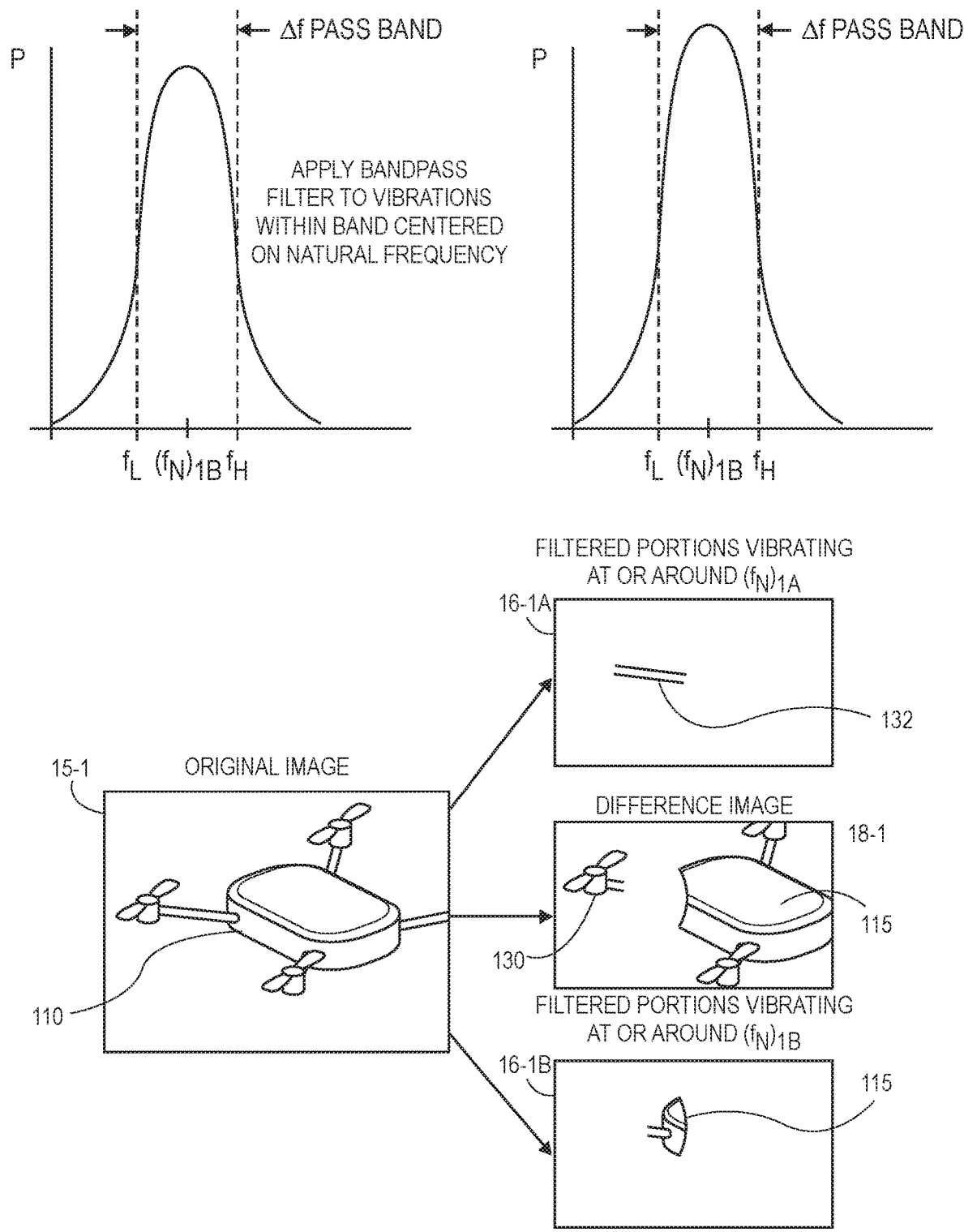
Figure 1G:
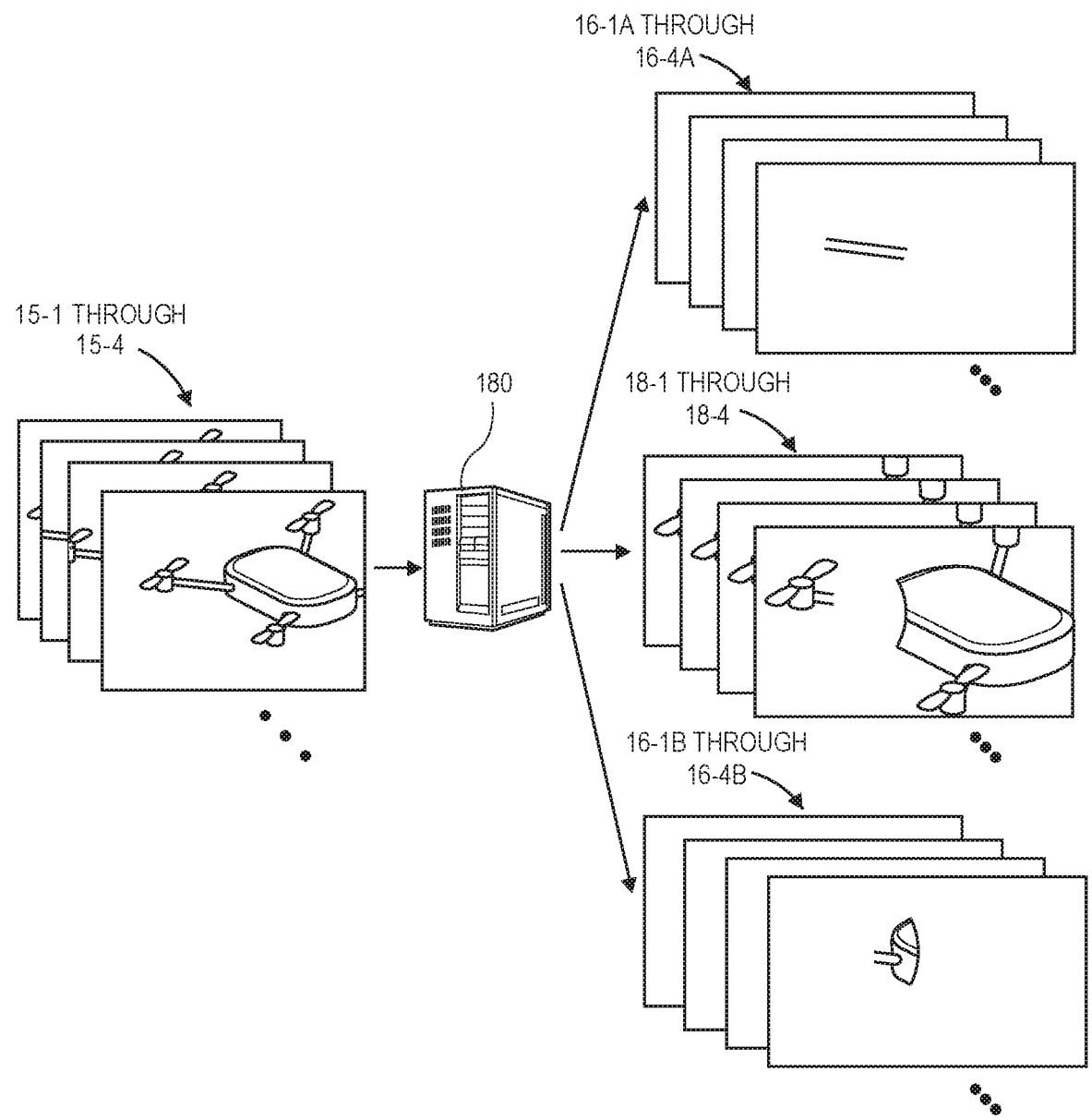

After the natural frequencies of vibration of objects on either side of a joint, viz., the joint 140 between the frame 115 and the one of the extensions 132, are determined, each of the images 15-1, 15-2, 15-3, 15-4 may be provided to a filter, such as a band-pass filter having a band centered on one of the natural frequencies of vibration, in order to consider only vibrations of the object within the band, or vibrations corresponding to one of the natural frequencies. Each of the images 15-1, 15-2, 15-3, 15-4 of the sequence is decomposed to determine sequences of amplitudes and phases of the vibration of the joint 140. For example, as is shown in FIGS. 1F and 1G, each of the images 15-1, 15-2, 15-3, 15-4 is provided to a band-pass filter centered on natural frequencies $(f_N)_{1A}$, $(f_N)_{1B}$ in order to identify filtered portions 16-1A, 16-2A, 16-3A, 16-4A or filtered portions 16-1B, 16-2B, 16-3B, 16-4B of the respective images 15-1, 15-2, 15-3, 15-4 that depict vibrations of the frame 115 and the extension 132, respectively, on either side of the joint 140 at frequencies within passbands $\Delta f$, viz., at or around the natural frequencies $(f_N)_{1A}$, $(f_N)_{1B}$ or above a low-pass frequency $f_L$ and below a high-pass frequency $f_H$. Additionally, filtering the images 15-1, 15-2, 15-3, 15-4 also results in the generation of difference images 18-1, 18-2, 18-3, 18-4, each of which depicts a difference between one of the images 15-1, 15-2, 15-3, 15-4 and corresponding portions 16-1A, 16-2A, 16-3A, 16-4A or portions 16-1B, 16-2B, 16-3B, 16-4B extracted therefrom. In some embodiments, the images 15-1, 15-2, 15-3, 15-4 may be provided first to a high-pass filter, and next to a low-pass filter, or vice versa, rather than providing the images 15-1, 15-2, 15-3, 15-4 to a band-pass filter.

Figure 1H:
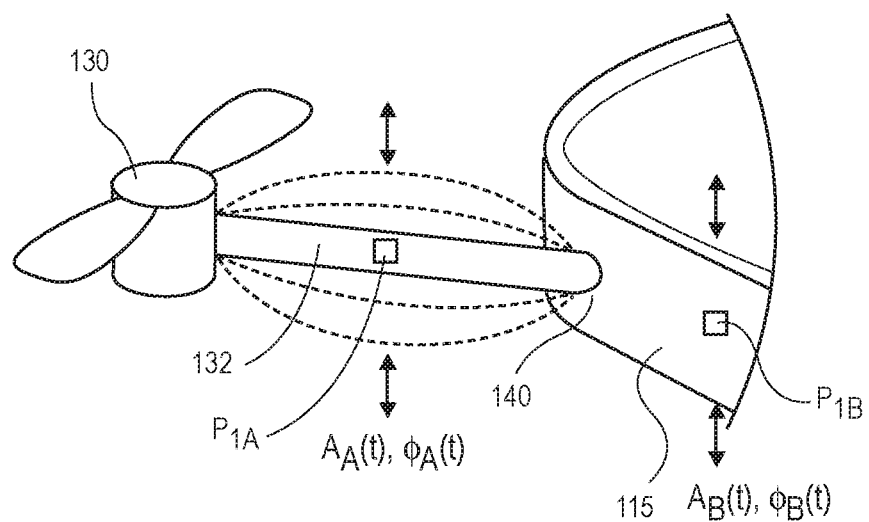

As is shown in FIG. 1H, amplitudes $A_A(t)$ and phases $\phi_A(t)$ of vibration of the extension 132 and amplitudes $A_B(t)$ and phases $\phi_B(t)$ of vibration of the frame 115 in response to the excitation by acoustic energy from the acoustic speaker 170 may be determined from each of the portions 16-1A, 16-2A, 16-3A, 16-4A and each of the portions 16-1B, 16-2B, 16-3B, 16-4B filtered from the images 15-1, 15-2, 15-3, 15-4. For example, each of such portions 16-1A, 16-2A, 16-3A, 16-4A and each of such portions 16-1B, 16-2B, 16-3B, 16-4B may be provided to an optical flow algorithm, a matching algorithm, or any other algorithm that receives portions 16-1, 16-2, 16-3, 16-4 as inputs and determines horizontal and/or vertical disparities between pixels appearing within each of the images as outputs of the optical flow algorithm. Such outputs may include a disparity image, a displacement image or a parallax image indicating disparities, displacements and/or parallax between points appearing within each of the portions 16-1A, 16-2A, 16-3A, 16-4A or each of the portions 16-1B, 16-2B, 16-3B, 16-4B. One or more algorithms may be further configured to determine the phases of vibration of the portions 16-1A, 16-2A, 16-3A, 16-4A or the portions 16-1B, 16-2B, 16-3B, 16-4B over time, e.g., based on the amplitudes or relative displacements of the portions 16-1A, 16-2A, 16-3A, 16-4A or the portions 16-1B, 16-2B, 16-3B, 16-4B.

As is shown in FIG. 1I, each of the phases $\phi_A(t)$, $\phi_B(t)$ of the extension 132 and the frame 115 determined from the portions 16-1A, 16-2A, 16-3A, 16-4A or the portions 16-1B, 16-2B, 16-3B, 16-4B may be multiplied by an amplification factor $\alpha_A$, $\alpha_B$ in order to synthetically exaggerate the vibration of aspects of the aerial vehicle 110 appearing within the portions 16-1A, 16-2A, 16-3A, 16-4A or the portions 16-1B, 16-2B, 16-3B, 16-4B over time. Multiplying each of the phases of the aspects of the aerial vehicle 110 over time by the amplification factors $\alpha_A$, $\alpha_B$ thus results in new portions 16-1A', 16-2A', 16-3A', 16-4A' and 16-1B', 16-2B', 16-3B', 16-4B' depicting motion of the extension 132 and the frame 115 in a magnified fashion.

Figure 1J:
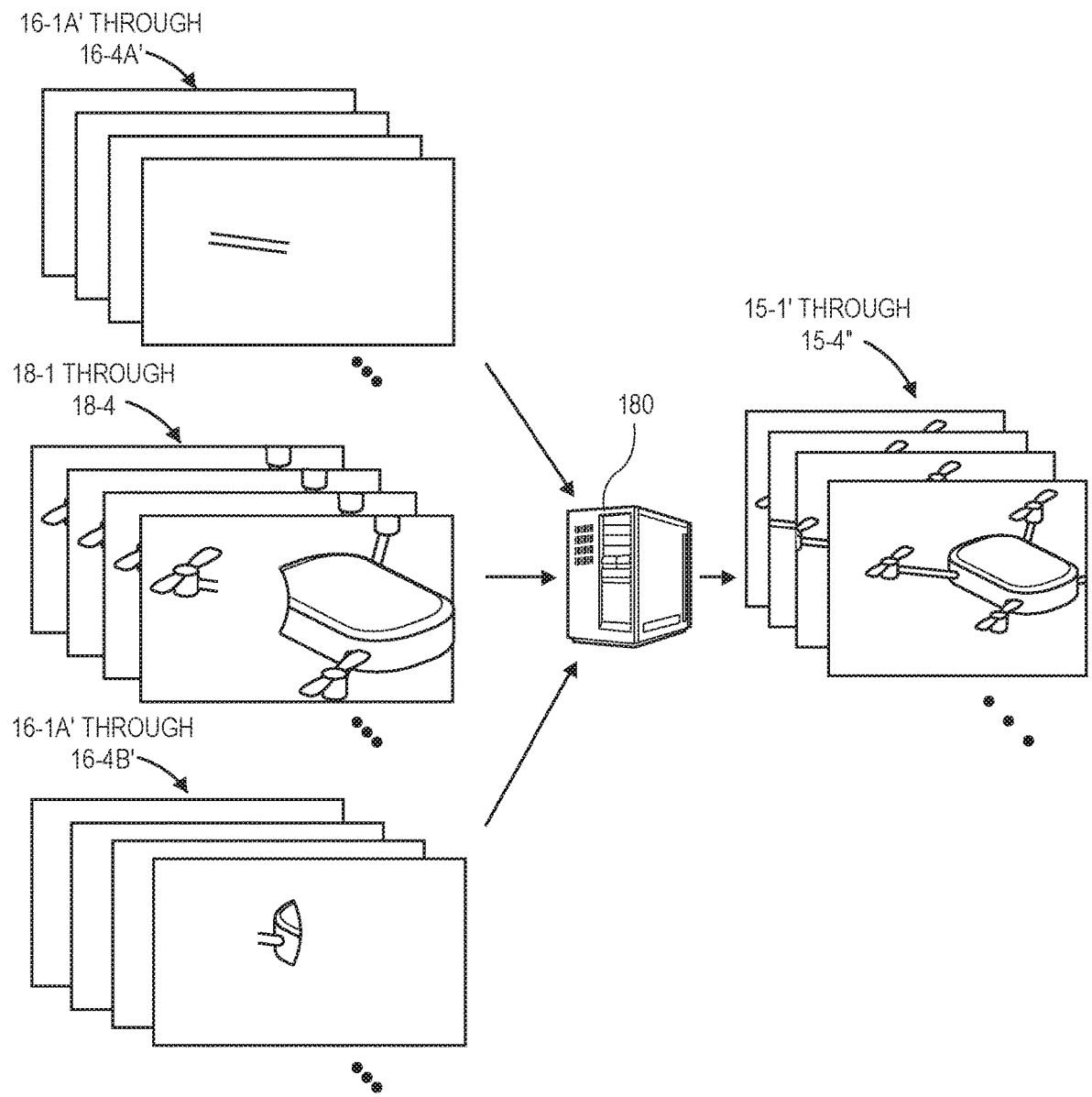
Figure 1K:
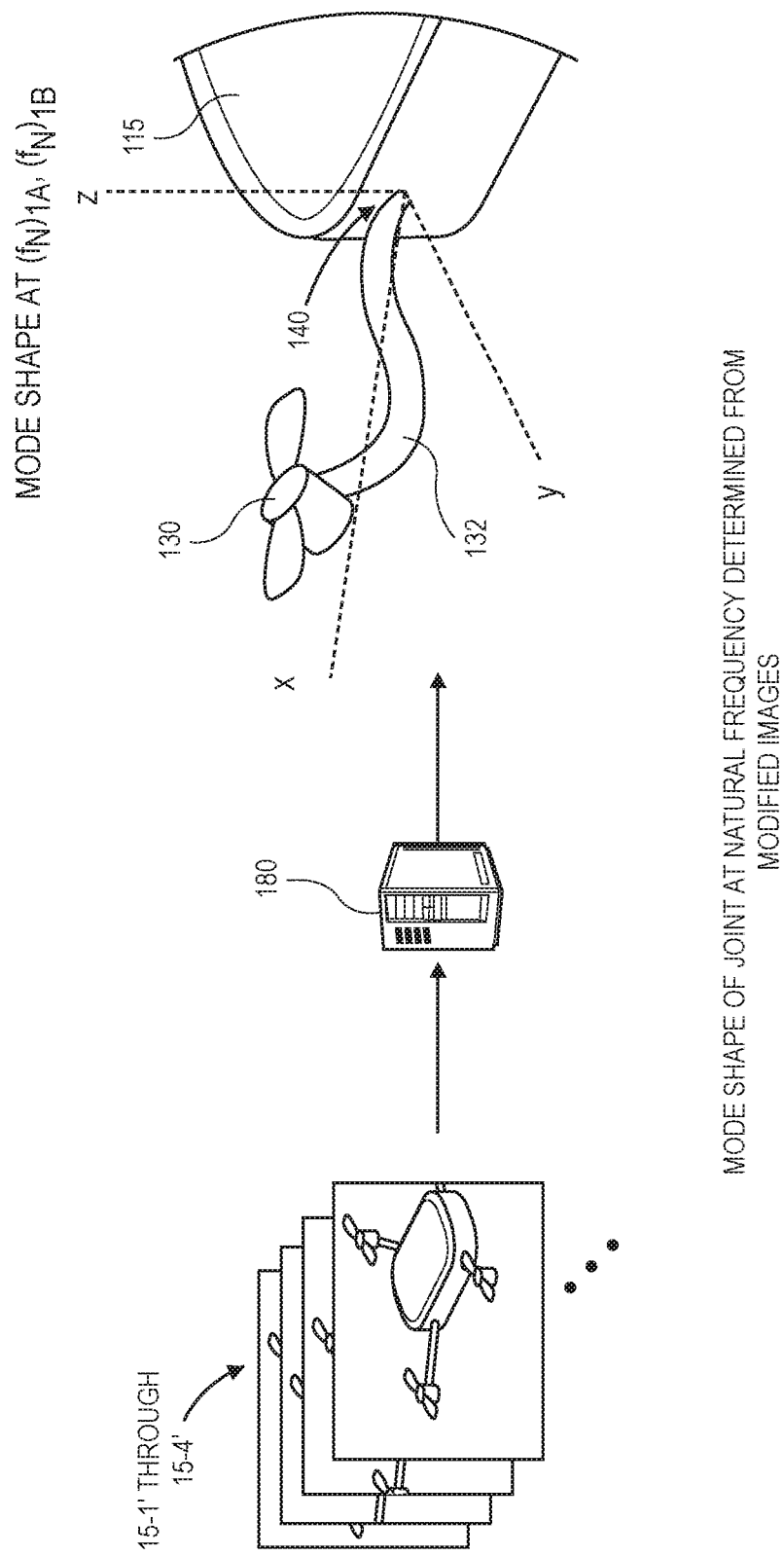

As is shown in FIG. 1J, a second plurality of images 15-1', 15-2', 15-3', 15-4' may be formed by synthetically recombining the magnified filtered portions 16-1A', 16-2A', 16-3A', 16-4A' and the magnified filtered portions 16-1B', 16-2B', 16-3B', 16-4B' with the difference images 18-1, 18-2, 18-3, 18-4 which resulted from the filtering of the images 15-1, 15-2, 15-3-, 15-4 as shown in FIGS. 1F and 1G. As is shown in FIG. 1K, combining the plurality of images 15-1', 15-2', 15-3', 15-4' into a stream results in a visual tool that depicts, in a magnified fashion, the effects of vibration at the natural frequencies $(f_N)_{1A}$, $(f_N)_{1B}$ on the aerial vehicle 110, e.g., on the frame 115 and the extension 132, from which a mode shape, or a spatial distribution or model of the behavior of the joint 140 in the presence of vibration at the natural frequency $(f_N)_{1A}$, $(f_N)_{1B}$ may be generated. By amplifying the vibration of the aerial vehicle 110 based on the differences in phase, the vibration of the frame 115 and the extension 132 may be visibly perceived within the modified images 15-1', 15-2', 15-3', 15-4' to a greater extent than within the images 15-1, 15-2, 15-3, 15-4. In some embodiments, a time-series analysis may be performed on the modified images 15-1', 15-2', 15-3', 15-4', and a stream of the modified images 15-1', 15-2', 15-3', 15-4' may be used to determine the mode shape of the vibration of the joint 140 at the natural frequencies $(f_N)_{1A}$, $(f_N)_{1B}$.

Accordingly, in some embodiments, the systems and methods of the present disclosure may capture imaging data as an object (e.g., a vehicle, such as an unmanned aerial vehicle, or drone) having a joint or a junction is subject to excitation over a range of frequencies by an extrinsic or intrinsic source. One or more sets of pixels of image planes that depict surfaces or other portions of interest on different sides or in different positions with respect to the joint or junction may be selected, and intensities of the sets of pixels across a plurality of images may be determined. Time series of each of the intensities of the sets of pixels may be formed, and a fast Fourier transform or other transformation may be applied to the time series to generate power spectral density plots or diagrams depicting powers of vibration as functions of frequency. Additionally, each of the images may be processed by band-pass filters applied across bands centered on natural frequencies of vibration for the corresponding aspects on either side of a joint or a junction to consider only vibrations at or around the natural frequencies for amplification. The images may be processed to determine their respective amplitudes and phases of vibration, and time series analysis applied to each of multiple images may result in modified images that magnify the vibration or other motion based on phases. A plurality of the modified images may be combined into a stream in order to visually depict the vibration or motion in a magnified manner, or to determine a mode shape of the vibration or motion.

Vehicles, such as aerial vehicles, are typically evaluated from time to time to check for failures or deficiencies in materials and components. Because aerial vehicles commonly radiate noise and/or other vibrations in response to thrust or lift forces, flow conditions, impacts or other adverse events, aerial vehicles must be routinely tested to properly assess risks of failure of a specific component, or of a joint between two or more components, of an aerial vehicle as a whole, or of aerial vehicles in a class or fleet. Whether conditions or deficiencies exist on an aerial vehicle may be assessed with respect to structural components, control surfaces, motors, propellers or appurtenances such as landing gear by performing one or more testing evolutions.

A vibrometric signature, or a set of natural frequencies of vibration, may be determined for an object, such as a joint of two or more components of a vehicle, by subjecting the object to excitation across a range of frequencies, and capturing images of the object during the excitation. Natural frequencies of vibration or natural vibrational modes may be determined for surfaces on either side of a joint or a junction by analyzing differences in pixel intensities (e.g., blurring) across consecutive image frames. For example, in some embodiments, a joint or a junction of an object (such as a vehicle) may be subjected to excitation over a range of frequencies, e.g., by an acoustic speaker, or by direct contact with the object. Imaging data may be captured during the excitation using a substantially high-speed camera or other imaging device, e.g., at or above frame rates of two thousand to four thousand frames per second (2,000 to 4,000 fps). One or more image pixels (or, simply, pixels) within the imaging data may be selected, and intensities (e.g., colors) of the image pixels across multiple images may be determined. Changes in the intensities of the selected image pixels may be processed to determine vibrations across the range of frequencies, and to identify the natural frequencies or natural vibrational modes of the object.

Natural frequencies of vibration may be identified where the power level or energy level of vibration, or deviations in intensities or positions of the pixels, are sufficiently greater than at other frequencies during the excitation. Determining such natural frequencies, or natural vibrational modes, is critical to maintaining the integrity of the aircraft, and in particular to avoid servo-elastic oscillations that may threaten the integrity of the aircraft or prevent the aircraft from recovering from subsequent oscillations.

A vibrometric signature may be compared to other vibrometric signatures to make one or more determinations regarding integrity, suitability or fitness of the object. For example, a vibrometric signature generated for an aspect of a vehicle on one side of a joint or a junction may be compared to a vibrometric signature generated for an aspect of the vehicle on another side of the joint or junction, in order to determine whether any changes in the integrity, suitability or fitness of the joint or junction have occurred. Where a joint or a junction has sufficient integrity, or forms a sufficiently tight connection between two or more components, the junction and such components should respond to external excitation in a consistent manner, such that vibrometric signatures of surfaces at one end of the joint or junction are similar or identical to vibrometric signatures of surfaces at another end of the joint or junction, e.g., within a predetermined tolerance or limit, as if the joint or the junction did not exist or was replaced by a single, integral component. Where the joint or junction does not have sufficient integrity, or forms an insufficiently tight (e.g., a loose) connection between the two or more components, e.g., beyond the tolerance or limit, the junction and such components should respond to external excitation in an inconsistent manner, such that vibrometric signatures of surfaces at one end of the joint or junction are different in amplitude and/or phase from vibrometric signatures of surfaces at another end of the joint or junction.

Thus, where vibrometric signatures are determined for different surfaces of a vehicle on either side of a joint or a junction, an indication of the integrity or the suitability of the joint or the junction may be determined based on a comparison of the respective vibrometric signatures. Where the vibrometric signatures are similar or identical to one another, e.g., to within a predetermined tolerance or limit, the joint or the junction may be determined to be in sound condition, and the vehicle may be deemed ready to undertake any desired operations. Where the vibrometric signatures are different from one another to any extent, the joint or the junction is presumed to be unsound, and the vehicle must undergo inspections or further evaluation prior to undertaking operations.

A joint or a junction of a vehicle, or any other object, may be subjected to natural excitation in any manner. For example, in some embodiments, acoustic energy generated by a speaker or another source of sound may be imparted upon the joint or the junction across a range of frequencies, and at constant or varying intensities. Sound is kinetic energy released by vibration of molecules in a medium, such as air, and may be generated in any number of ways or in response to any number of events. For example, sound may be generated in response to vibrations resulting from impacts or frictional contact between two or more bodies, or in response to vibrations resulting from the rotation of one or more bodies such as shafts, e.g., by motors or other prime movers. Sound is also generated when motion or vibration of a joint or a junction results in a pressure change in a medium, such as air, surrounding the joint or the junction. For example, densities of the molecules of a medium within a vicinity of a joint or a junction may be subjected to alternating periods of condensation and rarefaction, resulting in contractions and expansions of such molecules, and causing an issuance of a sound wave. Alternatively, a joint or a junction of a vehicle, or any other object, may be subject to excitation of any kind, in addition to or as an alternative to sound. For example, in some embodiments, a joint or a junction may be subject to excitation by a component that is affixed to at least one aspect of the vehicle, or the joint or the junction, and configured to generate vibrations at any selected frequency within a known, defined range. In some embodiments, an excitation source may be an intrinsic component of a vehicle or another object having one or more joints or junctions, such as where a vehicle includes a motor that may be controlled to impart vibrations upon the vehicle at any selected frequency within a known, defined range. Moreover, frequencies of excitation may cover any range, such as from zero hertz to five hundred hertz (0 to 500 Hz), from zero hertz to two thousand hertz (0 to 2000 Hz), or over any other ranges, or any other range.

In some embodiments, energy may be emitted by a speaker or another excitation source in a stepwise fashion, e.g., according to a step function, or according to a delta function or any other function, such that a frequency of the energy being emitted remains constant for a brief period of time before being increased or decreased to another frequency. As energy is imparted upon a joint or a junction of a vehicle or another object at a given frequency, an imaging device may be aligned to capture images of the object at substantially high frame rates. For example, in some embodiments, the images may be captured at not less than twice a frequency of excitation, such as twice a maximum frequency of a range. In some embodiments, the images may be captured at not less than a Nyquist frequency.

Images captured by an imaging device during excitation of an object, such as a joint or a junction of a vehicle, may be processed to detect motion in the form of vibrations of one or more aspects of the joint or the junction, including two or more components of the vehicle that are coupled together by the joint or the junction. For example, in some embodiments, images captured by the imaging device may be processed according to any optical flow method or technique to determine the motion of sets of pixels corresponding to aspects of the joint or the junction, e.g., components on either side of the joint or the junction, or are coupled together by the joint or the junction, as depicted within the images. A power level, or an energy level, associated with motion of the sets of pixels may be determined for each of the frequencies of a range. Where the power level or the motion observed at a given frequency of excitation exceeds a predetermined threshold, or is significantly greater than power levels or motion at other frequencies, the given frequency is a natural frequency of vibration. In some embodiments, a steerable filter may be used to determine the motion of such pixels. For example, in some embodiments, each image may be divided into an amplitude and a phase using a steerable filter bank or pyramid. Such filters may be used to estimate velocities in directions orthogonal to orientations of filter pairs. Differences in phases, weighted by their corresponding amplitudes, may provide an estimated power level or energy level of motion of a given aspect of an object, e.g., a vehicle, such as one or more pixels of the object. An overall (or global) estimated power level or energy level of the motion may be determined as a sum of local estimated power levels or energy levels for the object, as determined for a given frequency of excitation.

A vibrometric signature may take any number of forms in accordance with the present disclosure. For example, a vibrometric signature may comprise a set of the natural frequencies of vibration of a joint or a junction or, alternatively, a plot or other representation of power levels or energy levels with respect to frequencies of excitation. In some embodiments, a raw vibrometric signature representing power levels or energy levels of vibration for each of a plurality of frequencies over a range may be generated based on discrete values of the natural frequencies at local or absolute maximum power levels or energy levels. Alternatively, in other embodiments, the vibrometric signature may include not only the discrete values of the natural frequencies and their corresponding local or absolute maximum power levels or energy levels but also values corresponding to slopes or derivatives of power levels or energy levels with respect to frequencies of the range, including but not limited to slopes or derivatives of power levels or energy levels around the natural frequencies. Furthermore, in some embodiments, a raw vibrometric signature may be smoothed, e.g., using a linear filter, across a sliding window of frequencies according to any number of weights.

In some embodiments, after natural frequencies of vibration or natural vibrational modes are identified for an object, such as one or more components or surfaces of aerial vehicles that are coupled at (e.g., provided on opposite or different sides of) a joint or a junction, the imaging data may be further subjected to spatial and temporal processing to detect vibrations or other motion of the components coupled at the joint or the junction, even where such vibrations or motion are small in magnitude, and to determine mode shapes of the objects based on such vibrations or motion. For example, in some embodiments, vibrations or other motion of objects depicted within images captured as the joint or the junction is subjected to excitation may be amplified according to one or more phase-based video amplification algorithms, including but not limited to algorithms applying steerable pyramids over time. In some embodiments, steerable pyramids may decompose images and separate amplitudes of wavelets from their respective phases. Each of the images may be band-passed by a filter applied with a small frequency band around the respective natural frequencies of vibration or natural vibrational modes, and subjected to a time series analysis, from which vibration or other motion corresponding to such frequencies or modes is amplified. Moreover, where the amplified vibration or motion is visibly perceptible, the extent of the vibration or motion may be measured, and a mode shape in the form of a curve characterizing the extent to which such objects vibrate or move, or to identify portions of an object where impacts of such vibration or motion are observed to a maximum extent.

The systems and methods of the present disclosure provide a number of advantages over traditional systems or methods for evaluating the integrity or suitability of joints or junctions. For example, many traditional systems or methods for evaluating joints or junctions require physical contact with a joint or a junction, e.g., by one or more sensors. Such sensors may impact one or more properties or characteristics of vibration or other motion of the joint or the junction, however, thereby rendering results obtained according to such systems or methods unreliable or impertinent. Some other systems and methods for evaluating the integrity or suitability of a joint or a junction involve the use of laser sources that are configured to emit beams having slightly different phases, and to analyze differences in phases between light emitted by such sources and light reflected from surfaces of the objects. Such systems and methods typically require specialized equipment or software that may be complex or costly in nature. The systems and methods of the present disclosure, meanwhile, operate without contact with the joint or junctions that are being evaluated, and are not destructive in nature.

In some embodiments of the present disclosure, natural frequencies of vibration or natural vibrational modes may be accurately determined using imaging data with sufficiently low error rates, and for multiple natural vibrational modes, not simply for a first natural vibrational mode. Moreover, because a material stiffness (e.g., a Young's Modulus) of an object is proportional to a square of a natural frequency of vibration of the object, a material stiffness of the object may be visually determined where aspects of the geometry of the object such as a size, a cross-sectional area, or the like, are known. For example, where changes in intensity are determined for an object, and stiffness properties of the object are known, differences in amplitudes or phases of vibration in the presence of excitation at different locations of the object may be determined and associated with the stiffness properties.

Furthermore, in some embodiments, once information regarding natural frequencies of vibration and mode shapes of aspects of a joint or a junction are determined, indications of the suitability of the joint or the junction, such as material properties including a mass matrix, a damping, or a stiffness of the joint or junction, may be calculated from such information accordingly. A vibrometric signature, e.g., a power spectral diagram or other representation of power or energy associated with vibration with respect to a variety of frequencies, determined in the frequency domain, may be used to determine indications of integrity or suitability of the joint or junction, such as a transfer function for the joint or junction in the frequency domain. A transfer function for a joint that was determined in the frequency domain may then be transformed (viz., inversely transformed) to determine a corresponding transfer function for the joint in the time domain, from which properties such as a mass matrix of the joint, a damping of the joint, or a stiffness of the joint, may be determined.

Figure 2:
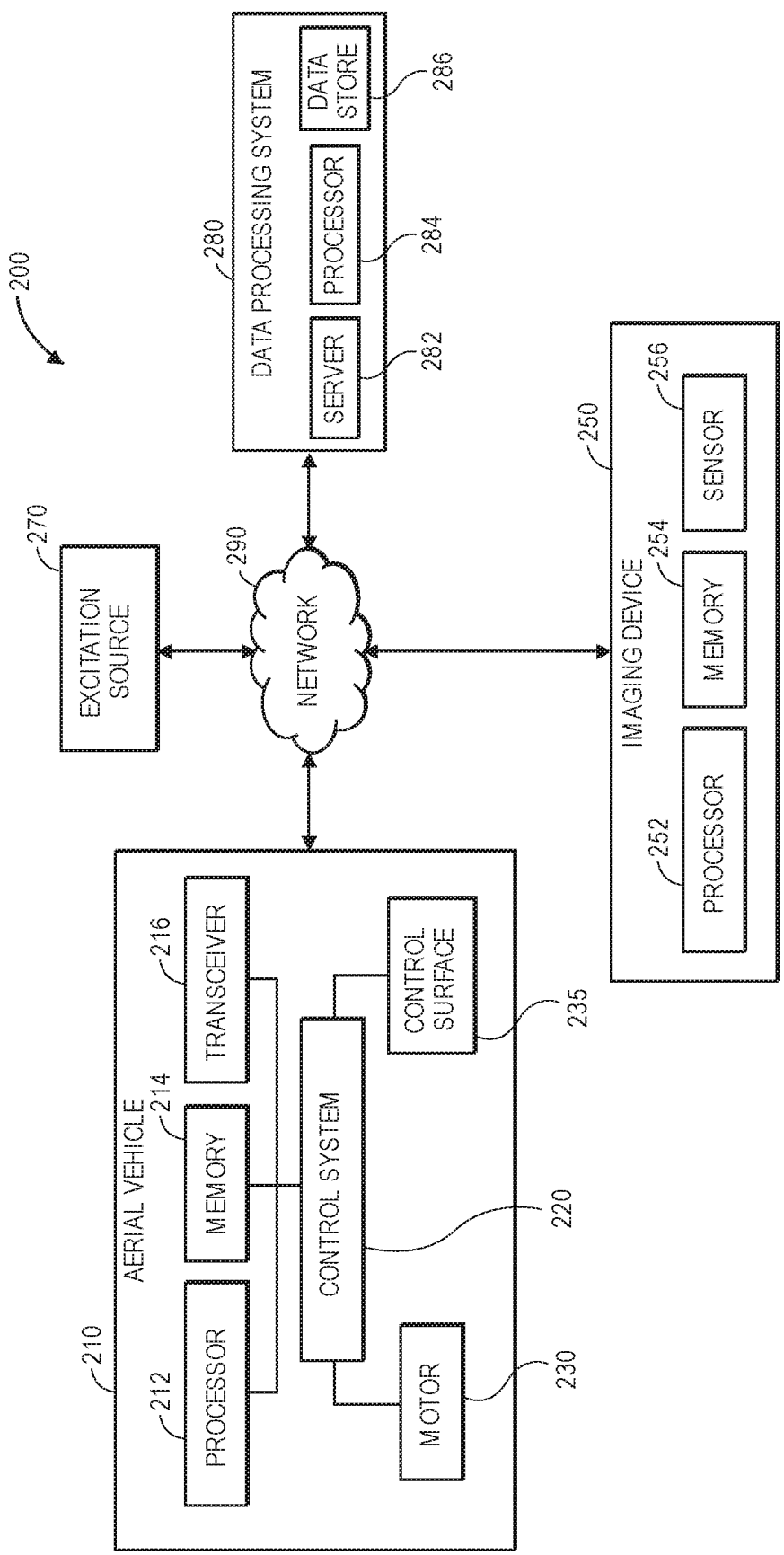
FIG. 2 is a block diagram of one system for evaluating joints using vibrometric signatures in accordance with embodiments of the present disclosure.

Referring to FIG. 2, a block diagram of components of one system 200 for evaluating joints using vibrometric signatures in accordance with embodiments of the present disclosure is shown. The system 200 of FIG. 2 includes an aerial vehicle 210, an imaging device 250, an excitation source 270 and a data processing system 280 connected to one another over a network 290. Except where otherwise noted, reference numerals preceded by the number "2" shown in the block diagram of FIG. 2 indicate components or features that are similar to components or features having reference numerals preceded by the number "1" shown in FIGS. 1A through 1K.

The aerial vehicle 210 includes a processor 212, a memory 214 and a transceiver 216. The aerial vehicle 210 further includes a control system 220, one or more propulsion motors 230, and one or more control surfaces 235.

The processor 212 may be configured to perform any type or form of computing function associated with the operation of the aerial vehicle 210, including but not limited to the execution of one or more machine learning tools, algorithms or techniques. The processor 212 may also be configured to execute any other algorithms or techniques (e.g., object detection or recognition algorithms or techniques) associated with one or more applications, purposes or functions, or to select at least one of a course, a speed or an altitude for the safe operation of the aerial vehicle 210. For example, the processor 212 may be configured to control any aspects of the operation of the aerial vehicle 210 and the one or more computer-based components thereon, including but not limited to the propulsion motors 230 or the control surfaces 235.

The processor 212 may also control the operation of one or more control systems or modules, such as the control system 220, for generating instructions for conducting operations of one or more of the propulsion motors 230 or one or more of the control surfaces 235, or for interpreting information or data captured by one or more onboard sensors (not shown). Such control systems or modules may be associated with one or more other computing devices or machines, and may communicate with the imaging device 250, the excitation source 270, the data processing system 280 or one or more other computer devices or aerial vehicles (not shown) over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, imaging data, flight paths, flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the propulsion motors 230 or the control surfaces 235, or any other devices or components (not shown). The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling aspects of the operation of the aerial vehicle 210, as desired. For example, the control system 220 may be configured to cause or control the operation of one or more of the propulsion motors 230 or the control surfaces 235, or other components, such as to cause one or more of the propulsion motors 230 to rotate propellers at desired speeds, or to cause such propellers to be aligned in selected positions or orientations. The control system 220 may further control any other aspects of the aerial vehicle 210, including but not limited to the operation of one or more aspects of the control surfaces 235 or other features within desired ranges or by desired distances or deflections, or the engagement with or release of one or more items by one or more engagement systems (not shown). In some embodiments, the control system 220 may be integrated with one or more of the processor 212, the memory 214 and/or the transceiver 216.

The propulsion motors 230 may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. In some embodiments, one or more of the propulsion motors 230 may be a brushless DC multi-phase motor such as an outrunner brushless motor or an inrunner brushless motor.

The aerial vehicle 210 may include any number of propulsion motors 230 of any kind. For example, one or more of the propulsion motors 230 may be aligned or configured to provide forces of lift to the aerial vehicle 210, exclusively, while one or more of the propulsion motors 230 may be aligned or configured to provide forces of thrust to the aerial vehicle 210, exclusively. Alternatively, one or more of the propulsion motors 230 may be aligned or configured to provide forces of lift and forces of thrust to the aerial vehicle 210, as needed. For example, the propulsion motors 230 may be fixed in their orientation on the aerial vehicle 210, or configured to vary their respective orientations, e.g., a tilt-rotor aircraft. Moreover, the propulsion motors 230 may be aligned or configured to operate with different capacities or ratings, or at different speeds, or coupled to propellers having different sizes and shapes. For example, in some embodiments, one or more of the propulsion motors 230 may be an electric motor, e.g., a brushless DC multi-phase motor, and one or more of the propulsion motors 230 may be a gasoline-powered motor.

Each of the propulsion motors 230 may be coupled to one or more propellers (or rotors or rotatable systems) having a plurality of shaped blades joined to a hub or boss. For example, each of such propellers may be rotatably mounted to a mast or shaft associated with a respective one of the propulsion motors 230 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The control surfaces 235 may be any sections or appurtenances provided on surfaces of the aerial vehicle 210 that may be manipulated in order to dynamically modify a position or orientation of the aerial vehicle 210 with respect to one or more degrees of freedom. For example, the control surfaces 235 may include, but are not limited to, ailerons, brakes, elevators, elevons, flaps, rudders, slats, tailerons or wings, or other features. In some embodiments, each of the control surfaces 235 may include a motor, such as an electrical, mechanical and/or hydraulic or other component or actuator for rotating, translating or otherwise repositioning or reorienting a respective one of the control surfaces 235 during operation of the aerial vehicle 210, under the control of the one or more processors 212 or the control system 220. In some embodiments, each of the control surfaces 235 may include a directional sensor, such as any type of sensor or other component that is embedded into one or more aspects of one of the control surfaces 235 (e.g., a leading edge, a trailing edge, a tip or one or more other faces or aspects of such surfaces 235) and configured to gather information or data with respect to an alignment or orientation thereof. For example, one of the control surfaces 235 may include digital cameras or other imaging devices (e.g., depth sensors, range cameras, infrared cameras, radiographic cameras or other optical sensors) that are configured to capture imaging data such as still or moving images, associated audio content or other data or metadata, within a field of view or along a particular axis or direction. The aerial vehicle 210 may further include any number of additional fixed or mobile components or features, including but not limited to actuators, brackets, fuselages, joints (or junctions), landing gear, struts, or other components or features, which may be mounted to component parts of a frame, or to one or more component parts mounted to the frame.

The propulsion motors 230 and/or the control surfaces 235, or any other components of the aerial vehicle 210, may be coupled to a frame or other structure or surface of the aerial vehicle 210, or to any other object, by one or more joints or junctions (or other connectors or connections). Such joints or junctions may be defined or formed in any manner and by any components or techniques including but not limited to nuts and/or bolts, clips, rivets, fasteners, adhesives or welds. Additionally, although the block diagram of FIG. 2 includes a single box for a propulsion motor 230 and a single box for a control surface 235, those of ordinary skill in the pertinent arts will recognize that any number or type of propulsion motors and/or control surfaces may be provided aboard the aerial vehicle 210 in accordance with the present disclosure, and that such propulsion motors 230, such control surfaces 235, or any other components may be joined or coupled to a frame or to one another by any number of joints or junctions.

The imaging device 250 may be any form of optical recording device that may be used to photograph or otherwise record imaging data of aerial vehicles, or for any other purpose, such as a digital camera, a range camera, a depth camera, an infrared camera, a radiographic camera, or the like. The imaging device 250 may include one or more processors 252, memory or storage components 254 and image sensors 256, as well as one or more photosensitive surfaces, filters, chips, electrodes, clocks, boards, timers or any other relevant features (not shown). The imaging device 250 may capture imaging data in the form of one or more still or moving images of any kind or form, as well as any relevant audio signals or other information, and may be connected to the aerial vehicle 210, the excitation source 270 and/or the data processing system 280 by way of the network 290.

Moreover, the imaging device 250 may also include manual or automatic features for modifying a position, field of view or orientation of the imaging device 250. For example, a digital camera may be configured in a fixed position, or with a fixed focal length (e.g., fixed-focus lenses) or angular orientation. Alternatively, the imaging device 250 may include one or more actuated or motorized features for adjusting a position of the imaging device 250, or for adjusting either the focal length (e.g., zooming the imaging device 250) or the angular orientation (e.g., the roll angle, the pitch angle or the yaw angle), by causing a change in the distance between the sensor and the lens (e.g., optical zoom lenses or digital zoom lenses), a change in the location of the imaging device 250, or a change in one or more of the angles defining the angular orientation.

For example, the imaging device 250 may be hard-mounted to a support or mounting that maintains the device in a fixed configuration or angle with respect to one, two or three axes. Alternatively, however, the imaging device 250 may be provided with one or more motors and/or controllers for manually or automatically operating one or more of the components, or for reorienting a position, axis or direction of the imaging device 250, i.e., by moving, panning or tilting the imaging device 250. Panning the imaging device 250 may cause a rotation within a horizontal plane or about a vertical axis (e.g., a yaw), while tilting the imaging device 250 may cause a rotation within a vertical plane or about a horizontal axis (e.g., a pitch). Additionally, the imaging device 250 may be rolled, or rotated about its axis of rotation, and within a plane that is perpendicular to the axis of rotation and substantially parallel to a field of view of the imaging device 250. The imaging device 250 may also be provided on a vehicle enabled to pass within an operating range of the aerial vehicle 210.

The imaging device 250 may also digitally or electronically adjust an image identified in a field of view, subject to one or more physical and operational constraints. For example, the imaging device 250 may virtually stretch or condense the pixels of an image in order to focus or broaden the field of view of the imaging device 250, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

The excitation source 270 may be any device or system configured to impart energy (e.g., sound energy) over a range of frequencies onto one or more objects, such as the aerial vehicle 210 or any other joints or junctions thereof, within a field of view of the imaging device 250. For example, the excitation source 270 may be any type or form of speaker or like system having one or more transducers for converting electrical signals into sound energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters. Alternatively, in some embodiments, the excitation source 270 may be any other system or component for imparting vibration energy onto one or more surfaces of an object, such as the propulsion motors 230, the control surfaces 235 or any other aspects of the aerial vehicle 210, e.g., by direct contact with the object or in any other manner. Moreover, in some embodiments, the excitation source 270 may be an intrinsic component of the aerial vehicle 210, such as one or more of the propulsion motors 230. The excitation source 270 may further include any number of processors or other components for communicating with one or more of the aerial vehicle 210, the imaging device 250 and/or the data processing system 280 over the network 290, as well as any number of power supplies of any type or form.

The data processing system 280 includes one or more physical computer servers 282 having one or more computer processors 284 and one or more data stores 286 associated therewith, and may be provided for any specific or general purpose. For example, the data processing system 280 of FIG. 2 may be independently provided for the exclusive purpose of receiving, analyzing or storing information or data received from the aerial vehicle 210, the imaging device 250 or the excitation source 270, including but not limited to imaging data or other sets of data regarding natural frequencies of vibration. Alternatively, the data processing system 280 of FIG. 2 may be provided in connection with one or more physical or virtual services configured to receive, analyze or store such information or data, as well as one or more other functions.

In some embodiments, the data processing system 280 may be configured to program one or more excitation sources 270 to emit energy (e.g., acoustic energy, or sound) at any intensity and over a range of frequencies. For example, the data processing system 280 may program the one or more excitation sources 270 to emit energy in a linearly increasing manner, e.g., in a stepwise fashion, such that the frequency of the energy being emitted remains constant for a brief period of time before being increased or decreased to another frequency. In some embodiments, the data processing system 280 may program one or more imaging devices 250 to capture images of an object being subject to excitation at substantially high frame rates, e.g., at or above frame rates of two thousand to four thousand frames per second (2,000 to 4,000 fps). In some embodiments, the data processing system 280 may be configured to receive images from the one or more imaging devices 250 and process the images to detect low levels of vibration or other motion of such objects within the images. In still other embodiments, the data processing system 280 may be configured to associate power levels or energy levels of vibration with frequencies of excitation, or to identify one or more natural frequencies of vibration on any basis.

The servers 282 may be connected to or otherwise communicate with the processors 284 and the data stores 286. The data stores 286 may store any type of information or data, including but not limited to information or data received from the aerial vehicle 210, the imaging device 250 or the excitation source 270, for any purpose. The servers 282 and/or the computer processors 284 may also connect to or otherwise communicate with the network 290, through the sending and receiving of digital data. For example, the data processing system 280 may include any facilities, stations or locations having the ability or capacity to receive and store information or data, such as media files, in one or more data stores, e.g., media files received from the aerial vehicle 210, or from one another, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

In some embodiments, the data processing system 280 may be configured to program the excitation source 270 to excite an object, or to program the imaging device 250 to capture imaging data, as necessary. Likewise, the data processing system 280 may be configured to select sets of image pixels within image planes of the imaging device 250 that correspond to surfaces associated with a joint or a junction, to calculate or determine intensities of such image pixels, to generate time series from such intensities, to transform intensities or time series, to generate power spectral densities, to identify natural frequencies, to filter imaging data, to determine amplitudes or phases of vibration or other motion, or to amplify phases, to generate modified video images, or to determine mode shapes as described in greater detail herein.

Any of the functions or processes described herein as being performed, or capable of being performed, by one of the processor 212, the processor 252 or the server 282 may, in accordance with one or more embodiments disclosed herein, be performed by any or all of the processor 212, the processor 252 or the server 282. For example, the programming or operation of the excitation source 270 to excite an object, or the imaging device 250 to capture imaging data described herein may be configured or controlled by any or all of the processor 212, the processor 252 or the server 282. Likewise, the selection of image pixels within image planes of the imaging device 250, the determination of intensities of such image pixels within imaging data, the generation of time series from such intensities, the transformation of such intensities or time series, the generation of power spectral densities, the identification of natural frequencies, the filtering of imaging data, the determination of amplitudes or phases of vibration or other motion, the amplification of phases or the generation of modified video images described herein may be performed by any or all of the processor 212, the processor 252 or the server 282. Finally, the determination of mode shapes for one or more objects may also be made by any or all of the processor 212, the processor 252 or the server 282.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210, the imaging device 250, the excitation source 270 or the data processing system 280 may use any web-enabled or Internet applications or features, or any other client-server applications or features including E-mail or other messaging techniques, to connect to the network 290, or to communicate with one another. For example, the aerial vehicle 210 and/or the imaging device 250 may be adapted to transmit information or data in the form of synchronous or asynchronous messages to the data processing system 280 or to any other computer device in real time or in near-real time, or in one or more offline processes, via the network 290. Those of ordinary skill in the pertinent art would recognize that the aerial vehicle 210, the imaging device 250, the excitation source 270 or the data processing system 280 may operate, include or be associated with any of a number of computing devices that are capable of communicating over the network 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212, the processor 252 or the processor 284, or any other computers or control systems utilized by the aerial vehicle 210, the imaging device 250, the excitation source 270 or the data processing system 280, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, a joint (or a junction) of two or more aspects of a vehicle may be evaluated by subjecting the joint or the junction to excitation with acoustic energy or any other type or form of energy over a range of frequencies, capturing imaging data of the vibrating vehicle, and processing the imaging data to identify natural frequencies of vibration of the respective aspects that are coupled at the joint or the junction, and to determine vibrometric signatures for each of the aspects that are coupled at the joint or the junction based on the vibrometric signatures. If the vibrometric signatures are consistent with one another, the joint or the junction may be presumed to be sound, and the aerial vehicle may be cleared to perform any number of missions. If the vibrometric signatures are not consistent with one another, however, then the soundness of the joint or the junction may not be presumed, and the aerial vehicle may be blocked from performing one or more of the missions.

Figure 3:
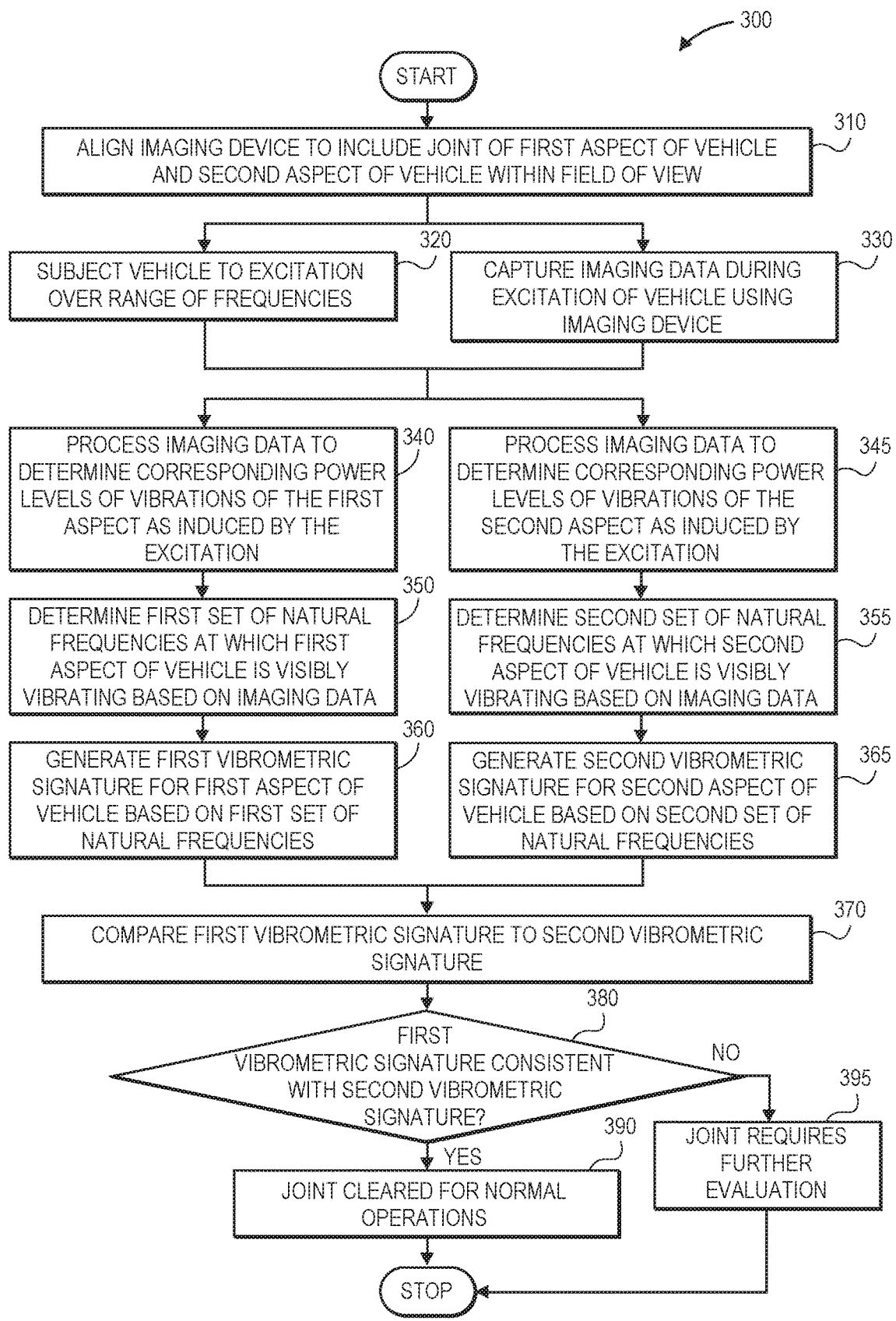
FIG. 3 is a flow chart of one process for evaluating joints using vibrometric signatures in accordance with embodiments of the present disclosure.

Referring to FIG. 3, a flow chart 300 of one process for evaluating joints using vibrometric signatures in accordance with embodiments of the present disclosure is shown. At box 310, an imaging device is aligned to include a joint of a first aspect of a vehicle and a second aspect of the vehicle within a field of view. The joint between the first aspect and the second aspect may be defined using one or more bolts, screws, rivets, adhesives or other fasteners, and may couple any number or type of aspects of the vehicle. Where the vehicle is an aerial vehicle, the aspects may include one or more of ailerons, brakes, elevators, elevons, flaps, rudders, slats, tailerons or wings, antennas, landing gear, struts, propulsion motors, propellers or any other features. For example, in some embodiments, the joint may couple a propulsion motor, a control surface, an antenna or another system to a frame of the vehicle. Additionally, in some embodiments, the joint may couple three or more aspects of the vehicle, e.g., aspects in addition to the first aspect and the second aspect.

In some embodiments, the imaging device may include the vehicle, in its entirety, within its field of view. In some other embodiments, however, the imaging device may be focused or directed to include only the joint and portions or all of the first aspect and the second aspect. Moreover, the vehicle may be any type or form of vehicle including but not limited to an aerial vehicle (e.g., an unmanned aerial vehicle, or drone), an autonomous ground vehicle or robot, an automobile, or any other powered or human-powered vehicle. Alternatively, in some other embodiments, an imaging device may be aligned to include one or more aspects of any type of object within a field of view, and the object need not be a vehicle or component thereof.

At box 320, the vehicle is subjected to excitation over a range of frequencies, e.g., by an excitation source. For example, the excitation source may be an acoustic speaker or other system configured to project acoustic energy at constant or varying intensities over a range of frequencies. In some embodiments, a frequency of the acoustic energy may be linearly increased over time over a defined range of frequencies, such as from zero hertz to five hundred hertz (0 to 500 Hz), from zero hertz to two thousand hertz (0 to 2,000 Hz), or over any other ranges of frequencies, according to a step function or a delta function, or in any other manner. In some other embodiments, however, the excitation source may be any other component configured to excite the vehicle, such as by direct contact with the vehicle, e.g., a vibration source adhered or affixed to one or more surfaces of the vehicle, or an object that strikes the vehicle in one or more locations. For example, in some embodiments, the excitation source may be a machine such as a motor or other system that may be selectively programmed to generate vibrations or other motion over the range of frequencies. The excitation may be directed to the joint in general, or to the first aspect or the second aspect in particular. In parallel with the excitation, at box 330, imaging data is captured by the imaging device, e.g., during the excitation over the range of frequencies. For example, in some embodiments, the imaging device may be configured to capture images of at least the joint, the first aspect and the second aspect at a frame rate that is at least twice a frequency of the excitation, such as at least twice a maximum frequency of the range of frequencies. In some embodiments, the imaging device may be configured to capture images at a frame rate that is at least as great as a Nyquist frequency.

At box 340, the imaging data is processed to determine corresponding power levels of vibrations of at least the first aspect of the vehicle, as induced by the excitation. In some embodiments, positions or intensities of one or more selected pixels corresponding to the first aspect of the vehicle may be detected and tracked in successive frames to determine the extent to which the first aspect vibrates in response to the excitation. In some embodiments, the selected pixels may correspond to uniquely visible textures, patterns, surfaces or markings on the first aspect, or may be identified as a function of a level of lighting within the field of view of the digital camera, a measure of surface reflectance in one or more locations on surfaces of the object, or based on any other factor. In some embodiments, a single pixel corresponding to the first aspect may be selected. In some other embodiments, multiple pixels corresponding to the first aspect may be selected, and such pixels may include a cluster of pixels in or around a single location on surfaces of the first aspect, or in different locations on surfaces of the first aspect.

For example, in some embodiments, an optical flow method or technique may be utilized to detect and track small movements of aspects of the vehicle within the imaging data. In some embodiments, a steerable filter method by which small motions across or between image frames are estimated using a bank of filters, or a steerable pyramid, to break down each of the image frames into an amplitude and a phase at different scales and orientations. Pairs of such filters may be used to estimate a velocity in directions orthogonal to the orientations of the respective filter pairs, and phases of the velocities are used to estimate extents of local vibrations or small motions. Where such phases are subtracted from phases computed for a reference frame, differentials of such phases may be summed and weighted by squares of their amplitudes in order to estimate a power level (e.g., measured in decibels) of the local vibration, and to determine a two-dimensional distribution of vibrations across the visible aspects of the vehicle for a given frequency of excitation. Any other method or technique for estimating a power level of vibrations at a given frequency may be utilized in accordance with the present disclosure.

Alternatively, intensities of the selected pixels in the imaging data, e.g., values within a range of 0 (or black) to 255 (or white) for an eight-bit grayscale image, or values of one or more channels, such as a red channel, a green channel or a blue channel of a color (or "RGB") image, may be determined for each of a plurality of video images captured as the vehicle is subjected to the excitation over the range of frequencies, such that intensities are determined in real time or in near-real time, or at a later time, e.g., after the vehicle has been subjected to the excitation. A time series may be generated based on the differences in intensities of the selected pixels in successive video images, and may represent the intensities separated by a difference in time between the capture of the images, e.g., a reciprocal of the frame rate. For example, in some embodiments, where imaging data is captured by a high-speed digital camera having a frame rate of approximately four thousand frames per second (or 4,000 fps), intensities may be separated in a time series by approximately one quarter millisecond (or 0.25 ms). A time series may take any form, including but not limited to an array having any dimensions, including but not limited to a dimension corresponding to a number of selected pixels and a dimension corresponding to a number of video images.

Any manner for processing imaging data to determine corresponding power levels of vibrations of the first aspect of the vehicle, as induced by the excitation, may be utilized in accordance with the present disclosure.

At box 350, a first set of natural frequencies at which the first aspect of the vehicle is visibly vibrating are determined based on the imaging data. For example, the first set of natural frequencies may be identified for the one or more modes of vibration as corresponding to peak levels of power or energy in response to the excitation. At box 360, a first vibrometric signature is generated for at least the first aspect of the vehicle based on the first set of natural frequencies.

For example, the first vibrometric signature may be a set of data identifying the first set of natural frequencies at which peak power levels were observed, or a plot or wave corresponding to power levels associated with frequencies over the range. In some embodiments, the first vibrometric signature may be represented as a power spectral density diagram depicting power levels associated with vibration of the first aspect over a range of frequencies, as a function of frequency. A time series may be transformed in any manner to determine the power spectral density, or to form the power spectral density diagram, such as by applying a fast Fourier transform to the time series. The first vibrometric signature may be stored in one or more data stores, and used for any purpose.

In parallel, at box 345, the imaging data is processed to determine corresponding power levels of vibrations of at least the second aspect of the vehicle, as induced by the excitation. In some embodiments, positions or intensities of one or more selected pixels corresponding to the second aspect of the vehicle may be detected and tracked in successive frames to determine the extent to which the first aspect vibrates in response to the excitation. In some embodiments, the imaging data may be processed at box 345 to determine corresponding power levels of vibrations of the second aspect of the vehicle in the same manner that the imaging data is processed at box 340 to determine corresponding power levels of vibrations of the first aspect of the vehicle. In some other embodiments, the imaging data may be processed at box 340 and at box 345 in different manners.

At box 355, a second set of natural frequencies at which the second aspect of the vehicle is visibly vibrating are determined based on the imaging data. In some embodiments, the second set of natural frequencies may be determined at box 355 in the same manner that the first set of natural frequencies are determined at box 350. In some other embodiments, the first set of natural frequencies and the second set of natural frequencies may be determined in different manners.

At box 365, a second vibrometric signature is generated for at least the second aspect of the vehicle based on the second set of natural frequencies. Like the first vibrometric signature, the second vibrometric signature may be a set of data identifying the second set of natural frequencies at which peak power levels were observed, or a plot or wave corresponding to power levels associated with frequencies over the range, e.g., a power spectral density diagram, and may be stored in one or more data stores, or used for any purpose.

At box 370, the first vibrometric signature is compared to the second vibrometric signature. In some embodiments, a comparison may be based on sets of discrete frequencies, and may compare power levels of vibration of the first aspect as determined from the first vibrometric signature to power levels of vibration of the second aspect at such frequencies as determined from the second vibrometric signature. Alternatively, the comparison may be based on values of first, second, third or other frequency modes, or on any other basis.

At box 380, whether the first vibrometric signature is consistent with the second vibrometric signature is determined based on the comparison. If the first vibrometric signature is not consistent with the second vibrometric signature, then the process advances to box 395, where it is determined that the joint requires further evaluation, and the process ends. For example, the joint may be subjected to maintenance, repairs, visual inspections (e.g., by humans or one or more machines), tightening or replacing components from which the joint was formed, or any other actions or events that may be determined to be necessary. Alternatively, such as where deviations between the vibrometric signatures are within a predetermined tolerance or limit, the joint may be monitored during future operations, to determine whether the joint requires such maintenance or repairs. If the first vibrometric signature is consistent with the second vibrometric signature, however, then the process advances to box 390, where the joint is cleared for normal operations, e.g., where the joint is determined to be sufficiently tight, and the process ends. The vehicle may then perform any relevant missions, or may be subject to further evaluations or inspections of any type or form.

As is discussed above, where vibrometric signatures are calculated for a plurality of surfaces associated with a joint or a junction, e.g., surfaces located on different aspects that are coupled at the joint or the junction, a determination that the joint or the junction is sufficiently tight and capable of supporting operations without further maintenance, inspection or repair may be made where the vibrometric signatures are equal or sufficiently similar to one another, e.g., where the vibrometric signatures depict vibrational modes that are equal in number, magnitude and natural frequency, or are within a tolerance or limit of one another. In this regard, a sufficiently tight joint or junction behaves in a manner that is similar to a uniform member including each of the aspects that does not include the joint or the junction. Conversely, a determination that the joint or the junction is not sufficiently tight, that the joint or the junction is incapable of supporting operations, or that the joint or the junction requires maintenance, inspection or repair may be made where the vibrometric signatures are different from one another, e.g., in numbers, magnitudes or natural frequencies of vibrational modes that are not equal or similar to one another.

Figure 4A:
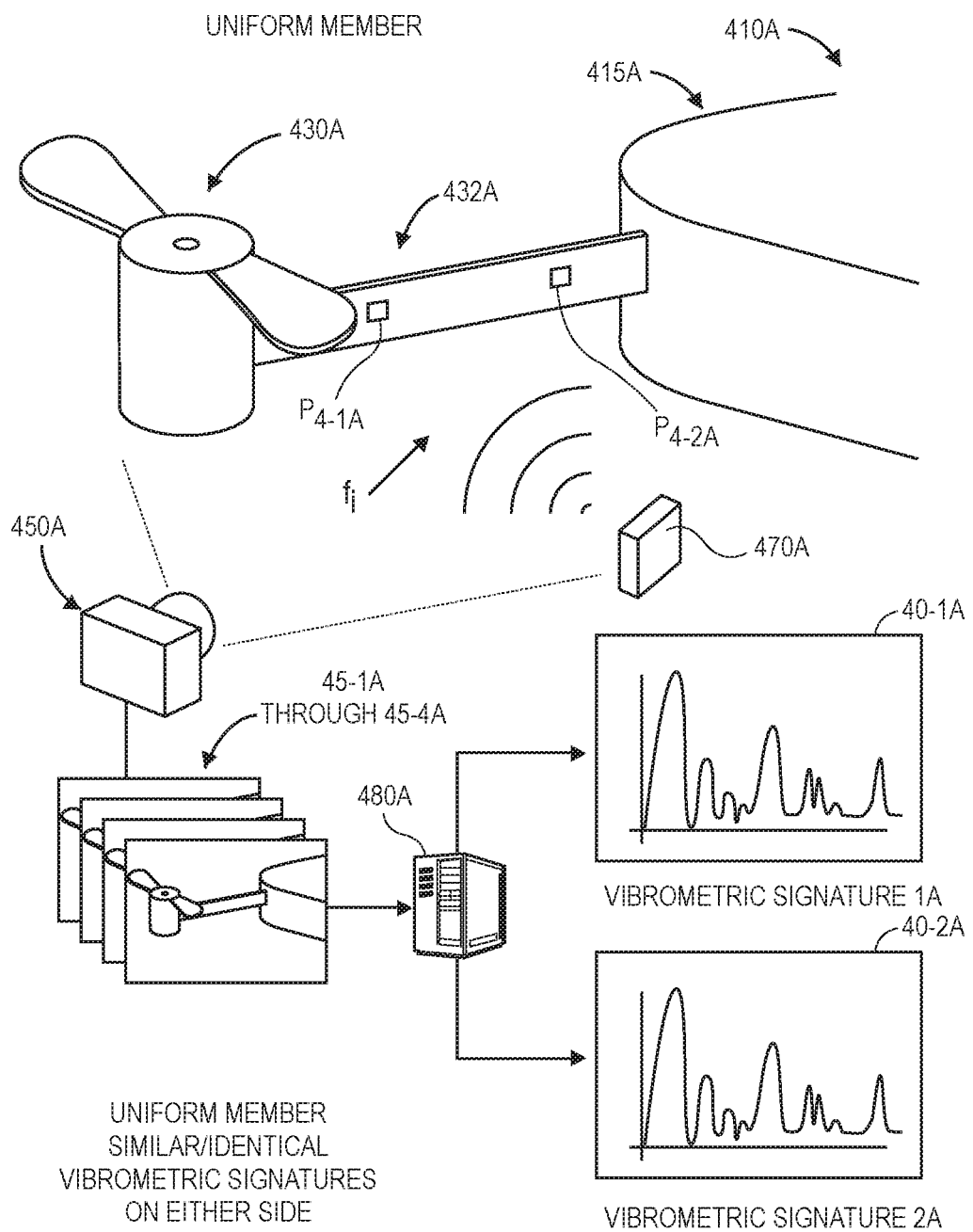
FIGS. 4A through 4C are views of aspects of one system for evaluating joints using vibrometric signatures in accordance with embodiments of the present disclosure.
Figure 4B:
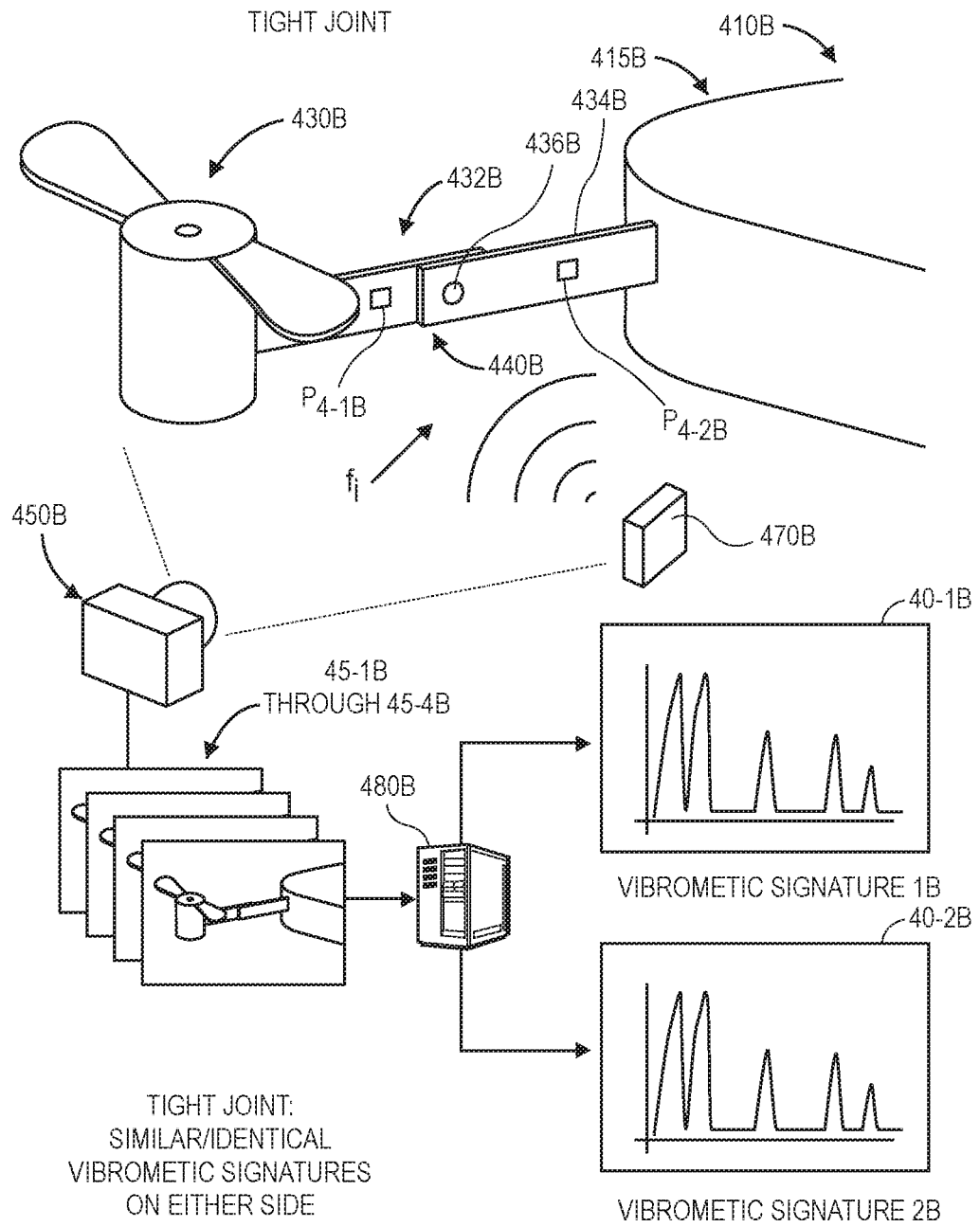
Figure 4C:
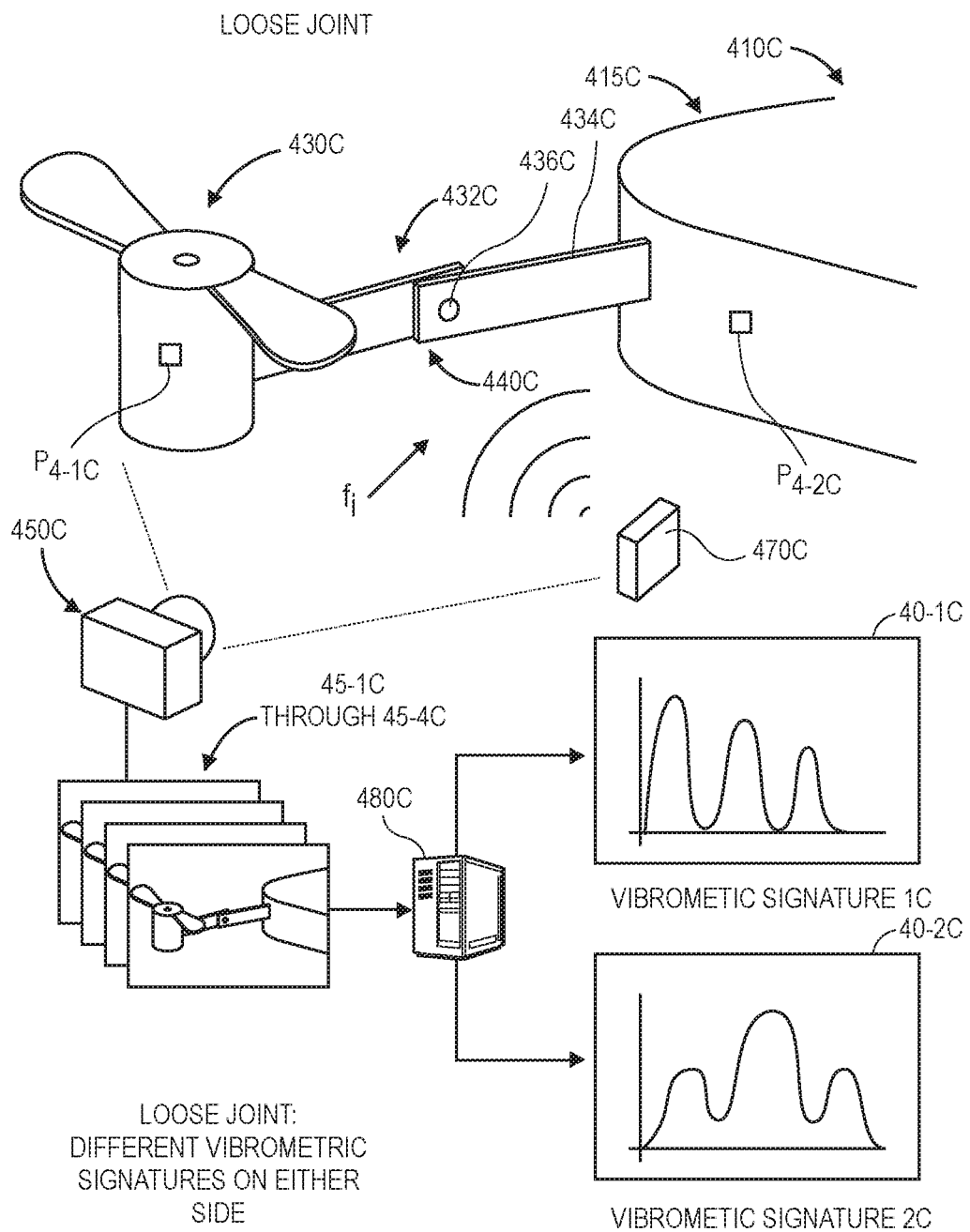

Referring to FIGS. 4A through 4C, views of aspects of one system for evaluating joints using vibrometric signatures in accordance with embodiments of the present disclosure are shown. Except where otherwise noted, reference numerals preceded by the number "4" shown in FIGS. 4A through 4C indicate components or features that are similar to components or features having reference numerals preceded by the number "2" shown in FIG. 2 or by the number "1" shown in FIGS. 1A through 1K.

As is shown in FIG. 4A, a portion of an aerial vehicle 410A includes a frame 415A and a propulsion motor 430A coupled to one another by an extension 432A. The portion of the aerial vehicle 410A is within a field of view of an imaging device 450A. Additionally, an acoustic speaker 470A is aligned to project acoustic energy in the form of sounds at one or more frequencies $f_i$ of a range, at any level of intensity, upon the portion of the aerial vehicle 410A. Alternatively, the acoustic speaker 470A may be replaced or supplemented with any other type or form of excitation source that may excite the aerial vehicle 410A at known, selected frequencies with the portion of the aerial vehicle 410A within a field of view of the imaging device 450A.

The extension 432A is a uniform member, e.g., a single, integral body, that may be formed from any suitable material and coupled to the frame 415A and the motor 430A in any manner. For example, in some embodiments, the extension 432A may be formed from any type or form of plastics (e.g., thermosetting plastics such as epoxy or phenolic resins, polyurethanes or polyesters, as well as polyethylenes, polypropylenes or polyvinyl chlorides), wood (e.g., woods with sufficient strength properties such as ash), metals (e.g., lightweight metals such as aluminum, or metals of heavier weights including alloys of steel), composites or any other combinations of materials. In some embodiments, the extension 432A may be formed of one or more lightweight materials including but not limited to carbon fiber, graphite, machined aluminum, titanium, fiberglass, wood or plastic. Thus, where a pair of sets of pixels $P_{4-1A}$, $P_{4-1B}$ corresponding to surfaces of the extension 432A are selected within an imaging plane of the imaging device 450A, and images 45-1A through 45-4A are captured as the extension 432A is excited over a range of frequencies f, vibrometric signatures 40-1A, 40-1B calculated based on the images 45-1A through 45-4A are substantially identical to one another, as energy imparted upon the extension 432A from the excitation by the acoustic speaker 470A is transferred throughout the extension 432A in a uniform manner, and the extension 432A behaves accordingly in the presence of the excitation.

As is shown in FIG. 4B, a portion of an aerial vehicle 410B includes a frame 415B and a propulsion motor 430B coupled to one another by a pair of extensions 432B, 434B that are coupled at a joint 440B defined by a fastener 436B (e.g., one or more bolts, screws, rivets, or adhesives). The portion of the aerial vehicle 410B is within a field of view of an imaging device 450B. Additionally, an acoustic speaker 470B is aligned to project acoustic energy in the form of sounds at one or more frequencies $f_i$ of a range, at any level of intensity, upon the portion of the aerial vehicle 410B.

As is discussed above, whether the joint 440B is sufficiently tight, and whether the aerial vehicle 410B may be cleared to perform one or more operations, is determined by selecting a pair of sets of pixels $P_{4-1B}$, $P_{4-2B}$ corresponding to surfaces on either side of the joint 440B, e.g., on surfaces on the extensions 432B, 434B, and calculating vibrometric signatures 40-1B, 40-2B for the sets of pixels $P_{4-1A}$, $P_{4-1B}$. Once the vibrometric signatures 40-1B, 40-2B have been calculated, the vibrometric signatures 40-1B, 40-2B may be compared to one another. As is shown in FIG. 4B, because the vibrometric signatures 40-1B, 40-2B are similar to or identical to one another, e.g., within one or more predetermined tolerances or limits, in that the vibrometric signatures 40-1B, 40-2B are power spectral densities having a similar or identical shape, thereby indicating that the vibrometric signatures 40-1B, 40-2B have a common number of vibration modes, and the vibration modes have similar natural frequencies and associated power levels or energy levels, the joint 440B is determined to be sufficiently tight, and the aerial vehicle 410B may be cleared to perform any number of operations. Where the vibrometric signatures 40-1B, 40-2B calculated for surfaces on either side of a joint are sufficiently similar to one another, such as is shown in FIG. 4B, the joint 440B may be presumed to behave in a manner similar to a uniform member, such as the extension 432A of FIG. 4A, in that energy imparted upon the extension 432B from the excitation by the acoustic speaker 470B will be transferred to the extension 434B, or vice versa, in a uniform manner, and the joint 440B behaves accordingly in the presence of the excitation.

As is shown in FIG. 4C, a portion of an aerial vehicle 410C includes a frame 415C and a propulsion motor 430C coupled to one another by a pair of extensions 432C, 434C that are coupled at a joint 440C defined by a fastener 436C. The portion of the aerial vehicle 410C is within a field of view of an imaging device 450C. Additionally, an acoustic speaker 470C is aligned to project acoustic energy in the form of sounds at one or more frequencies $f_i$ of a range, at any level of intensity, upon the portion of the aerial vehicle 410C.

As is discussed above, a pair of sets of pixels $P_{4-1C}$, $P_{4-2C}$ are identified as corresponding to surfaces on either side of the joint 440C, e.g., on surfaces on the extensions 432C, 434C, and vibrometric signatures 40-1C, 40-2C are calculated for the sets of pixels $P_{4-1C}$, $P_{4-2C}$. Once the vibrometric signatures 40-1C, 40-2C have been calculated, the vibrometric signatures 40-1C, 40-2C may be compared to one another. As is shown in FIG. 4C, because the vibrometric signatures 40-1C, 40-2C are different from one another, in that the vibrometric signatures 40-1C, 40-2C are power spectral densities having a different shapes, different numbers of vibration modes, different natural frequencies and different power levels or energy levels, the joint 440C is determined to be not sufficiently tight, and the aerial vehicle 440C may not be cleared to perform any number of operations. In particular, the differences between the vibrometric signatures 40-1C, 40-2C indicate that energy imparted upon the extension 432C from the excitation by the acoustic speaker 470C will not be transferred to the extension 434C, or vice versa, in a uniform manner, and the joint 440C will not behave in a manner similar to a uniform member, such as the extension 432A of FIG. 4A, and that further inspections, maintenance or repair to the joint 440C, or to the extension 432C, the extension 434C or the fastener 436C, are necessary.

The aerial vehicles 410A, 410B, 410C, the frames 415A, 415B, 415C, the propulsion motors 430A, 430B, 430C, the extensions 432A, 432B, 432C, the imaging devices 450A, 450B, 450C, and the acoustic speakers 470A, 470B, 470C shown in FIGS. 4A through 4C may have any of the same attributes, characteristics or features, or different attributes, characteristics or features, in accordance with the present disclosure.

Natural frequencies of vibration of aspects that are coupled at a joint or a junction may be determined from imaging data captured as the joint or the junction is subjected to external excitation and processed to generate vibrometric signatures, power spectral diagrams or other representations of the response of the joint or the junction to the excitation. The imaging data may be further processed to determine amplitudes and/or phases of the vibrational response of the joint or the junction at such natural frequencies and modified to magnify the effects of the vibration. The modified imaging data may be used to determine mode shapes of vibration of the junction and the aspects coupled thereby.

Figure 5A:
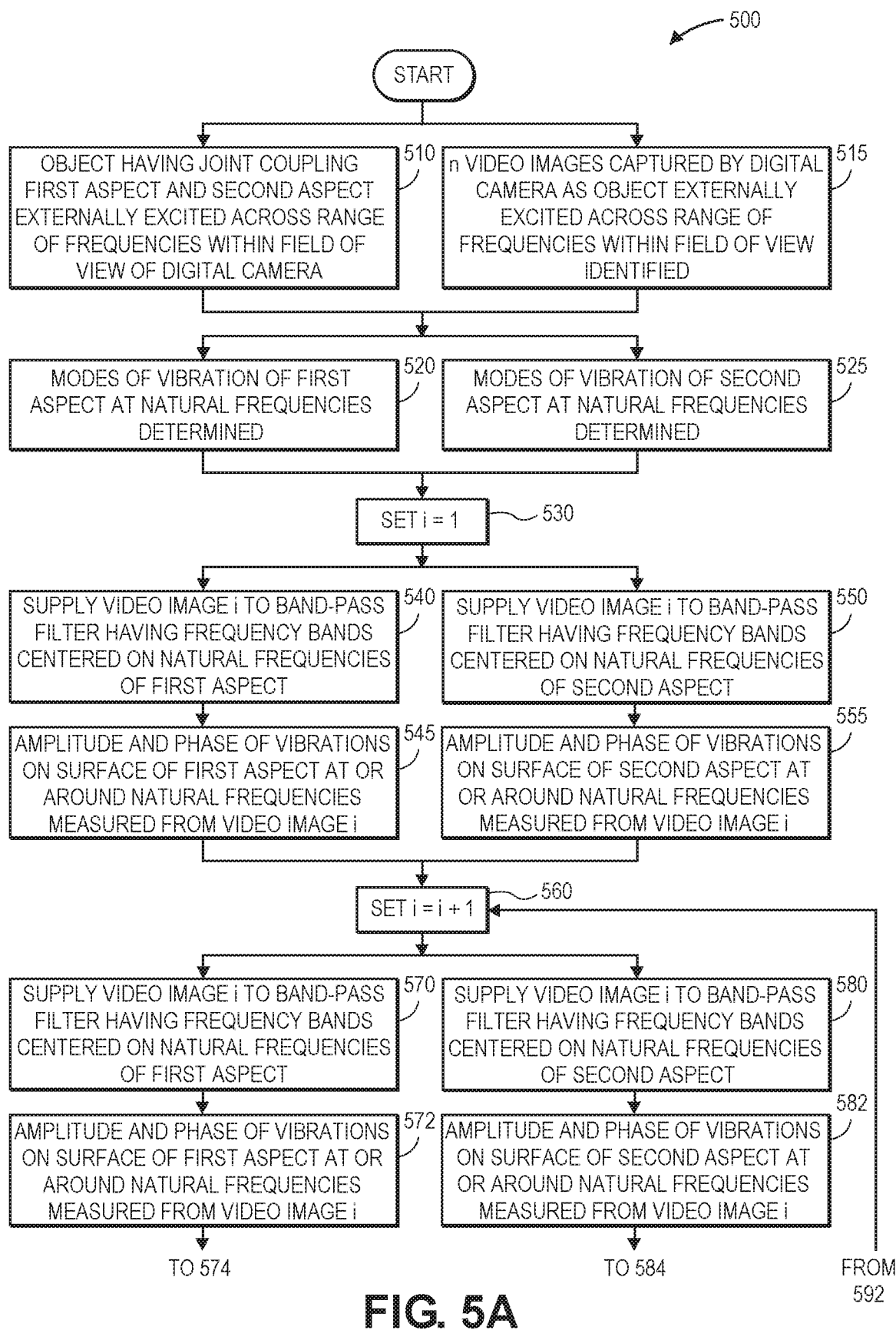
FIGS. 5A and 5B are a flow chart of one process for evaluating joints using vibrometric signatures in accordance with embodiments of the present disclosure.
Figure 5B:
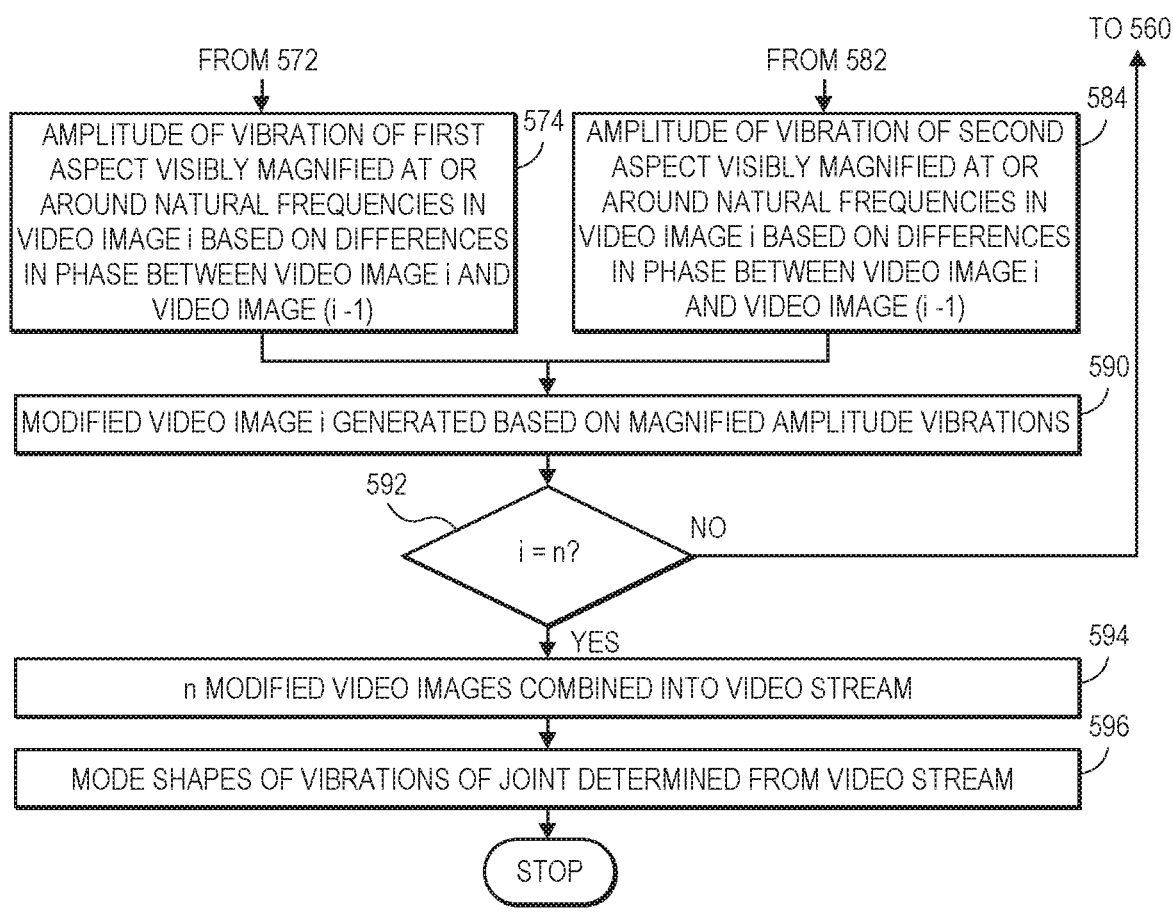

Referring to FIGS. 5A and 5B, a flow chart 500 of one process for evaluating joints using vibrometric signatures in accordance with embodiments of the present disclosure is shown. At box 510, an object having a joint coupling a first aspect and a second aspect is externally excited across a range of frequencies within a field of view of a digital camera. In parallel, at box 515, n video images are captured by a digital camera while the object (e.g., an aerial vehicle) is subject to extrinsic excitation across a range of frequencies within the field of view of the digital camera.

At box 520, modes of vibration of the first aspect at natural frequencies are determined. The modes of vibration of the first aspect may be determined in any manner. For example, one or more pixels corresponding to the first aspect may be identified or selected within each of the n video images, and the intensities of such pixels may be used to identify natural frequencies of vibration or natural vibrational modes of the first aspect, such as by determining a power spectral density of the first aspect from a time series of the intensities of the pixels corresponding to the first aspect determined across multiple frames, e.g., by a fast Fourier transform, and identifying frequencies at which absolute or local maximum power levels or energy levels of vibration are observed. Intensities of the pixels corresponding to the first aspect may be determined at a later time, e.g., after the object has been subjected to the excitation. The natural frequency for which the modes of vibration are determined at box 520 may be a first-order mode of vibration, or any other number or ordinal of mode of vibration.

In parallel, and at box 525, modes of vibration of the second aspect at natural frequencies are determined. The modes of vibration of the second aspect may also be determined in any manner. For example, the modes of vibration of the second aspect may be determined in the same manner that the modes of vibration of the first aspect were determined at box 520, or in a different manner.

The modes of vibration of the first aspect and the second aspect may be determined in real time or in near-real time, e.g., as the n video images are captured with the object being subjected to extrinsic excitation, or at a later time, such as where the imaging data is time-stamped or otherwise marked or designated to correspond with given frequencies. Alternatively, the object may be excited by one or more intrinsic sources, e.g., an operating propulsion motor.

At box 530, a value of a step variable i is set equal to one, or i=1. At box 540, a video image i is supplied to a band-pass filter having frequency bands centered on the natural frequencies of the first aspect, as determined at box 520. For example, in some embodiments, the band-pass filter may include one or more components or systems for identifying portions of the video image i that depict aspects vibrating at or around a natural frequency of the object, e.g., within a pass band centered on the natural frequency, and removing portions of the video image i that do not depict objects vibrating at or around the natural frequency, e.g., background features or foreground features that do not vibrate at or around the natural frequency. The band-pass filter thus filters frequencies of vibration that are above or beyond the boundaries of the pass band, e.g., sufficiently greater than or less than one or more of the natural frequencies of the object to which the band-pass filter is applied.

For example, in some embodiments, where an image depicting at least the first aspect being subjected to excitation is provided to the band-pass filter as an input, a portion of the image depicting only aspects of the object that are vibrating at or around the natural frequency is identified as an output. A difference image, or a balance or remainder of the video image i after the portions depicting the first aspect vibrating at or around the natural frequency are extracted from the video image i, may also be identified based on the output. In some embodiments, aspects of the object that are vibrating at or around a specific frequency, e.g., the first aspect, may be identified by providing the video image i to a high-pass filter, and then to a low-pass filter, or vice versa, rather than providing the video image i to a band-pass filter.

At box 545, amplitudes and phases of the vibrations on the surface of the first aspect at or around the natural frequencies are measured from the video image i, e.g., at or around the natural frequencies of vibration of the modes of vibration of the first aspect that were determined at box 520. As is discussed above, one or more portions of the video image i that depict aspects of the object vibrating at or near one of the natural frequencies, such as the first aspect, are identified or extracted from the video image i. The amplitudes and the phases may be determined in any manner, such as by performing a transformation of the video image i. For example, the portions may be provided to one or more algorithms that determine positions or orientations of the first aspect, and amplitudes or phases of the vibration may be determined from such portions.

In parallel, at box 550, the video image i is supplied to a band-pass filter having frequency bands centered on the natural frequencies of the second aspect, and at box 555, amplitudes and phases of the vibrations on the surface of the second aspect at or around the natural frequencies are measured from the video image i, e.g., at or around the natural frequencies of vibration determined at box 525. The band-pass filter to which the video image i is supplied at box 550 may have one or more of the same components as the band-pass filter to which the video image i is supplied at box 540, or one or more different components. Furthermore, in some embodiments, the band-pass filter may be the same band-pass filter to which the video image i was supplied at box 540, such as where the natural frequencies of the first aspect and the second aspect are similar to one another. One or more portions of the video image i that depict aspects of the object vibrating at or near the natural frequencies, such as the second aspect, are identified or extracted from the video image i. The amplitudes and the phases may be determined in any manner, such as by performing a transformation of the video image i. For example, the portions may be provided to one or more algorithms that determine positions or orientations of the second aspect, and amplitudes or phases of the vibration may be determined from such portions.

At box 560, the value of the step variable i is further incremented by one, or i=i+1. At box 570, video image i is supplied to a band-pass filter having frequency bands centered on the natural frequencies of the first aspect, as determined at box 520, such as is discussed above with regard to box 540. At box 572, amplitudes and phases of the vibrations on the surface of the first aspect at or around the natural frequencies are measured from the video image i, e.g., at or around the natural frequencies of vibration of the modes of vibration of the first aspect that were determined at box 520, such as is discussed above with regard to box 540. At box 574, amplitudes of vibration of the first aspect are visibly magnified at or around the natural frequencies of the first aspect, as determined at box 520, based on differences in phase between the video image i and the video image (i−1). Alternatively, the amplitudes of vibration of the first aspect are visibly magnified at or around the natural frequencies of the first aspect based on differences in phase between the video image i and any previously captured video image.

Similarly, and in parallel, at box 580, video image i is supplied to a band-pass filter having frequency bands centered on the natural frequencies of the second aspect, as determined at box 525, such as is discussed above with regard to box 550. As is discussed above, in some embodiments, the band-pass filter may be the same band-pass filter to which the video image i was supplied at box 570, such as where the natural frequencies of the first aspect and the second aspect are similar to one another.

At box 582, amplitudes and phases of the vibrations on the surface of the second aspect at or around the natural frequencies are measured from the video image i, e.g., at or around the natural frequencies of vibration of the modes of vibration of the second aspect that were determined at box 525, such as is discussed above with regard to box 555.

At box 584, amplitudes of vibration of the second aspect are visibly magnified at or around the natural frequencies of the second aspect, as determined at box 525, based on differences in phase between the video image i and the video image (i−1). Alternatively, the amplitudes of vibration of the first aspect are visibly magnified at or around the natural frequencies of the second aspect based on differences in phase between the video image i and any previously captured video image.

At box 590, a modified video image i is generated based on the amplitude vibrations magnified at box 574 and box 584. For example, where the filtering of a video image i about a natural frequency, such as is discussed above with regard to box 540 and box 570 or box 550 and box 580, results in the generation of a portion of the video image i depicting the first aspect or the second aspect vibrating at a specific frequency and a difference image, the portions of the image depicting the first aspect or the second aspect vibrating at the specific frequencies in the video image i may be combined, along with a modified difference image representing a balance of the video image i less the portions depicting the first aspect and the second aspect.

At box 592, whether the value of the step variable i is equal to n is determined. If the value of the step variable i is not equal to n, then the process returns to box 560, where the value of the step variable i is further incremented by one, or i=i+1, and to box 570 and box 580 in parallel. If the value of the step variable i is equal to n, however, then n modified video images are combined into a video stream. For example, the n video images that are generated at box 590 may be subjected to a time series analysis on the motion for each frame.

At box 596, mode shapes of vibrations of the joint are determined from the video stream, and the process ends. For example, the mode shape may be a spatial distribution or model of the behavior of the object or portions thereof in the presence of vibration at the natural frequency, may be generated at the natural frequency, and may be determined by an optical flow algorithm, a matching algorithm, or any other algorithm that receives the portions of the video images identified as depicting vibrating aspects of the object as inputs and determines disparities between pixels appearing within each of the images as outputs, or in any other manner.

Referring to FIGS. 6A through 6H, views of aspects of one system 600 for evaluating joints using vibrometric signatures in accordance with embodiments of the present disclosure are shown. Except where otherwise noted, reference numerals preceded by the number "6" shown in FIGS. 6A through 6H indicate components or features that are similar to components or features having reference numerals preceded by the number "4" shown in FIGS. 4A through 4C, by the number "2" shown in FIG. 2 or by the number "1" shown in FIGS. 1A through 1K.

Figure 6A:
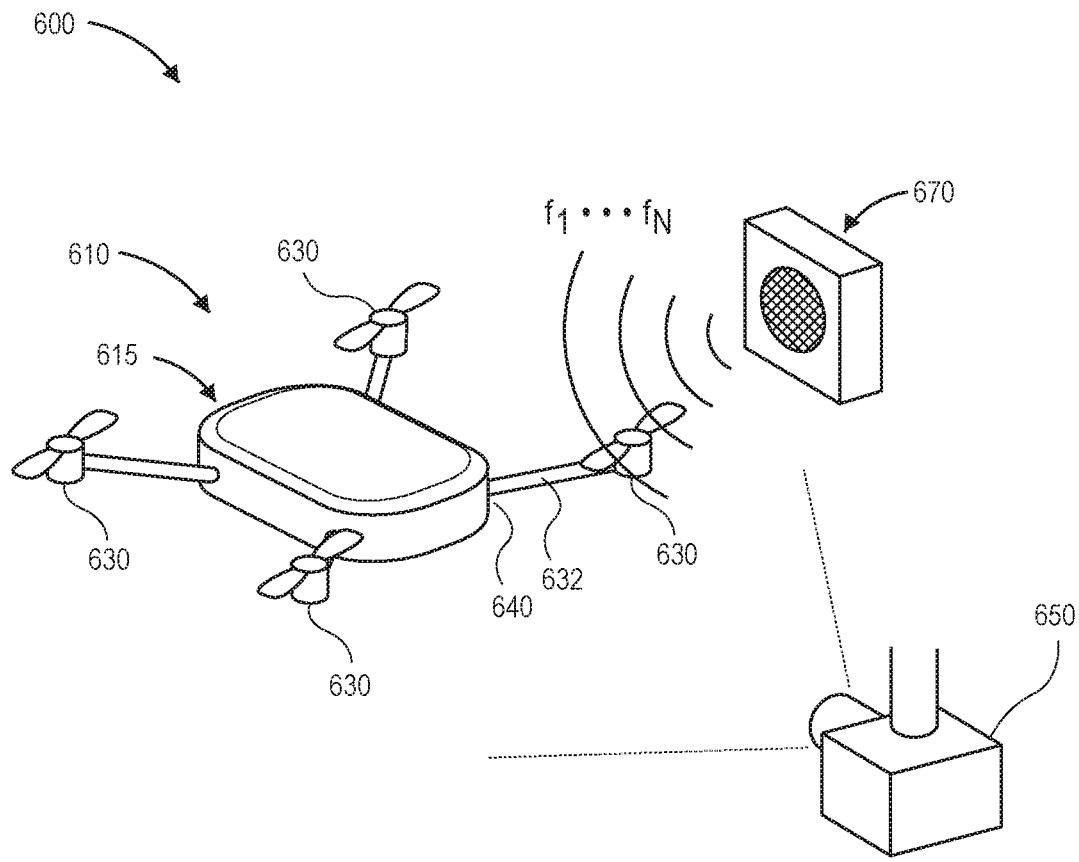

As is shown in FIG. 6A, the system 600 includes an aerial vehicle 610, an imaging device 650 (e.g., a digital camera) and an acoustic speaker 670 (or another excitation source). The aerial vehicle 610 includes a frame 615 and a plurality of propulsion motors 630 mounted to the frame 615. The imaging device 650 is aligned to include at least a portion of the aerial vehicle 610 having one of the propulsion motors 630, which is mounted to an extension 632 that is coupled to the frame 615 at a joint 640 within a field of view.

The acoustic speaker 670 is also aligned to project acoustic energy in the form of sounds having any frequency, wavelength or intensity upon the frame 615, the one of the propulsion motors 630, the extension 632 and/or the joint 640. Alternatively, any excitation source that is configured to excite the aerial vehicle 610 at known, selected frequencies $f_1 \ldots f_n$, with the aerial vehicle 610 within a field of view of the imaging device 650, e.g., by direct contact with the aerial vehicle 610 or in any other manner, may be utilized to impart excitation upon the aerial vehicle 610. For example, in some embodiments, one or more motors of the aerial vehicle 610 may act as an intrinsic excitation source for the aerial vehicle 610, where such motors 630 may be specifically controlled to impart excitation upon the aerial vehicle 610 at one or more selected frequencies within a known, defined range.

Figure 6B:
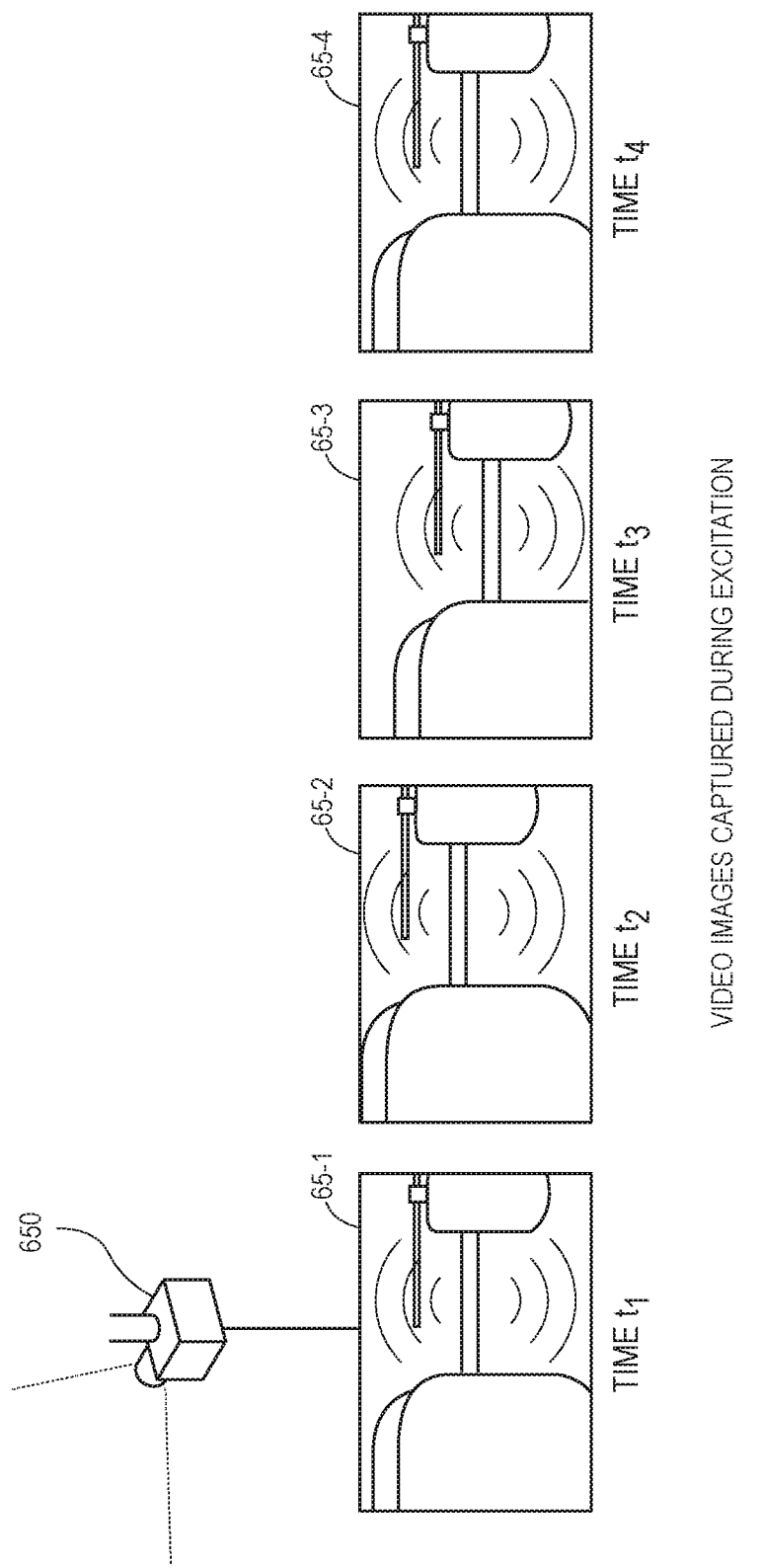

As is shown in FIG. 6B, a plurality of video images 65-1, 65-2, 65-3, 65-4 are captured by the imaging device 650 during the excitation of the aerial vehicle 610. In some embodiments, the imaging device 650 is programmed or configured to capture digital images at a high speed or frame rate, such as two thousand frames per second (2,000 fps), four thousand frames per second (4,000 fps), or preferably at least twice a maximum frequency of the excitation.

Figure 6C:
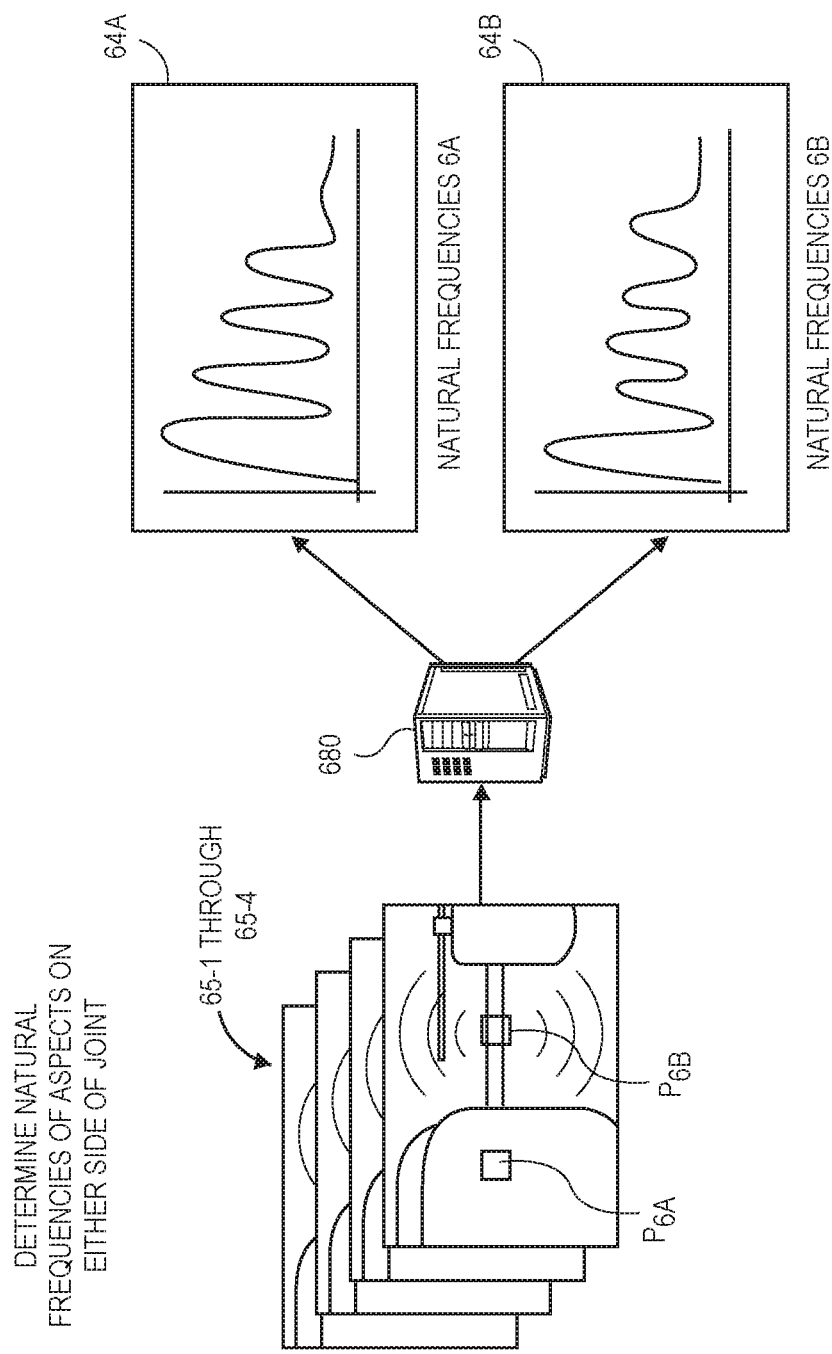
Figure 6D:
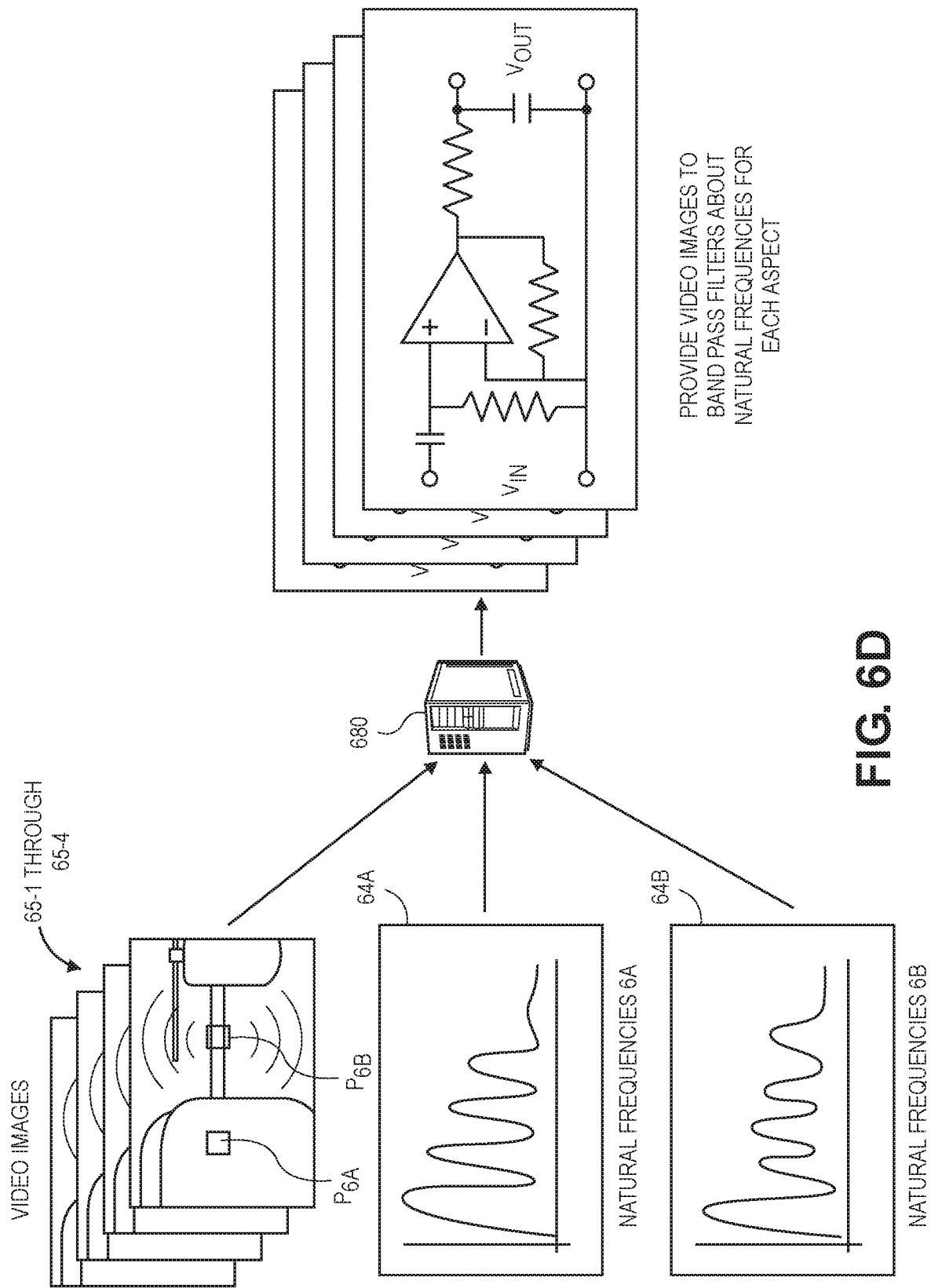

As is shown in FIG. 6C, the plurality of video images 65-1, 65-2, 65-3, 65-4 and sets of natural frequencies 64A, 64B of a portion of the frame 615 and a portion of the extension 632 are provided to a server 680 over one or more networks (not shown). The sets of natural frequencies 64A, 64B may have been determined in any manner, such as by analyzing changes in position or intensity of sets of pixels P6A, P6B corresponding to the portion of the frame 615 and the portion of the extension 632 over a range of frequencies, and generating a power spectral density identifying the sets of natural frequencies 64A, 64B from such changes in position or intensity, or in any other manner. As is shown in FIG. 6D, each of the video images 65-1, 65-2, 65-3, 65-4 may be provided to band-pass filters applied within frequency bands, each of which is centered around one of the natural frequencies identified in the sets 64A, 64B, to amplify the motion corresponding to the one of the natural frequencies. The width of the band-pass bands may be selected on any basis. In some embodiments, the images 65-1, 65-2, 65-3, 65-4 may be provided first to high-pass filters, and next to low-pass filters, or vice versa, rather than to band-pass filters. Alternatively, in some embodiments, the images 65-1, 65-2, 65-3, 65-4 may be provided to the same band-pass filters to evaluate both sets of pixels $P_{6A}$, $P_{6B}$, such as where one or more values of each of the sets of the natural frequencies are similar to one another.

Figure 6E:
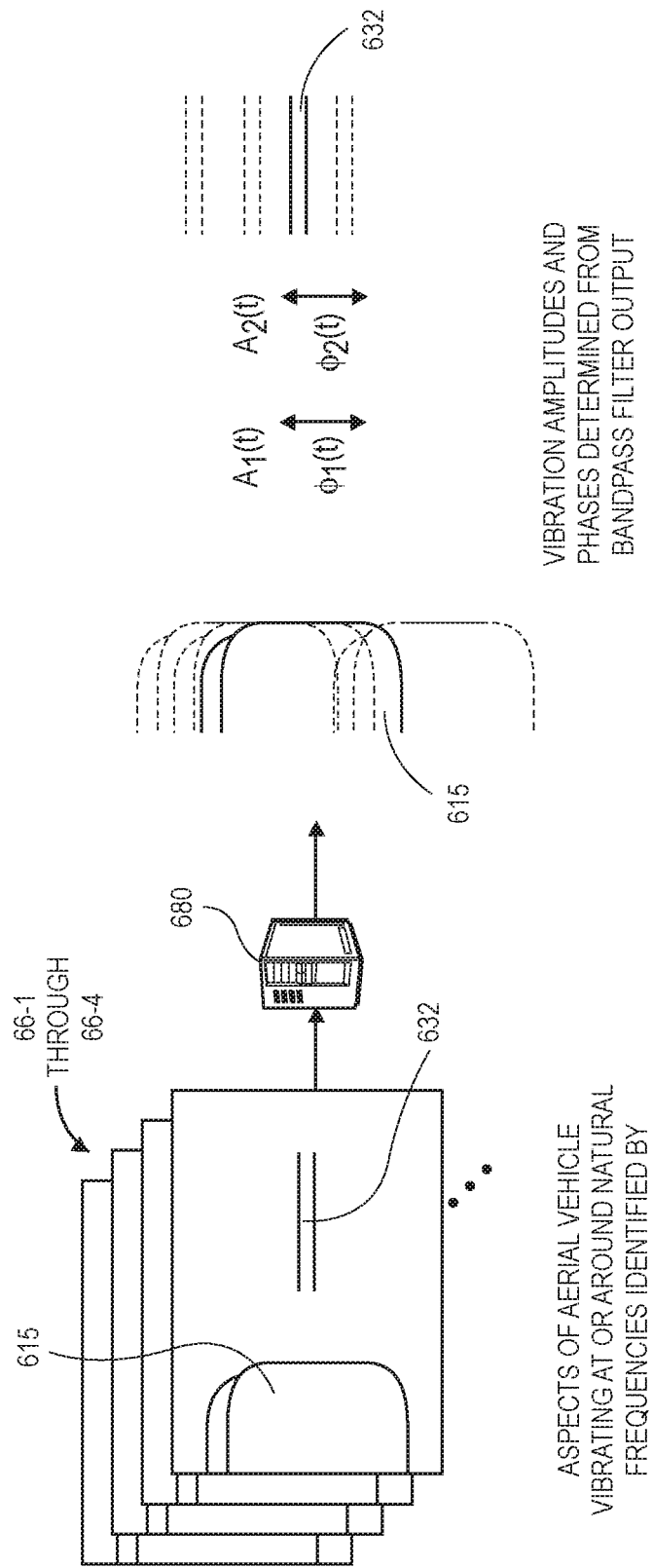

As is shown in FIG. 6E, portions 66-1, 66-2, 66-3, 66-4 of the images 65-1, 65-2, 65-3, 65-4 that depict aspects of the aerial vehicle 610 (e.g., portions of the frame 615 and the extension 632) that are vibrating at or near natural frequencies of the aerial vehicle 610 are identified based on outputs from the band-pass filters of FIG. 6D. The portions 66-1, 66-2, 66-3, 66-4 depicting aspects of the aerial vehicle 610 vibrating at or near the natural frequencies of the aerial vehicle 610 are provided to a server 680, e.g., over a network. The server 680 may be configured to determine amplitudes and phases of the vibration of such aspects, including amplitudes $A_1(t)$, $A_2(t)$ and phases $\phi_1(t)$, $\phi_2(t)$ of the aspects of the aerial vehicle 610. For example, the portions 66-1, 66-2, 66-3, 66-4 may be supplied to an optical flow algorithm, a matching algorithm, or any other algorithm that is configured to determine disparities, displacements and/or parallax of objects within such images.

As is shown in FIG. 6F, the portions 66-1, 66-2, 66-3, 66-4 may be magnified to enhance the visibility of the vibration or other motion thereof by multiplying the values of the phases $\phi_1(t)$, $\phi_2(t)$ as a function of time of each of the aspects of the aerial vehicle 610 by amplification factors $\alpha_1$, $\alpha_2$. For example, multiplying each of the phases $\phi_1(t)$, $\phi_2(t)$ by the amplification factors $\alpha_1$, $\alpha_2$ necessarily means that difference between phases of vibration of different aspects of the aerial vehicle 610 (e.g., the frame 615 and/or the extension 632) appearing within each image, or between phases of vibration of the same aspects within different images, will also be amplified accordingly. A set of imaging data 66-1', 66-2', 66-3', 66-4' depicting the modified portions 66-1, 66-2, 66-3, 66-4 extracted from the images 65-1, 65-2, 65-3, 65-4 may be generated accordingly.

Figure 6G:
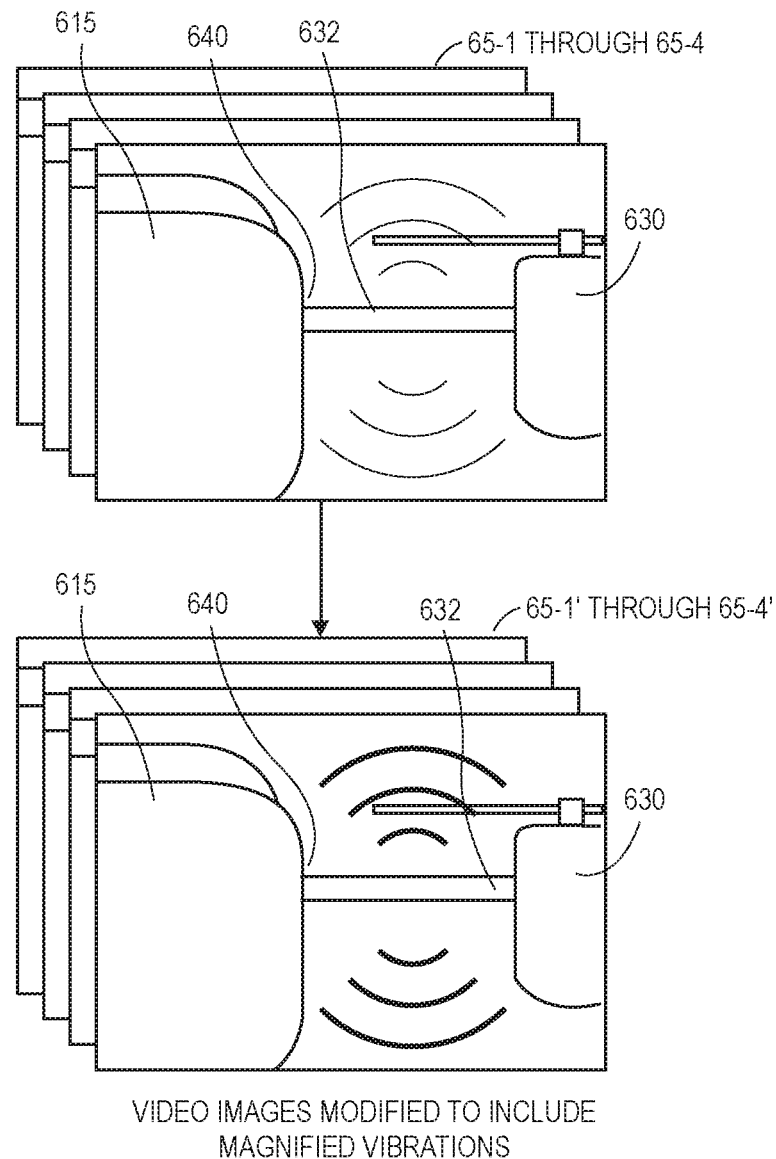

As is shown in FIG. 6G, the set of imaging data 66-1', 66-2', 66-3', 66-4' may be combined with the balances or remainders of the images 65-1, 65-2, 65-3, 65-4 from which the portions 66-1, 66-2, 66-3, 66-4 were extracted to form a modified set of imaging data 65-1', 65-2', 65-3', 65-4' that depicts the vibration of the aerial vehicle 610 in a magnified manner, e.g., based on the differences in phases $\phi_1(t)$, $\phi_2(t)$ as amplified by the amplification factors $\alpha_1$, $\alpha_2$.

Figure 6H:
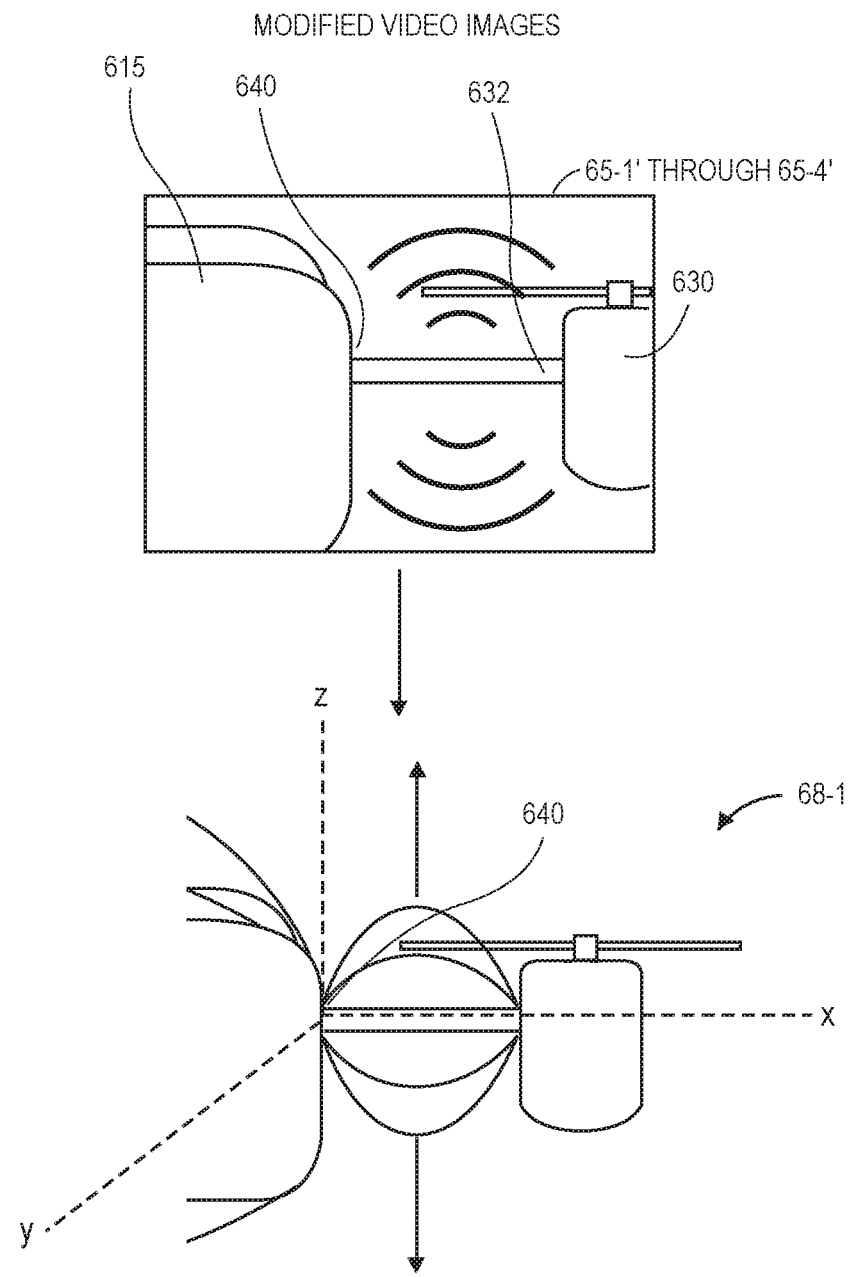

As is shown in FIG. 6H, a mode shape 68-1, or a spatial distribution or model of the behavior of the joint 640 in the presence of vibration at the natural frequencies $(f_N)_{1A}$, $(f_N)_{1B}$, is generated based on a stream of the imaging data 65-1', 65-2', 65-3', 65-4'. The mode shape 68-1 depicts the behavior of the joint 640 at the natural frequencies $(f_N)_{1A}$, $(f_N)_{1B}$, and may thus act as a visual tool for determining one or more actions or preemptive steps to be taken in order to prevent the aerial vehicle from vibrating at the natural frequencies $(f_N)_{1A}$, $(f_N)_{1B}$, such as by imposing one or more operating constraints on the aerial vehicle 610 or the joint 640, or by modifying the aerial vehicle 610 or the joint 640 to ensure that the frequencies $(f_N)_{1A}$, $(f_N)_{1B}$, are no longer a natural frequency of vibration or no longer results in harmful oscillations.

After vibrometric signatures have been calculated for sets of pixels corresponding to aspects on opposite or different sides of a joint or a junction, the vibrometric signatures may be used to determine material properties of the joint or the junction, such as mass matrices, dampings, or stiffnesses of one or more of the aspects coupled at the joint or the junction. For example, vibrometric signatures, which reside in the frequency domain, may be calculated for various points associated with a joint or a junction used to determine a response function in the frequency domain that depicts relationships between forces supplied at one of the points and displacements resulting from such forces in the frequency domain. The response function may be transformed into the time domain and a resulting transfer function may be used to calculate the material properties accordingly.

Figure 7:
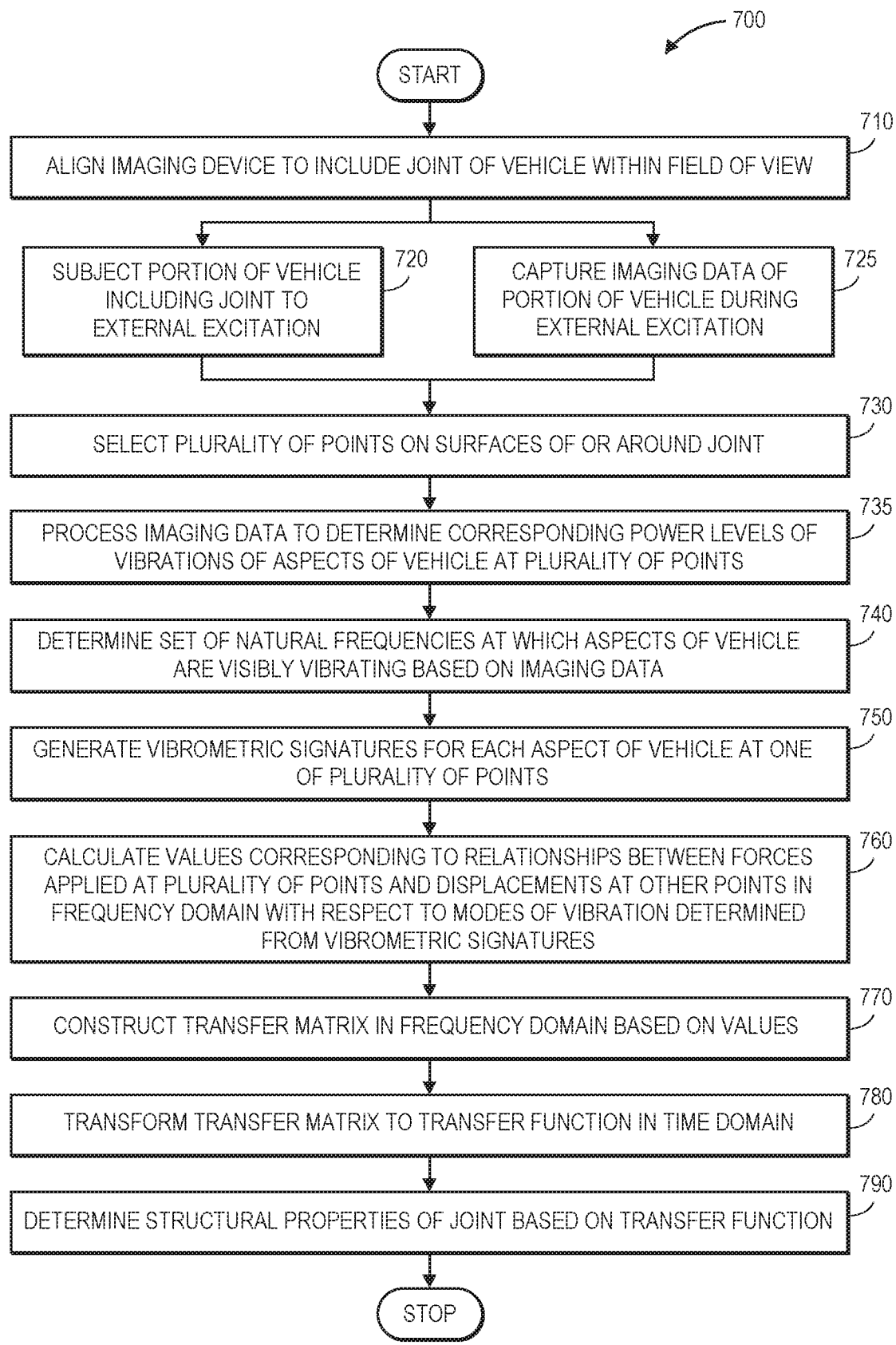
FIG. 7 is a flow chart of one process for evaluating joints using vibrometric signatures in accordance with embodiments of the present disclosure.

Referring to FIG. 7, a flow chart of one process for evaluating joints using vibrometric signatures in accordance with embodiments of the present disclosure is shown.

At box 710, an imaging device is aligned to include a joint (or a junction) of a vehicle within a field of view. For example, in some embodiments, an imaging device may include a vehicle, in its entirety, within its field of view. In some other embodiments, the imaging device may include the joint and portions of any number of aspects that are coupled to one another at the joint, which may be defined by combining one or more aspects with one or more bolts, screws, rivets, adhesives or other fasteners, and may couple any number or type of aspects of the vehicle.

At box 720, a portion of the vehicle including the joint is subjected to external excitation, e.g., over a range of frequencies, by an excitation source such as an acoustic speaker or any other system configured to project energy at constant or varying intensities over a range of frequencies, such as according to a step function or a delta function, or in any other manner. In some embodiments, however, the excitation source may be any other component configured to excite the vehicle, to generate vibrations or other motion over the range of frequencies. In parallel with the excitation, at box 725, imaging data is captured by the imaging device during the excitation over the range of frequency. The imaging device may be configured to capture images at any frame rate, e.g., at least as great as a Nyquist frequency.

At box 730, a plurality of points are selected on surfaces of or around the joint. The points and/or surfaces may be selected on any basis. For example, the surfaces may be any flat, angled, or rounded surfaces positioned randomly or at regular intervals with respect to one or more aspects of the joint. In some embodiments, at least one of the points is located on two or more of the aspects that are coupled at the joint. For example, in some embodiments, at least eight points are selected on the surfaces of or around the joint, with at least four of the points being located on one of the aspects coupled at the joint and at least four of the points being located on another of the aspects coupled at the joint. In some embodiments, the surfaces may be selected based on their respective textures, patterns or features. In some other embodiments, the surfaces may be selected based on their locations with respect to the joint, e.g., in a grid or an array.

At box 735, the imaging data is processed to determine corresponding power levels of vibrations of aspects of the vehicle corresponding to the plurality of points selected at box 730. For example, positions of the selected points or pixels may be detected and tracked in successive frames to determine an extent to which such aspects vibrate in response to the excitation. In some embodiments, an optical flow method or technique may be utilized to detect and track small movements of aspects of the vehicle within the imaging data. In some embodiments, a steerable filter method by which small motions across or between image frames are estimated using a bank of filters, or a steerable pyramid, to break down each of the image frames into an amplitude and a phase at different scales and orientations. In some other embodiments, intensities of each of the selected points or pixels may be determined for each of a plurality of image frames and processed to determine power levels of vibration at such points or pixels.

At box 740, a set of natural frequencies at which the aspects of the vehicle are visibly vibrating is determined based on the imaging data. For example, the set of natural frequencies may be identified for the one or more modes of vibration as corresponding to peak levels of power or energy in response to the excitation.

At box 750, vibrometric signatures are generated for each of the aspects of the vehicle corresponding to one of the plurality of points. For example, the vibrometric signatures, which reside in the frequency domain, may be sets of data identifying natural frequencies at which peak power levels at the plurality of points were observed as functions of frequency, or plots or waves corresponding to power levels associated with frequencies over the range at such points.

At box 760, values corresponding to relationships between forces applied at the plurality of points and displacements at others of the plurality of points in a frequency domain with respect to each of the modes of vibration are calculated based on each of the vibrometric signatures for the plurality of points. In some embodiments, the value may be calculated based on a number of factors that may be determined from the vibrometric signatures, which reside in the frequency domain. For example, numbers of vibrational modes and natural frequencies of the vibrational modes may be determined from the vibrometric signatures and used to model forces and displacements of the joint at the respective points. Additionally, damping of the joint, or a measure of an amplitude of displacement of the joint at or near resonance, e.g., one of the natural frequencies, may also be determined from the vibrometric signatures and used to model forces and displacements of the joint at the respective points. Moreover, a shape (e.g., a mode shape) of a joint may also be determined, e.g., from modified images captured during external excitation of the joint based on amplitudes or phases of vibration of the joint, determined from the vibrometric signatures and used to model forces and displacements of the joint at the respective points. Any other variables or constants that compensate for variations in how the joint is depicted within images captured thereby, including variables or constants relating to focal lengths, aperture widths, dimensions of image planes or other factors may also be considered in modeling forces and displacements of the joint at the respective points.

At box 770, a transfer matrix in the frequency domain is constructed based on the values calculated at box 760. In some embodiments, where n points are selected, a transfer matrix having dimensions of n×n and including each of the values calculated at box 760 is constructed.

At box 780, the transfer matrix in the frequency domain constructed at box 770 is transformed to a transfer function in the time domain, e.g., by an inverse Fourier transformation, according to the Fourier inversion theorem. At box 790, structural properties of the joint are determined from the transfer function, and the process ends.

Referring to FIGS. 8A through 8H, views of aspects of one system for evaluating joints using vibrometric signatures in accordance with embodiments of the present disclosure. Except where otherwise noted, reference numerals preceded by the number "8" shown in FIGS. 8A through 8H indicate components or features that are similar to components or features having reference numerals preceded by the number "6" shown in FIGS. 6A through 6H, by the number "4" shown in FIGS. 4A through 4C, by the number "2" shown in FIG. 2 or by the number "1" shown in FIGS. 1A through 1K.

Figure 8A:
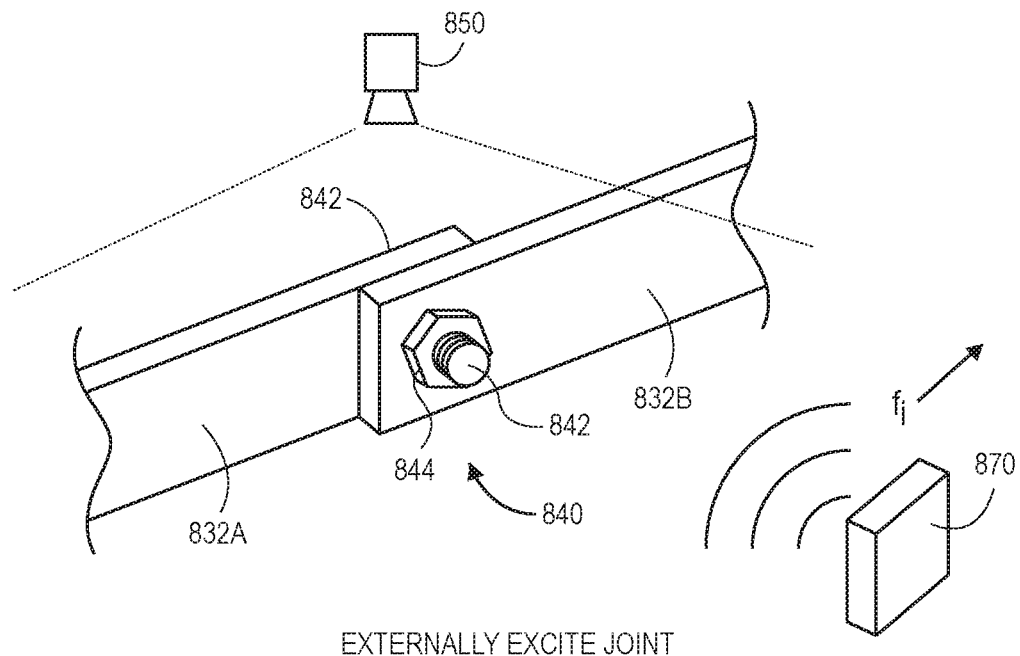

As is shown in FIG. 8A, a joint 840 between two aspects 832A, 832B is subjected to excitation by an acoustic speaker 870. The joint 840 is defined by a nut 842 extending through holes defined in ends of the aspects 832A, 832B and a bolt 844 coupled to a threaded end of the nut 842. The joint 840 and the aspects 832A, 832B may be component parts of any type or form of system, including a vehicle (e.g., an aerial vehicle). In some embodiments, the joint 840 may be defined by any system, component or technique, including but not limited to one or more clips, rivets, fasteners, adhesives or welds. Additionally, an imaging device 850 is aligned to include the joint 840 and all or portions of the aspects 832A, 832B within a field of view.

Figure 8B:
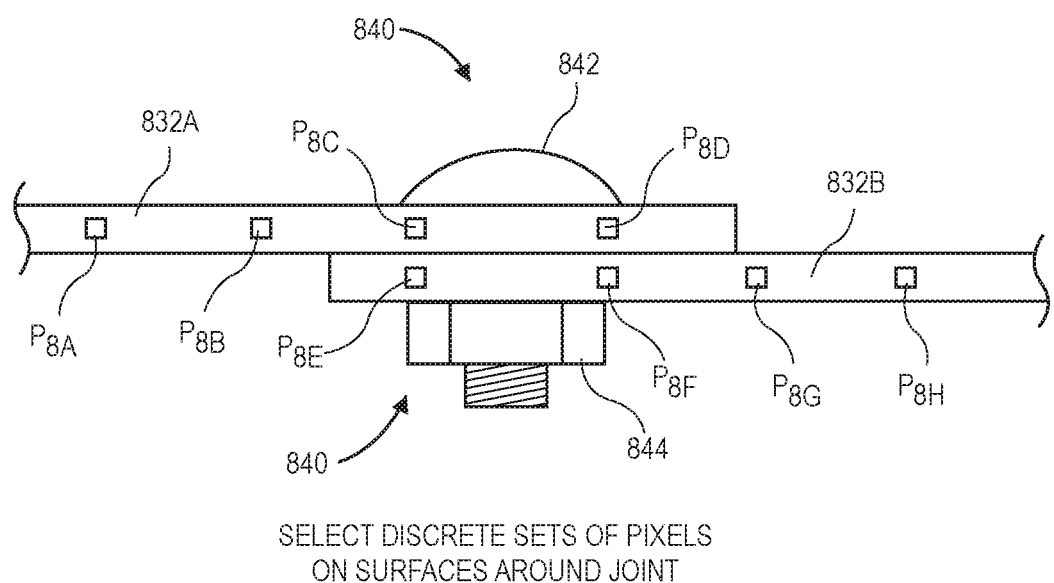

As is shown in FIG. 8B, sets of pixels $P_{8A}$, $P_{8B}$, $P_{8C}$, $P_{8D}$, $P_{8E}$, $P_{8F}$, $P_{8G}$, $P_{8H}$ within an imaging plane of the imaging device 850 and corresponding to surfaces of the aspects 832A, 832B and/or the joint 840 are selected. Each of the sets $P_{8A}$, $P_{8B}$, $P_{8C}$, $P_{8D}$, $P_{8E}$, $P_{8F}$, $P_{8G}$, $P_{8H}$ may include any number of pixels, e.g., as few as one. In some embodiments, sets of pixels corresponding to at least eight surfaces of the joint 840 and/or the aspects 832A, 832B are selected, such as is shown in FIG. 8B.

Figure 8C:
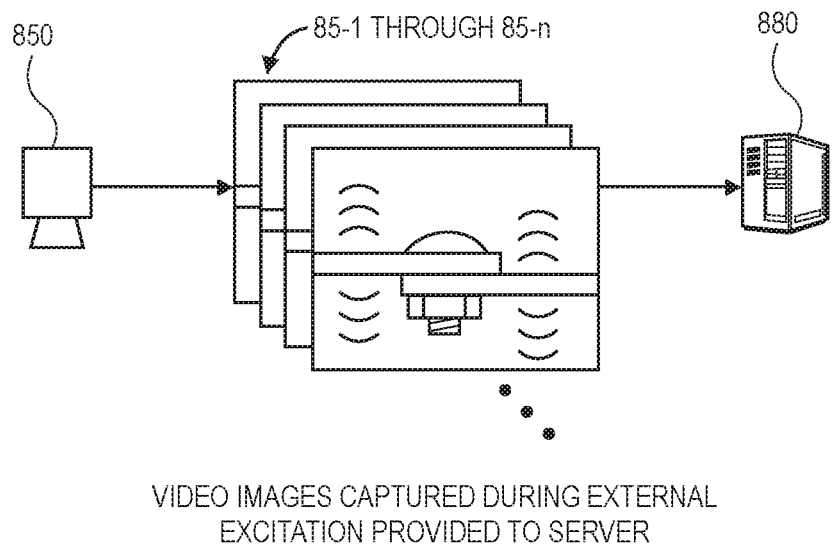
Figure 8D:
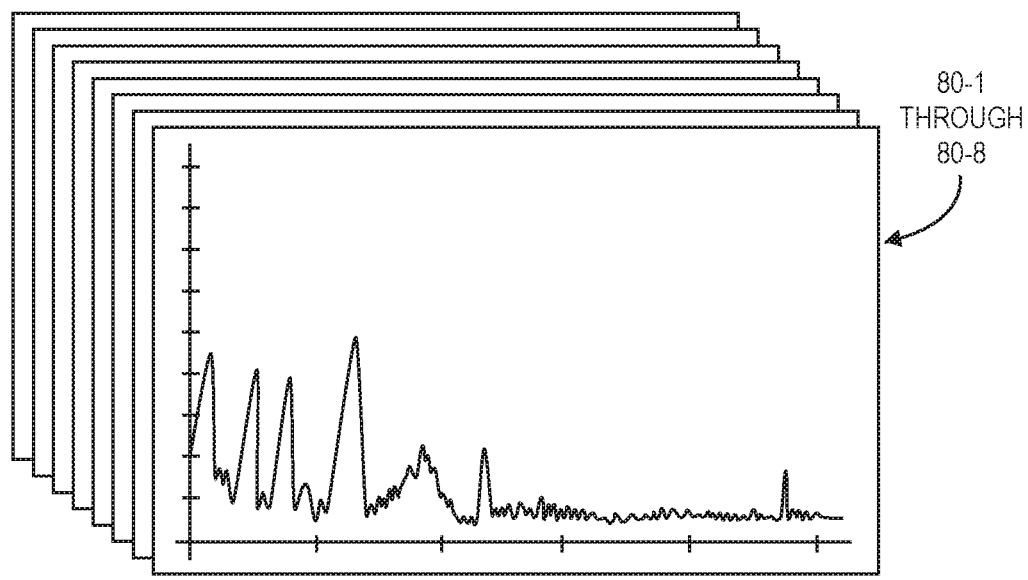

As is shown in FIG. 8C, a plurality of images 85-1 through 85-n captured of the joint 840 and/or the aspects 832A, 832B during the excitation are provided by the imaging device 850 to a server 880. The imaging data may be captured at any rate, e.g., at least twice the frequencies at which the vehicle is excited (e.g., at least twice a maximum frequency of the range), or above a Nyquist rate. As is shown in FIG. 8D, vibrometric signatures 80-1 through 80-8 are generated for each of the sets of pixels $P_{8A}$, $P_{8B}$, $P_{8C}$, $P_{8D}$, $P_{8E}$, $P_{8F}$, $P_{8G}$, $P_{8H}$ of the joint 840 based on the images 85-1 through 85-n. The vibrometric signatures 80-1 through 80-8 are generated based on differences in power levels or energy levels of vibration at the various frequencies, which may be determined based on deviations in positions or intensities of the sets of pixels $P_{8A}$, $P_{8B}$, $P_{8C}$, $P_{8D}$, $P_{8E}$, $P_{8F}$, $P_{8G}$, $P_{8H}$, as described above, or in any other manner. The vibrometric signatures 80-1 through 80-8 may identify natural frequencies of vibration for any number of modes, and depict or describe power levels or energy levels of vibration for the respective surfaces of the joint 840 as a function of frequency.

As is discussed above, mode shapes of a joint or a junction may be determined based on images captured during the excitation of the joint or the junction, and based on vibrometric signatures calculated from such images. As is shown in FIG. 8E, a set of mode shapes 88-1 through 88-8 are determined for the surfaces corresponding to each of the sets of pixels $P_{8A}$, $P_{8B}$, $P_{8C}$, $P_{8D}$, $P_{8E}$, $P_{8F}$, $P_{8G}$, $P_{8H}$ based on the images 85-1 through 85-n and the vibrometric signatures 80-1 through 80-8. For example, as is discussed above, the mode shapes 88-1 through 88-n may be determined for the joint 840 at the various frequencies over the range of excitation, such as the natural frequencies of the joint 840 and/or the aspects 832A, 832B. The images 85-1 through 85-n may be filtered to identify portions of such images that vibrate at the natural frequencies of the respective sets of pixels $P_{8A}$, $P_{8B}$, $P_{8C}$, $P_{8D}$, $P_{8E}$, $P_{8F}$, $P_{8G}$, $P_{8H}$, e.g., by one or more band-pass filters, and such portions may be processed to magnify the effects of vibration. Modified images that are generated to include the filtered portions, magnified by amplitudes and/or phases of vibration, may be formed and combined into a stream, which may be processed to determine mode shapes of surfaces corresponding to the sets of pixels $P_{8A}$, $P_{8B}$, $P_{8C}$, $P_{8D}$, $P_{8E}$, $P_{8F}$, $P_{8G}$, $P_{8H}$.

Figure 8F:
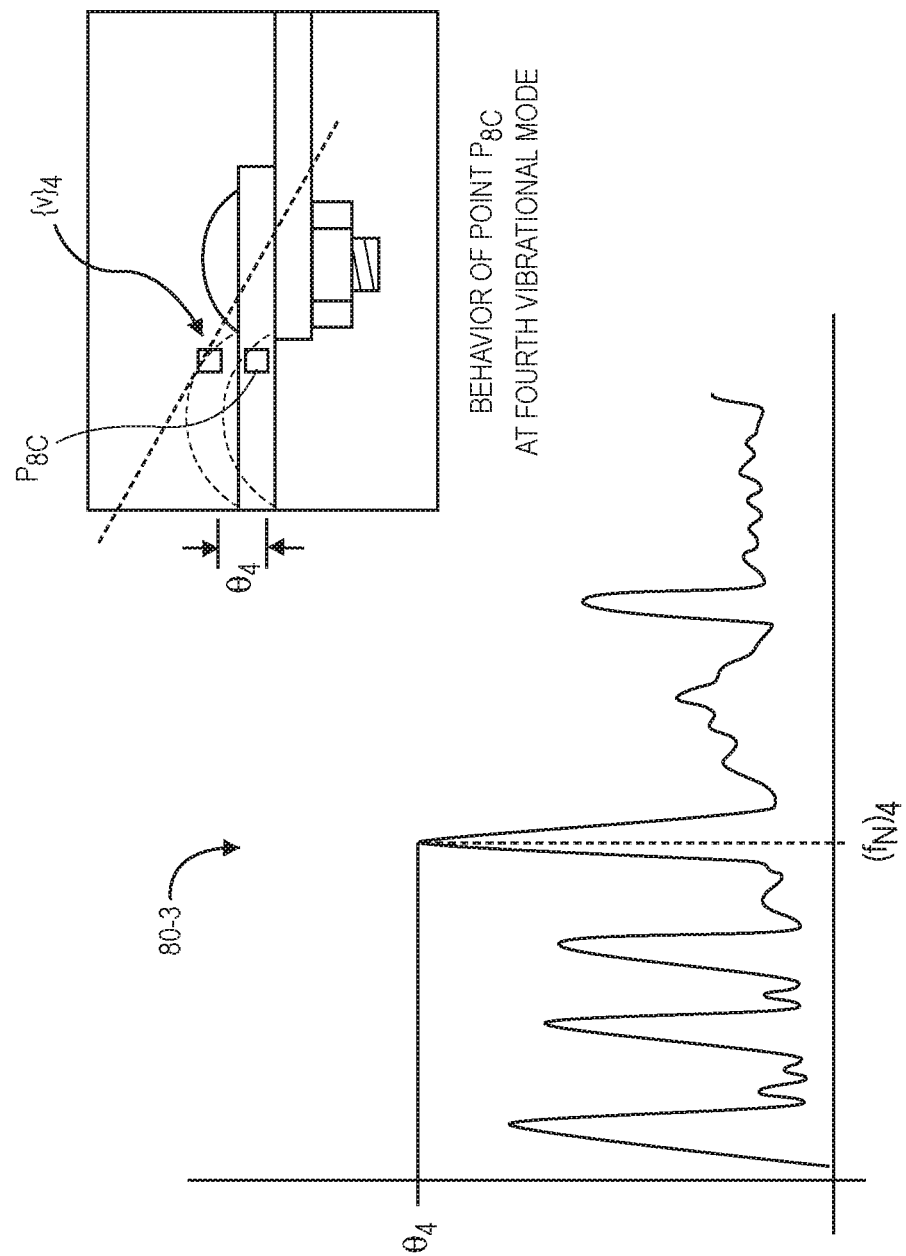

As is also discussed above, relationships between forces applied at points on a joint or a junction and deflections resulting from such forces may be determined from vibrometric signatures of the joint or the junction, and mode shapes of the joint or the junction at such frequencies. As is shown in FIG. 8F, a vibrometric signature 80-3 calculated for the set of pixels $P_{8C}$ shown in FIG. 8B is a power spectral diagram depicting power levels or energy levels of vibration of the surface of the joint 840 corresponding to the set of pixels $P_{8C}$ by which the joint 840 was excited, as is shown in FIG. 8A. The behavior of the joint 840 in general, and the surface of the joint 840 corresponding to the set of pixels $P_{8C}$ in particular, at the fourth vibrational mode is shown. In particular, a measure of damping $\theta_4$, or the amplitude of the structural response at the surface of the joint 840 corresponding to the set of pixels $P_{8C}$ when the joint 840 is subjected to excitation at the fourth natural frequency $(f_N)_4$, and a vector $\{v\}_4$ representative of a shape of the surface, may be calculated from the mode shapes 88-1 through 88-8 and the vibrometric signature 80-3.

As is shown in FIG. 8G, a transfer matrix representative of relationships between forces of vibration at points and displacements at other points when the joint 840, is subjected to excitation, e.g., a transfer of vibration across the joint 840, may be calculated from variables determined from the vibrometric signatures. For example, and as is shown in FIG. 8G, a frequency response function $H(j\omega)$ may be calculated as a function of frequency according to Equation (1), below:

$$\{X(j\omega)\}=[H(j\omega)]\cdot\{F(j\omega)\} \quad (1)$$

where X(jω) represents displacement of the joint 840, in the frequency domain, at a plurality of points $x_1$, $x_2$, $x_3$, $x_4$, $x_5$, $x_6$, $x_7$, $x_8$ corresponding to the sets of pixels $P_{8A}$, $P_{8B}$, $P_{8C}$, $P_{8D}$, $P_{8E}$, $P_{8F}$, $P_{8G}$, $P_{8H}$, when the joint 840 is subjected to excitation over a range of frequencies co, where j is the imaginary number corresponding to a square root of −1, and where F(jω) represents forces applied at the plurality of points $x_1$, $x_2$, $x_3$, $x_4$, $x_5$, $x_6$, $x_7$, $x_8$ when the joint 840 is subjected to excitation over the range of frequencies co.

The frequency response function H(jω) is a matrix of values $h_{pq}$, where each of the values $h_{pq}$ is a relationship between a value of a displacement $x_p$ at a point p of the points $x_1$, $x_2$, $x_3$, $x_4$, $x_5$, $x_6$, $x_7$, $x_8$ with a value of a force $F_q$ at a point q of the points $x_1$, $x_2$, $x_3$, $x_4$, $x_5$, $x_6$, $x_7$, $x_8$.

The various values of the frequency response function H(jω), or $h_{pq}$, are calculated according to Equation (2), below:

$$[H(j\omega)] = \sum_{r=1}^{N} \frac{2j\omega_r Q_r \{v\}_r \{v\}_r^T}{(\theta_r^2 + \omega_r^2 - \omega^2) - 2\theta_r j\omega} \quad (2)$$

where N is a number of vibrational modes of the vibrometric signature determined for one of the sets of pixels $P_{8A}$, $P_{8B}$, $P_{8C}$, $P_{8D}$, $P_{8E}$, $P_{8F}$, $P_{8G}$, $P_{8H}$, where $\{v\}_r$ is a natural frequency of a point corresponding to the one of the sets of pixels $P_{8A}$, $P_{8B}$, $P_{8C}$, $P_{8D}$, $P_{8E}$, $P_{8F}$, $P_{8G}$, $P_{8H}$ at one of the vibrational modes r, where Or is a damping, or an amplitude of a structural response when the joint is vibrating at a frequency ω at or near $\omega_r$, where $\{v\}_r$ is a vector representative of a deformation shape at the point corresponding to the one of the sets of pixels $P_{8A}$, $P_{8B}$, $P_{8C}$, $P_{8D}$, $P_{8E}$, $P_{8F}$, $P_{8G}$, $P_{8H}$, where $\{v\}_r^T$ is a transpose of the vector $\{v\}_r$, and where $Q_r$ is a constant defined for the one of the vibrational modes based on an amplitude of the response, and may take into account any number of factors associated with the images from which the vibrometric signature was calculated, or any other factor.

The values $h_{pq}$ of the frequency response function H(jω) may be used to determine whether the joint 840 is sufficiently tight, and capable of supporting normal operations, or whether the joint 840 requires further inspections, maintenance or repair. For example, as is discussed above, where the joint 840 is sufficiently tight, the frequency response function H(jω) is an identity matrix having values $h_{pq}$ equal to one for each p that is equal to q, or where p=q, and values $h_{pq}$ equal to zero for each p that is not equal to q, or where p≠q.

Once the frequency response function H(jω) has been calculated in the frequency domain, the frequency response function H(jω) may be subjected to an inverse Fourier transformation to convert the frequency response function to a transfer function from which material properties of the joint 840, such as a mass matrix, a damping or a stiffness, may be calculated for the joint 840. For example, the behavior of the joint 840 at the plurality of points $x_1$, $x_2$, $x_3$, $x_4$, $x_5$, $x_6$, $x_7$, $x_8$ may be modeled as a function of time according to a structural model expressed in Equation (3), below:

$$F(t) = [m] \cdot \ddot{x}(t) + [C] \cdot \dot{x}(t) + [k] \cdot x(t), \text{ where } x = \begin{bmatrix} x1 \\ \vdots \\ x_n \end{bmatrix} \quad (3)$$

where F(t) is a measure of force in a time domain at points $x_1$, $x_2$, $x_3$, $x_4$, $x_5$, $x_6$, $x_7$, $x_8$, [m] is a mass matrix of the joint 840 at the points $x_1$, $x_2$, $x_3$, $x_4$, $x_5$, $x_6$, $x_7$, $x_8$, $\ddot{x}(t)$ is acceleration of the joint 840 at the points $x_1$, $x_2$, $x_3$, $x_4$, $x_5$, $x_6$, $x_7$, $x_8$, [C] is the damping of joint 840 at the points $x_1$, $x_2$, $x_3$, $x_4$, $x_5$, $x_6$, $x_7$, $x_8$, $\dot{x}(t)$ is velocity of the joint 840 at the points $x_1$, $x_2$, $x_3$, $x_4$, $x_5$, $x_6$, $x_7$, $x_8$, [k] is the stiffness of the joint 840 at the points $x_1$, $x_2$, $x_3$, $x_4$, $x_5$, $x_6$, $x_7$, $x_8$, and x(t) is displacement of the joint 840 at the points $x_1$, $x_2$, $x_3$, $x_4$, $x_5$, $x_6$, $x_7$, $x_8$.

Therefore, to determine the mass properties expressed in the structural model above, including but not limited to the mass matrix [m], the damping [C] or the stiffness [k], the transfer matrix H(jω) may be inversely transformed according to the Fourier inversion theorem.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein may reference the generation of vibrometric signatures for unmanned aerial vehicles that are configured to deliver payloads from warehouses or other like facilities to customers, those of ordinary skill in the pertinent arts will recognize that the systems and methods disclosed herein are not so limited, and may be utilized in connection with any type or form of vehicle (e.g., manned or unmanned) or component thereof that is configured for any intended industrial, commercial, recreational or other use. Additionally, uses of the terms "joint" and "junction," or like terms, are interchangeable herein, and refer to any coupling of two or more components or aspects at a common location by any component or technique. Any other term that also references the coupling of two or more components or aspects may be utilized in a like manner.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIGS. 3, 5A and 5B, or 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
    an aerial vehicle;
    an imaging device, wherein the aerial vehicle is within a field of view of the imaging device;
    a speaker, wherein the speaker is aligned to emit acoustic energy onto the aerial vehicle; and
    a server in communication with each of the imaging device and the speaker,
    wherein the server is configured to at least:
        project acoustic energy over a range of frequencies onto at least a portion of the aerial vehicle, wherein the portion of the aerial vehicle comprises a joint between a first aspect of the aerial vehicle and a second aspect of the aerial vehicle;
        capture a plurality of images by the imaging device, wherein each of the plurality of images is captured with the acoustic energy projected onto the portion of the aerial vehicle;
        determine, for each of a plurality of frequencies within the range, a power level corresponding to vibration of the first aspect of the aerial vehicle at each of the plurality of frequencies;
        identify, based at least in part on the power levels for each of the plurality of frequencies, at least a first natural frequency associated with the first aspect of the aerial vehicle;
        generate a first vibrometric signature for the aerial vehicle based at least in part on the first natural frequency and at least one of the power levels corresponding to vibration of the first aspect of the aerial vehicle;
        determine, for each of the plurality of frequencies, a power level corresponding to vibration of the second aspect of the aerial vehicle at each of the plurality of frequencies;
        identify, based at least in part on the power levels for each of the plurality of frequencies, at least a second natural frequency associated with the second aspect of the aerial vehicle;
        generate a second vibrometric signature for the aerial vehicle based at least in part on the second natural frequency and at least one of the power levels corresponding to vibration of the second aspect of the aerial vehicle at the second natural frequency;
        compare the first vibrometric signature to a second vibrometric signature;
        determine whether the first vibrometric signature is consistent with the second vibrometric signature; and
        in response to determining that the first vibrometric signature is consistent with the second vibrometric signature within a tolerance,
            clear the aerial vehicle to perform one or more missions.

2. The system of claim 1, wherein the server is further configured to at least:
    in response to determining that the first vibrometric signature is inconsistent with the second vibrometric signature within the tolerance,
        subjecting the aerial vehicle to further evaluation.

3. The system of claim 1, wherein the first vibrometric signature comprises a first plot of the determined power levels corresponding to the vibration of the first aspect at each of the plurality of frequencies, and
    wherein the second vibrometric signature comprises a plot of the determined power levels corresponding to the vibration of the second aspect at each of the plurality of frequencies, and
    wherein the first natural frequency corresponds to one of a local maximum power level or an absolute maximum power level on the first plot, and
    wherein the second natural frequency corresponds to one of a local maximum power level or an absolute maximum power level on the second plot.

4. The system of claim 1, wherein the server is further configured to at least:
    select a first plurality of pixels on a surface of the first aspect;
    determine a plurality of intensities of the first plurality of pixels, wherein each of the plurality of intensities is determined based on one of the first plurality of images;
    determine a power spectral density of the first aspect based at least in part on the plurality of intensities of the first plurality of pixels, wherein the power spectral density is determined based at least in part on a fast Fourier transform of a time series of the plurality of intensities; and
    determine the first natural frequency of vibration of the first aspect from the power spectral density.

5. The system of claim 1, wherein the first aspect of the aerial vehicle is at least one surface of a frame of the aerial vehicle,
wherein the second aspect of the aerial vehicle is at least one surface of at least one of a wing or a propulsion motor of the aerial vehicle, and
wherein the joint couples the wing or the propulsion motor to the frame.

6. A method comprising:
subjecting at least a portion of a vehicle to excitation by an excitation source over a first period of time, wherein the portion of the vehicle comprises a joint between at least a first aspect of the vehicle and a second aspect of the vehicle;
capturing first imaging data by a first imaging device including at least the portion of the vehicle within a first field of view, wherein the first imaging data is captured with the portion of the vehicle being subjected to the excitation by the excitation source over the first period of time;
determining at least a first natural frequency of the first aspect of the vehicle based at least in part on the first imaging data;
determining at least a first natural frequency of the second aspect of the vehicle based at least in part on the first imaging data;
generating at least a first vibrometric signature based at least in part on the first natural frequency of the first aspect of the vehicle;
generating at least a second vibrometric signature based at least in part on the first natural frequency of the second aspect of the vehicle;
generating a comparison of at least the first vibrometric signature to at least the second vibrometric signature;
determining an indication of suitability of at least the joint based at least in part on the comparison; and
storing at least the indication of suitability in at least one data store.

7. The method of claim 6, wherein determining the indication of suitability of at least the joint comprises:
determining, based at least in part on the comparison, that the first vibrometric signature is similar or identical to the second signature,
wherein the indication of suitability is that the joint is suitable.

8. The method of claim 7, wherein the first vibrometric signature comprises a first plurality of natural frequencies of the first aspect of the vehicle,
wherein the second vibrometric signature comprises a second plurality of natural frequencies of the second aspect of the vehicle,
wherein determining that the first vibrometric signature is similar or identical to the second signature comprises:
determining that each of the first plurality of the natural frequencies is approximately equal to each of the second plurality of natural frequencies; and
determining that power levels of vibration of the first aspect of the vehicle at each of the first plurality of natural frequencies are approximately equal to power levels of vibration of the second aspect of the vehicle at each of the second plurality of natural frequencies.

9. The method of claim 6, wherein determining the indication of suitability of at least the joint comprises:
determining, based at least in part on the comparison, that the first vibrometric signature is not similar to the second signature within a predetermined tolerance,
wherein the indication of suitability is that the joint is not suitable.

10. The method of claim 6, wherein determining at least the first natural frequency of the first aspect comprises:
determining pluralities of natural frequencies of the portion of the vehicle based at least in part on the first imaging data, wherein one of the pluralities of natural frequencies of the portion of the vehicle includes the first natural frequency of the first aspect, and
wherein one of the pluralities of natural frequencies of the portion of the vehicle includes the first natural frequency of the second aspect;
wherein generating at least the first vibrometric signature comprises:
generating a first plurality of vibrometric signatures for the first aspect, wherein each of the first plurality of vibrometric signatures corresponds to one of the plurality of points on the first aspect of the vehicle, and
wherein generating at least the second vibrometric signature comprises:
generating a second plurality of vibrometric signatures for the second aspect,
wherein each of the second plurality of vibrometric signatures corresponds to one of the plurality of points on the second aspect of the vehicle.

11. The method of claim 10, further comprising:
generating a transfer matrix based at least in part on the first plurality of vibrometric signatures and the second plurality of vibrometric signatures,
wherein the transfer matrix comprises an n×n array of values,
wherein each of the values of the array represents a relationship between a force applied at one of the plurality of the points and a displacement at another of the plurality of points in response to the force, and
wherein n is a number of the plurality of points on the portion of the vehicle.

12. The method of claim 11, wherein each of the values is calculated according to an equation $$\sum_{r=1}^{N} \frac{2j\omega_r Q_r \{v\}_r \{v\}_r^T}{(\theta_r^2 + \omega_r^2 - \omega^2) - 2\theta_r j\omega}$$

where N is a number of vibrational modes of the vibrometric signature determined for one of the points, where $\omega_r$ is a natural frequency of one of the points at a vibrational mode r, where $\theta_r$ is an amplitude of a structural response when the joint is vibrating at a frequency co at or near $\omega_r$, where $\{v\}_r$ is a vector representative of a deformation shape at the one of the points, where $\{v\}_r^T$ is a transpose of the vector $\{v\}_r$, and where $Q_r$ is a constant.

13. The method of claim 11, further comprising:
inversely transforming the transfer matrix to a transfer function in the time domain; and
calculating at least one of a damping or a stiffness of the joint from the transfer function.

14. The method of claim 6, wherein subjecting at least the portion of the vehicle to the excitation by the excitation source comprises:
projecting acoustic energy over a range of acoustic frequencies onto at least the portion of the vehicle by the excitation source over the first period of time, and wherein determining at least the first natural frequency of the first aspect of the vehicle comprises:
  detecting resonance of at least the first aspect of the vehicle within at least a portion of the first imaging data captured at a first time, wherein the first time is within the first period of time; and
  determining an acoustic frequency associated with the excitation by the excitation source at the first time,
wherein the first natural frequency of the first aspect of the vehicle is the acoustic frequency associated with the excitation by the excitation source at the first time.

15. The method of claim 6, wherein the excitation source is a motor associated with at least one of the first aspect or the second aspect, and
  wherein subjecting at least the portion of the vehicle to the excitation by the excitation source comprises:
    operating the motor at a first rotational speed during the first period of time; and
    operating the motor at a second rotational speed during the first period of time,
  wherein determining at least the first natural frequency of the first aspect of the vehicle based at least in part on the first imaging data comprises:
    determining the first natural frequency of the first aspect of the vehicle based at least in part on a portion of the first imaging data captured with the motor operating at the first rotational speed and a portion of the first imaging data captured with the motor operating at the second rotational speed.

16. The method of claim 6, wherein determining at least the first natural frequency of the first aspect of the vehicle comprises:
  determining a first plurality of natural frequencies of the first aspect of the vehicle based at least in part on the first imaging data, wherein the first natural frequency of the first aspect of the vehicle is one of the first plurality of natural frequencies, and
  wherein generating at least the first vibrometric signature comprises:
    generating at least the first vibrometric signature based at least in part on the first plurality of natural frequencies.

17. The method of claim 16, wherein determining at least the first natural frequency of the second aspect of the vehicle comprises:
  determining a second plurality of natural frequencies of the second aspect of the vehicle based at least in part on the first imaging data, wherein the first natural frequency of the second aspect is one of the second plurality of natural frequencies, and
  wherein generating at least the second vibrometric signature comprises:
    generating at least the second vibrometric signature based at least in part on the second plurality of natural frequencies.

18. The method of claim 6, wherein the first aspect comprises at least a first one of:
  an aileron;
  a bracket;
  an elevator;
  an elevon;
  a frame;
  a rudder;
  a strut;
  a taileron; or
  a wing, and wherein the second aspect comprises at least a second one of:
the aileron;
the bracket;
the elevator;
the elevon;
the frame;
the rudder;
the strut;
the taileron; or
the wing.

19. A method comprising:
projecting acoustic energy over a range of acoustic frequencies onto at least a portion of a vehicle over a period of time, wherein the portion of the vehicle couples a first aspect comprising at least one of a wing or a propulsion motor to a second aspect comprising a strut;
capturing imaging data by an imaging device including the portion of the vehicle within a field of view, wherein the imaging data is captured during the period of time;
determining a first plurality of natural frequencies of the first aspect based at least in part on the imaging data;
determining a second plurality of natural frequencies of the second aspect based at least in part on the imaging data;
generating a first plurality of vibrometric signatures based at least in part on the first plurality of natural frequencies, wherein each of the first plurality of vibrometric signatures is generated for one point on the first aspect;
generating a second plurality of vibrometric signatures based at least in part on the second plurality of natural frequencies, wherein each of the second plurality of vibrometric signatures is generated for one point on the second aspect; and
determining at least one of a damping or a stiffness of the joint from the first plurality of vibrometric signatures and the second plurality of vibrometric signatures.

20. The method of claim 19, further comprising:
generating a transfer matrix based at least in part on the first plurality of vibrometric signatures and the second plurality of vibrometric signatures,
wherein the transfer matrix comprises an n×n array of values,
wherein each of the values of the array represents a relationship between a force applied at one of the first plurality of the points or one of the second plurality of points and a displacement at another of the first plurality of points or the second plurality of points in response to the force,
wherein n is a combined number of first plurality of points and the second plurality of points, and
wherein each of the values is calculated according to an equation $$\sum_{r=1}^{N} \frac{2j\omega_r Q_r \{v\}_r \{v\}_r^T}{(\theta_r^2 + \omega_r^2 - \omega^2) - 2\theta_r j\omega}$$

where N is a number of vibrational modes of the vibrometric signature determined for one of the first plurality of points or the second plurality of points, where $\omega_r$ is a natural frequency of one of the first plurality of points or the second plurality of points at a vibrational mode r, where $\theta_r$ is an amplitude of a structural response when the joint is vibrating at a frequency $\omega$ at or near $\varphi_r$, where $\{v\}_r$ is a vector representative of a deformation shape at the one of the first plurality of points or the second plurality of points, where $\{v\}_r^T$ is a transpose of the vector $\{v\}_r$, and where $Q_r$ is a constant.

* * * * *